US012659730B2

(12) United States Patent
Nakarmi et al.

(10) Patent No.: US 12,659,730 B2
(45) Date of Patent: Jun. 16, 2026

(54) RADIO ACCESS NETWORK SECURITY

(71) Applicant: Telefonaktiebolaget LM Ericsson (publ), Stockholm (SE)

(72) Inventors: Prajwol Kumar Nakarmi, Sollentuna (SE); Magnus Stattin, Upplands Väsby (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 244 days.

(21) Appl. No.: 18/029,495

(22) PCT Filed: Oct. 4, 2021

(86) PCT No.: PCT/EP2021/077245
§ 371 (c)(1),
(2) Date: Mar. 30, 2023

(87) PCT Pub. No.: WO2022/069759
PCT Pub. Date: Apr. 7, 2022

(65) Prior Publication Data
US 2023/0362635 A1 Nov. 9, 2023

Related U.S. Application Data

(60) Provisional application No. 63/086,892, filed on Oct. 2, 2020.

(51) Int. Cl.
*H04W 12/04* (2021.01)
*H04W 12/033* (2021.01)
(Continued)

(52) U.S. Cl.
CPC ......... *H04W 12/04* (2013.01); *H04W 12/033* (2021.01); *H04W 12/122* (2021.01); *H04W 88/08* (2013.01)

(58) Field of Classification Search
CPC . H04W 12/04; H04W 12/033; H04W 12/122; H04W 88/08; H04W 76/15; H04W 88/085; H04L 63/0428; H04L 63/06
See application file for complete search history.

(56) References Cited

U.S. PATENT DOCUMENTS 9,301,134 B2 3/2016 Wager et al.
2015/0092942 A1 4/2015 Wager et al.
(Continued)

FOREIGN PATENT DOCUMENTS

CO 2020011164 A2 12/2020
WO 2018231031 A2 12/2018
(Continued)

OTHER PUBLICATIONS

3GPP, "3rd Generation Partnership Project; Technical Specification Group Radio Access Network; Study of separation of NR Control Plane (CP) and User Plane (UP) for split option 2; (Release 15)", 3GPP TR 38.806 V15.0.0, Dec. 2017, 1-22.
(Continued)

*Primary Examiner* — Izunna Okeke
(74) *Attorney, Agent, or Firm* — Murphy, Bilak & Homiller, PLLC

(57) ABSTRACT

A network node (20) is configured for use in a wireless communication network (10). The network node (20) configures multiple central unit user planes, CU-UPs, (14-1UP) of a disaggregated radio network node (14) to handle different respective data radio bearers (16-1 . . . 16-N) of a wireless device (12) in multi-connectivity operation, with security processing of user plane traffic by different CU-UPs (14-1UP) being based on different respective security keys (18). In some embodiments, the network node (20) configures different distributed units, DUs, of the disaggregated
(Continued)

radio network node (14) to serve different respective ones of the data radio bearers (16-1 . . . 16-N).

28 Claims, 25 Drawing Sheets

(51) Int. Cl.
_H04W 12/122_ (2021.01)
_H04W 88/08_ (2009.01)

(56) References Cited

U.S. PATENT DOCUMENTS

| | | | |
|---|---|---|---|
| 2016/0249210 A1 | 8/2016 | Chang et al. | |
| 2019/0174313 A1* | 6/2019 | Fransen | H04W 48/08 |
| 2020/0145819 A1* | 5/2020 | Nair | H04W 12/60 |

FOREIGN PATENT DOCUMENTS

| | | | |
|---|---|---|---|
| WO | 2019158117 A1 | 8/2019 | |
| WO | 2019216802 A1 | 11/2019 | |
| WO | 2022144066 A1 | 7/2022 | |

OTHER PUBLICATIONS

3GPP, "3GPP TS 38.401 V16.2.0", 3rd Generation Partnership Project; Technical Specification Group Radio Access Network; NG-RAN; Architecture description (Release 16), Jul. 2020, 1-77.

3GPP, "3rd Generation Partnership Project; Technical Specification Group Radio Access Network; NG-RAN; E1 Application Protocol (E1AP) (Release 16)", 3GPP TS 38.463 V16.2.0, Jul. 2020, 230 pages.

3GPP, "3GPP TS 33.220 V16.2.0", 3rd Generation Partnership Project; Technical Specification Group Services and System Aspects; Generic Authentication Architecture (GAA); Generic Bootstrapping Architecture (GBA) (Release 16), Sep. 2020, 1-93.

3GPP, "3rd Generation Partnership Project; Technical Specification Group Radio Access Network; NG-RAN; F1 application protocol (F1AP) (Release 16)", 3GPP TS 38.473 V16.2.0, Jul. 2020, 1-363.

3GPP, "3rd Generation Partnership Project; Technical Specification Group Radio Access Network; Study of further enhancement for disaggregated gNB (Release 16)", 3GPP TR 38.823 V16.0.0, Dec. 2019, 1-26.

3GPP, "3rd Generation Partnership Project; Technical Specification Group Services and System Aspects; Security architecture and procedures for 5G system (Release 16)", 3GPP TS 33.501 V16.4.0, Sep. 2020, 1-250.

3GPP, "3rd Generation Partnership Project; Technical Specification Group Services and System Aspects; System architecture for the 5G System (5GS); Stage 2 (Release 16)", 3GPP TS 23.501 V16.6.0, Sep. 2020, 1-447.

CATT, "Discussion on Security of Multi-CU-UP connectivity", 3GPP TSG-SA WG3 Meeting #97, S3-194138, revision of S3-19xabc, Reno (US), Nov. 18-22, 2019, 1-4.

CATT, "Study on Enhancement for Disaggregated gNB Architecture", 3GPP TSG RAN Meeting #85 RP-191975, Newport Beach, USA, Sep. 16-20, 2019, 1-5.

China Telecom, et al., "Study on security aspects of the Disaggregated gNB Architecture", 3GPP TSG-SA3 Meeting #99e S3-201381, e-meeting, May 11-15, 2020, 1-3.

Nokia, et al., "Discussion on UE simultaneously connected to CU-UPs belonging to different security domains", 3GPP TSG-RAN WG3#105, R3-194237, Ljubljana Slovenia, Aug. 26-30, 2019, 1-5.

"S3-202230 3GPP TR 33.840 V0.0.3", 3rd Generation Partnership Project; Technical Specification Group Services and System Aspects; Study on Security aspects of the disaggregated gNB architecture (Release 17), Aug. 2020, 1-10.

"3rd Generation Partnership Project; Technical Specification Group Radio Access Network; NR; NR and NG-RAN Overall Description; Stage 2 (Release 16)", 3GPP TS 38.300 V16.2.0, Jul. 2020, 1-148.

"3rd Generation Partnership Project; Technical Specification Group Radio Access Network; NR; Packet Data Convergence Protocol (PDCP) specification (Release 16)", 3GPP TS 38.323 V16.1.0, Jul. 2020, 1-21.

"3rd Generation Partnership Project; Technical Specification Group Radio Access Network; NR; Radio Resource Control (RRC) protocol specification (Release 16)", 3GPP TS 38.321 V16.1.0, Jul. 2020, 1-151.

"3rd Generation Partnership Project; Technical Specification Group Radio Access Network; NR; Radio Resource Control (RRC) protocol specification (Release 16)", 3GPP TS 38.331 V16.1.0, Jul. 2020, 1-906.

Ericsson, "CU-UPs supported by Dc", 3GPP TSG-SA3 Meeting #100bis-e, S3-202592, Revision of S3-20xxxx, e-meeting, Oct. 12-16, 2020, 1-2.

Ericsson, "Separate UP-keys per CU-UP instance", 3GPP TSG-SA3 Meeting #100bis-e, S3-202591, Revision of S3-20xxxx, e-meeting, Oct. 12-16, 2020, 1-2.

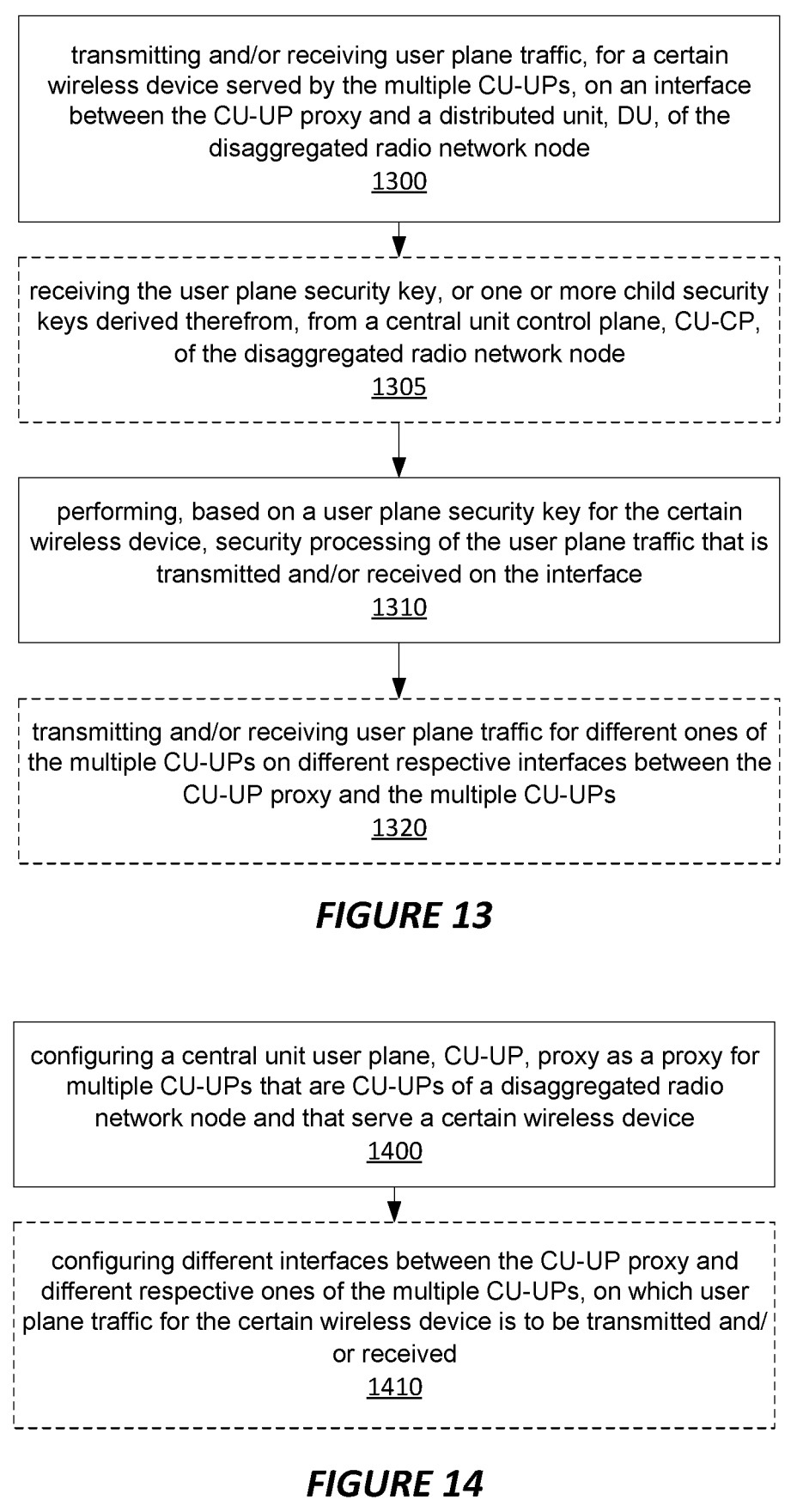

\* cited by examiner transmitting and/or receiving user plane traffic, for a certain wireless device served by the multiple CU-UPs, on an interface between the CU-UP proxy and a distributed unit, DU, of the disaggregated radio network node
1300 receiving the user plane security key, or one or more child security keys derived therefrom, from a central unit control plane, CU-CP, of the disaggregated radio network node
1305 performing, based on a user plane security key for the certain wireless device, security processing of the user plane traffic that is transmitted and/or received on the interface
1310 transmitting and/or receiving user plane traffic for different ones of the multiple CU-UPs on different respective interfaces between the CU-UP proxy and the multiple CU-UPs
1320

FIGURE 13 configuring a central unit user plane, CU-UP, proxy as a proxy for multiple CU-UPs that are CU-UPs of a disaggregated radio network node and that serve a certain wireless device
1400 configuring different interfaces between the CU-UP proxy and different respective ones of the multiple CU-UPs, on which user plane traffic for the certain wireless device is to be transmitted and/ or received
1410

FIGURE 14

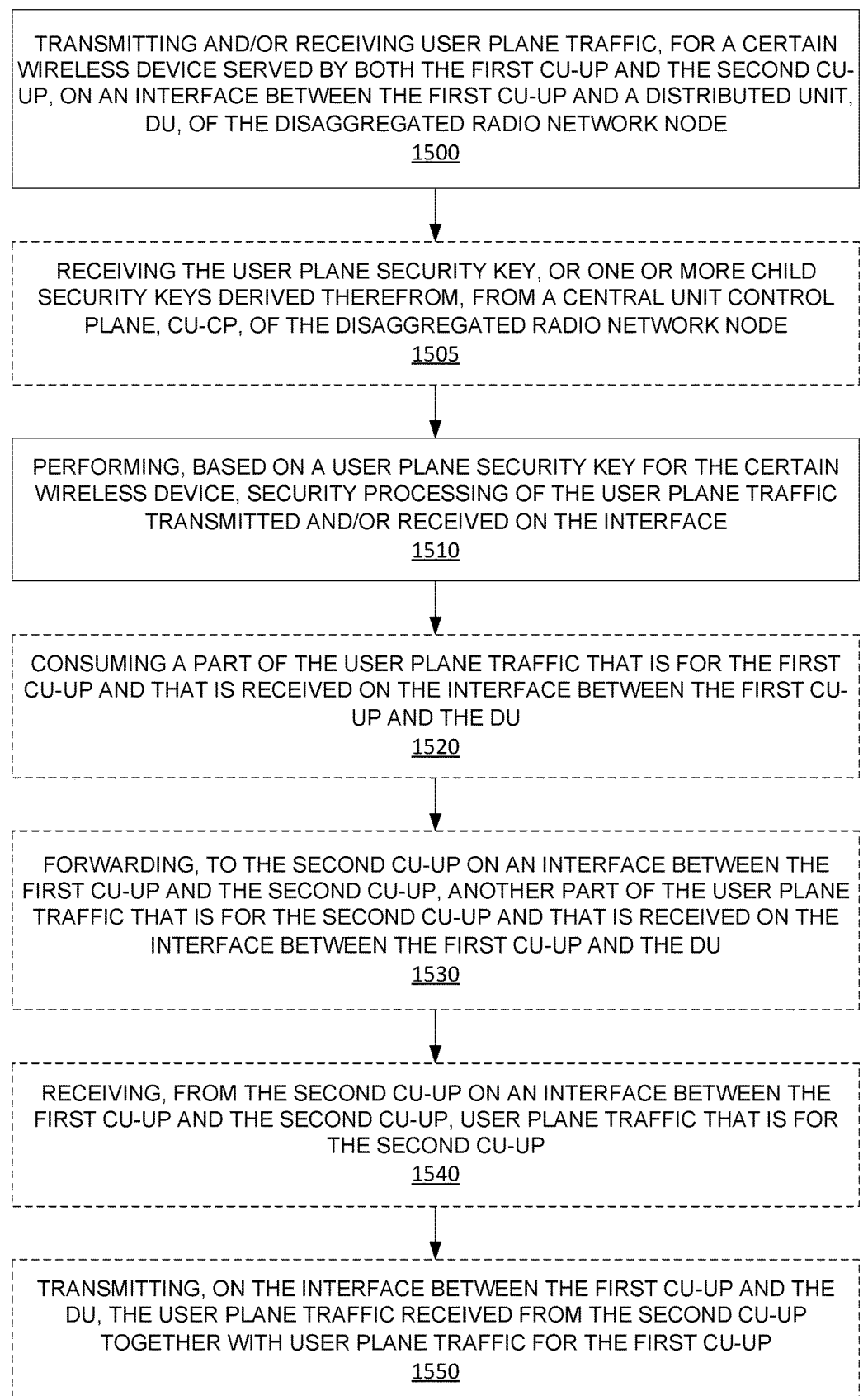

TRANSMITTING AND/OR RECEIVING USER PLANE TRAFFIC, FOR A CERTAIN WIRELESS DEVICE SERVED BY BOTH THE FIRST CU-UP AND THE SECOND CU-UP, ON AN INTERFACE BETWEEN THE FIRST CU-UP AND A DISTRIBUTED UNIT, DU, OF THE DISAGGREGATED RADIO NETWORK NODE
1500

RECEIVING THE USER PLANE SECURITY KEY, OR ONE OR MORE CHILD SECURITY KEYS DERIVED THEREFROM, FROM A CENTRAL UNIT CONTROL PLANE, CU-CP, OF THE DISAGGREGATED RADIO NETWORK NODE
1505

PERFORMING, BASED ON A USER PLANE SECURITY KEY FOR THE CERTAIN WIRELESS DEVICE, SECURITY PROCESSING OF THE USER PLANE TRAFFIC TRANSMITTED AND/OR RECEIVED ON THE INTERFACE
1510

CONSUMING A PART OF THE USER PLANE TRAFFIC THAT IS FOR THE FIRST CU-UP AND THAT IS RECEIVED ON THE INTERFACE BETWEEN THE FIRST CU-UP AND THE DU
1520

FORWARDING, TO THE SECOND CU-UP ON AN INTERFACE BETWEEN THE FIRST CU-UP AND THE SECOND CU-UP, ANOTHER PART OF THE USER PLANE TRAFFIC THAT IS FOR THE SECOND CU-UP AND THAT IS RECEIVED ON THE INTERFACE BETWEEN THE FIRST CU-UP AND THE DU
1530

RECEIVING, FROM THE SECOND CU-UP ON AN INTERFACE BETWEEN THE FIRST CU-UP AND THE SECOND CU-UP, USER PLANE TRAFFIC THAT IS FOR THE SECOND CU-UP
1540

TRANSMITTING, ON THE INTERFACE BETWEEN THE FIRST CU-UP AND THE DU, THE USER PLANE TRAFFIC RECEIVED FROM THE SECOND CU-UP TOGETHER WITH USER PLANE TRAFFIC FOR THE FIRST CU-UP
1550

*FIGURE 15*

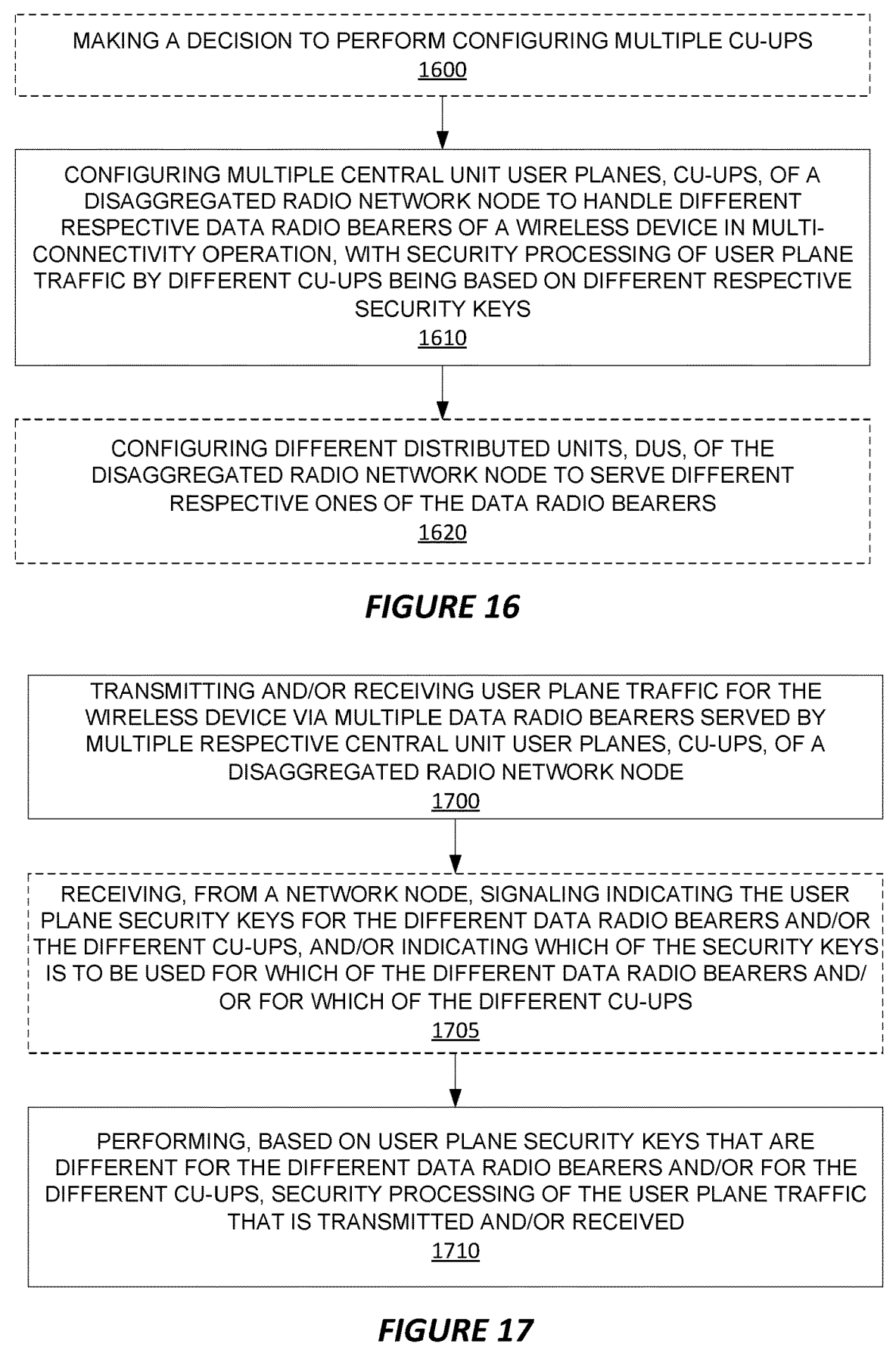

MAKING A DECISION TO PERFORM CONFIGURING MULTIPLE CU-UPS
1600

CONFIGURING MULTIPLE CENTRAL UNIT USER PLANES, CU-UPS, OF A DISAGGREGATED RADIO NETWORK NODE TO HANDLE DIFFERENT RESPECTIVE DATA RADIO BEARERS OF A WIRELESS DEVICE IN MULTI-CONNECTIVITY OPERATION, WITH SECURITY PROCESSING OF USER PLANE TRAFFIC BY DIFFERENT CU-UPS BEING BASED ON DIFFERENT RESPECTIVE SECURITY KEYS
1610

CONFIGURING DIFFERENT DISTRIBUTED UNITS, DUS, OF THE DISAGGREGATED RADIO NETWORK NODE TO SERVE DIFFERENT RESPECTIVE ONES OF THE DATA RADIO BEARERS
1620

FIGURE 16

TRANSMITTING AND/OR RECEIVING USER PLANE TRAFFIC FOR THE WIRELESS DEVICE VIA MULTIPLE DATA RADIO BEARERS SERVED BY MULTIPLE RESPECTIVE CENTRAL UNIT USER PLANES, CU-UPS, OF A DISAGGREGATED RADIO NETWORK NODE
1700

RECEIVING, FROM A NETWORK NODE, SIGNALING INDICATING THE USER PLANE SECURITY KEYS FOR THE DIFFERENT DATA RADIO BEARERS AND/OR THE DIFFERENT CU-UPS, AND/OR INDICATING WHICH OF THE SECURITY KEYS IS TO BE USED FOR WHICH OF THE DIFFERENT DATA RADIO BEARERS AND/OR FOR WHICH OF THE DIFFERENT CU-UPS
1705

PERFORMING, BASED ON USER PLANE SECURITY KEYS THAT ARE DIFFERENT FOR THE DIFFERENT DATA RADIO BEARERS AND/OR FOR THE DIFFERENT CU-UPS, SECURITY PROCESSING OF THE USER PLANE TRAFFIC THAT IS TRANSMITTED AND/OR RECEIVED
1710

FIGURE 17

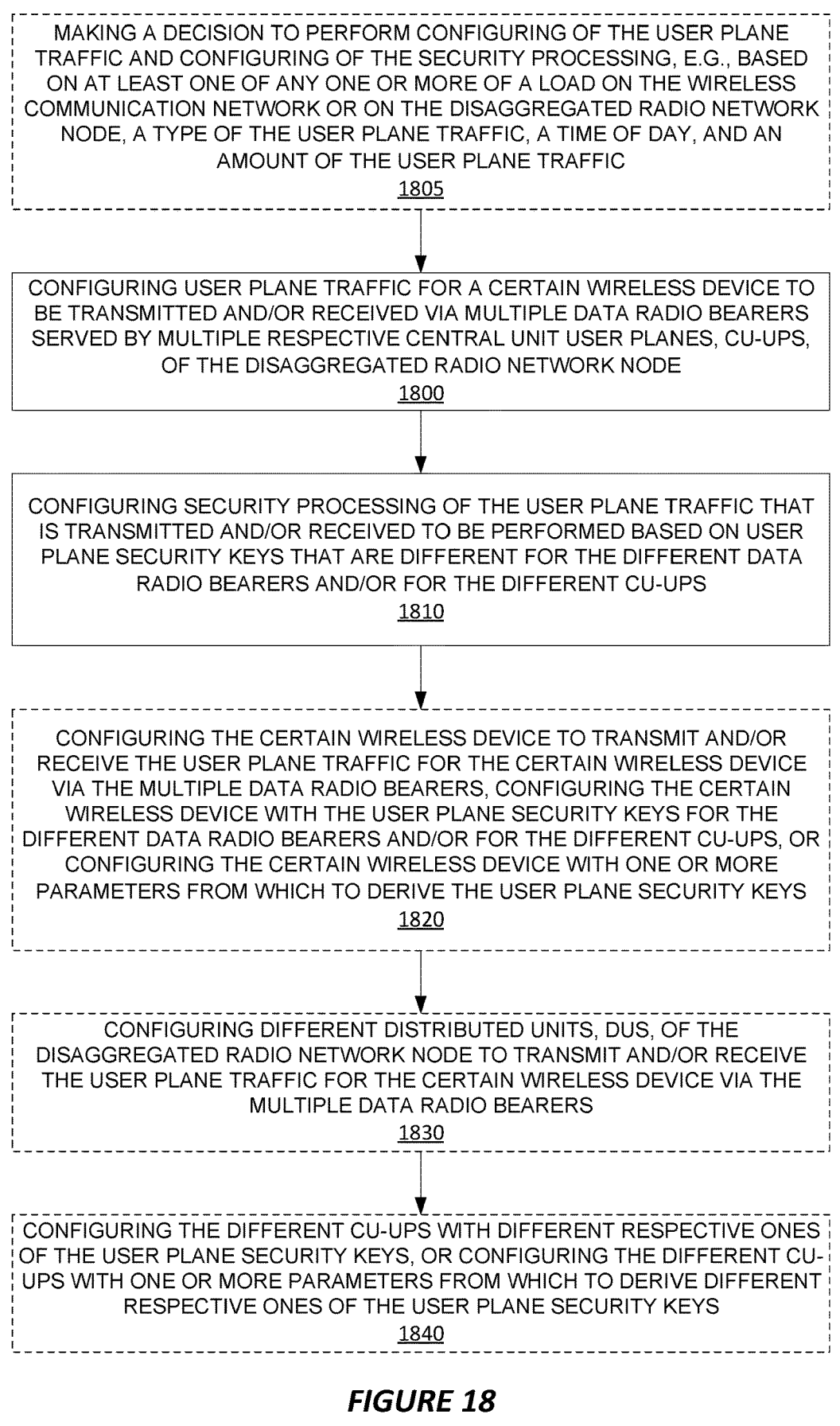

MAKING A DECISION TO PERFORM CONFIGURING OF THE USER PLANE TRAFFIC AND CONFIGURING OF THE SECURITY PROCESSING, E.G., BASED ON AT LEAST ONE OF ANY ONE OR MORE OF A LOAD ON THE WIRELESS COMMUNICATION NETWORK OR ON THE DISAGGREGATED RADIO NETWORK NODE, A TYPE OF THE USER PLANE TRAFFIC, A TIME OF DAY, AND AN AMOUNT OF THE USER PLANE TRAFFIC
1805

CONFIGURING USER PLANE TRAFFIC FOR A CERTAIN WIRELESS DEVICE TO BE TRANSMITTED AND/OR RECEIVED VIA MULTIPLE DATA RADIO BEARERS SERVED BY MULTIPLE RESPECTIVE CENTRAL UNIT USER PLANES, CU-UPS, OF THE DISAGGREGATED RADIO NETWORK NODE
1800

CONFIGURING SECURITY PROCESSING OF THE USER PLANE TRAFFIC THAT IS TRANSMITTED AND/OR RECEIVED TO BE PERFORMED BASED ON USER PLANE SECURITY KEYS THAT ARE DIFFERENT FOR THE DIFFERENT DATA RADIO BEARERS AND/OR FOR THE DIFFERENT CU-UPS
1810

CONFIGURING THE CERTAIN WIRELESS DEVICE TO TRANSMIT AND/OR RECEIVE THE USER PLANE TRAFFIC FOR THE CERTAIN WIRELESS DEVICE VIA THE MULTIPLE DATA RADIO BEARERS, CONFIGURING THE CERTAIN WIRELESS DEVICE WITH THE USER PLANE SECURITY KEYS FOR THE DIFFERENT DATA RADIO BEARERS AND/OR FOR THE DIFFERENT CU-UPS, OR CONFIGURING THE CERTAIN WIRELESS DEVICE WITH ONE OR MORE PARAMETERS FROM WHICH TO DERIVE THE USER PLANE SECURITY KEYS
1820

CONFIGURING DIFFERENT DISTRIBUTED UNITS, DUS, OF THE DISAGGREGATED RADIO NETWORK NODE TO TRANSMIT AND/OR RECEIVE THE USER PLANE TRAFFIC FOR THE CERTAIN WIRELESS DEVICE VIA THE MULTIPLE DATA RADIO BEARERS
1830

CONFIGURING THE DIFFERENT CU-UPS WITH DIFFERENT RESPECTIVE ONES OF THE USER PLANE SECURITY KEYS, OR CONFIGURING THE DIFFERENT CU-UPS WITH ONE OR MORE PARAMETERS FROM WHICH TO DERIVE DIFFERENT RESPECTIVE ONES OF THE USER PLANE SECURITY KEYS
1840

*FIGURE 18*

RADIO ACCESS NETWORK SECURITY

TECHNICAL FIELD

The present application relates generally to a radio access network, and relates more particularly to the security of such a radio access network.

BACKGROUND

A split radio network architecture splits a radio network node (e.g., a base station) into a so-called central unit (CU) and one or more so-called distributed units (DUs). The central unit terminates higher layer and/or less time-critical protocols, such as the Packet Data Convergence Protocol (PDCP) and Radio Resource Control (RRC) protocols towards a wireless device. The central unit also controls the operations of the distributed unit(s). A distributed unit by contrast terminates lower layer and/or more time-critical protocols, such as the Radio Link Control (RLC), Medium Access Control (MAC), and physical layer protocols.

A radio network node may also be disaggregated via separation between the user plane (UP) and the control plane (CP). In one case, for example, a radio network node may include one or more CU-CPs and multiple CU-UPs, where the multiple CU-UPs handle or serve the same wireless device.

Disaggregating a radio network node in this or other ways creates challenges from a security point of view. Compromise of security at one part of a disaggregated radio network node (e.g., one CU-UP) may in turn compromise security at another part of a disaggregated radio network node (e.g., another CU-UP).

SUMMARY

Some embodiments herein ensure the same security key is not shared between multiple CU-UPs of a disaggregated radio network node. Some embodiments thereby facilitate the deployment of CU-UPs in different security domains. This may advantageously silo security compromises on a CU-UP by CU-UP basis.

More particularly, embodiments herein include a method performed by a network node configured for use in a wireless communication network. The method comprises configuring multiple central unit user planes, CU-UPs, of a disaggregated radio network node to handle different respective data radio bearers of a wireless device in multi-connectivity operation, with security processing of user plane traffic by different CU-UPs being based on different respective security keys.

In some embodiments, the method further comprises making a decision to perform configuring multiple CU-UPs. In this case, the decision is made based on at least one of any one or more of a load on the wireless communication network or on the disaggregated radio network node, a type of the user plane traffic, a time of day, and an amount of the user plane traffic.

In some embodiments, the method further comprises configuring different distributed units, DUs, of the disaggregated radio network node to serve different respective ones of the data radio bearers.

In some embodiments, the security processing is performed at a Packet Data Convergence Protocol, PDCP, layer.

In some embodiments, the security processing of the user plane traffic includes downlink security processing and/or uplink security processing. In this case, the downlink security processing includes encrypting, integrity protecting, and/or replay protecting the user plane traffic in a downlink direction, and the uplink security processing includes decrypting and/or verifying an integrity and replay protection of user plane traffic in an uplink direction.

In some embodiments, the multi-connectivity operation comprises dual connectivity operation.

In some embodiments, the network node comprises a central unit control plane, CU-CP.

Other embodiments herein include a method performed by a wireless device. The method comprises transmitting and/or receiving user plane traffic for the wireless device via multiple data radio bearers served by multiple respective central unit user planes, CU-UPs, of a disaggregated radio network node, and performing, based on user plane security keys that are different for the different data radio bearers and/or for the different CU-UPs, security processing of the user plane traffic that is transmitted and/or received.

In some embodiments, the method further comprises receiving, from a network node, signaling indicating the user plane security keys for the different data radio bearers and/or the different CU-UPs, and/or indicating which of the security keys is to be used for which of the different data radio bearers and/or for which of the different CU-UPs. In some embodiments, the network node implements a central unit control plane, CU-CP.

In some embodiments, the different data radio bearers belong to different respective groups of data radio bearers, and the security keys are different for different groups of data radio bearers.

In some embodiments, the security processing is performed at a Packet Data Convergence Protocol, PDCP, layer.

In some embodiments, the security processing of the user plane traffic includes downlink security processing and/or uplink security processing. In this case, the uplink security processing includes encrypting, integrity protecting, and/or replay protecting the user plane traffic transmitted in an uplink direction, and the downlink security processing includes decrypting and/or verifying an integrity and replay protection of user plane traffic received in a downlink direction.

In some embodiments, performing security processing comprises performing security processing of the user plane traffic that is transmitted or received over a first radio bearer of the multiple data radio bearers, based on a first user plane security key for the first data radio bearer and/or for a first CU-UP. Performing security processing also comprises performing security processing of the user plane traffic that is transmitted or received over a second radio bearer of the multiple data radio bearers, based on a second user plane security key for the second data radio bearer and/or for a second CU-UP.

In some embodiments, the multiple data radio bearers comprise a master data radio bearer associated with a master cell group, MCG, in dual connectivity operation and a secondary data radio bearer associated with a secondary cell group, SCG, in dual connectivity operation.

Other embodiments herein include a method performed by a network node configured for use in a wireless communication network. The method comprises configuring user plane traffic for a certain wireless device to be transmitted and/or received via multiple data radio bearers served by multiple respective central unit user planes, CU-UPs, of the disaggregated radio network node. The method also comprises configuring security processing of the user plane traffic that is transmitted and/or received to be performed based on user plane security keys that are different for the different data radio bearers and/or for the different CU-UPs.

In some embodiments, the method further comprises making a decision to perform configuring of the user plane traffic and configuring of the security processing, based on at least one of any one or more of a load on the wireless communication network or on the disaggregated radio network node, a type of the user plane traffic, a time of day, and an amount of the user plane traffic.

In some embodiments, the method comprises configuring the certain wireless device to transmit and/or receive the user plane traffic for the certain wireless device via the multiple data radio bearers, configuring the certain wireless device with the user plane security keys for the different data radio bearers and/or for the different CU-UPs, or configuring the certain wireless device with one or more parameters from which to derive the user plane security keys.

In some embodiments, the method comprises configuring different distributed units, DUs, of the disaggregated radio network node to transmit and/or receive the user plane traffic for the certain wireless device via the multiple data radio bearers. Additionally or alternatively, the method comprises configuring the different CU-UPs with different respective ones of the user plane security keys, or configuring the different CU-UPs with one or more parameters from which to derive different respective ones of the user plane security keys.

In some embodiments, the different data radio bearers belong to different respective groups of data radio bearers, and the security keys are different for different groups of data radio bearers.

In some embodiments, the security processing is configured to be performed at a Packet Data Convergence Protocol, PDCP, layer.

In some embodiments, the multiple data radio bearers comprise a master data radio bearer associated with a master cell group, MCG, in dual connectivity operation and a secondary data radio bearer associated with a secondary cell group, SCG, in dual connectivity operation.

In some embodiments, the network node implements a central unit control plane, CU-CP.

Embodiments herein also include corresponding apparatus, computer programs, and carriers of those computer programs. For example, embodiments herein include a network node configured for use in a wireless communication network. The network node is configured to configure multiple central unit user planes, CU-UPs, of a disaggregated radio network node to handle different respective data radio bearers of a wireless device in multi-connectivity operation, with security processing of user plane traffic by different CU-UPs being based on different respective security keys.

Embodiments herein also include a wireless device. The wireless device is configured to transmit and/or receive user plane traffic for the wireless device via multiple data radio bearers served by multiple respective central unit user planes, CU-UPs, of a disaggregated radio network node, and perform, based on user plane security keys that are different for the different data radio bearers and/or for the different CU-UPs, security processing of the user plane traffic that is transmitted and/or received.

Embodiments herein further include a network node configured for use in a wireless communication network. The network node is configured to configure user plane traffic for a certain wireless device to be transmitted and/or received via multiple data radio bearers served by multiple respective central unit user planes, CU-UPs, of the disaggregated radio network node. The network node is also configured to configure security processing of the user plane traffic that is transmitted and/or received to be performed based on user plane security keys that are different for the different data radio bearers and/or for the different CU-UPs.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 13 is a logic flow diagram of a method performed by a central unit user plane, CU-UP, proxy configured to serve as a proxy for multiple CU-UPs of a disaggregated radio network node, according to some embodiments.

FIG. 14 is a logic flow diagram of a method performed by a network node according to some embodiments.

FIG. 15 is a logic flow diagram of a method performed by a first central unit user plane, CU-UP, of a disaggregated radio network node that comprises the first CU-UP and a second CU-UP according to yet other embodiments.

FIG. 16 is a logic flow diagram of a method performed by a network node configured for use in a wireless communication network according to still other embodiments.

FIG. 17 is a logic flow diagram of a method performed by a wireless device according to some embodiments.

FIG. 18 is a logic flow diagram of a method performed by a network node configured for use in a wireless communication network according to other embodiments.

DETAILED DESCRIPTION

Figure 1:
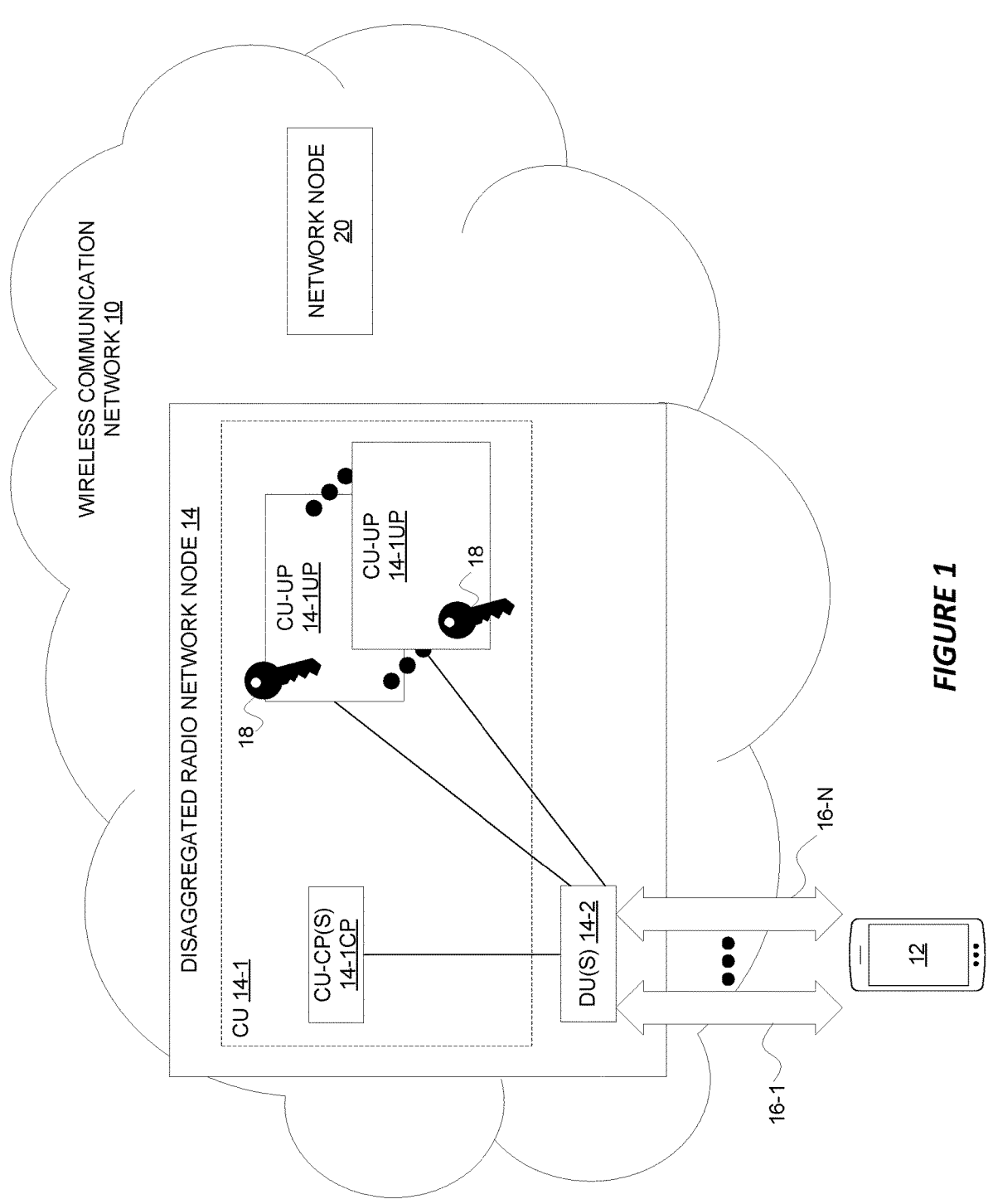
FIG. 1 is a block diagram of a wireless communication network according to some embodiments.

FIG. 1 shows a wireless communication network 10 according to some embodiments, e.g., in the form of a 5G network. The wireless communication network 10 is configured to provide wireless communication service to a wireless device 12, e.g., a user equipment (UE). The wireless communication network 10 in this regard includes a disaggregated radio network node 14.

The disaggregated radio network node 14 is disaggregated in the sense that it is split into a so-called central unit (CU) 14-1 and one or more so-called distributed units (DUs) 14-2. The CU 14-1 terminates higher layer and/or less time-critical protocols, such as the Packet Data Convergence Protocol (PDCP) and Radio Resource Control (RRC) protocols towards the wireless device 12. The CU 14-1 also controls the operations of the distributed unit(s) 14-2. A distributed unit 14-2 by contrast terminates lower layer and/or more time-critical protocols, such as the Radio Link Control (RLC), Medium Access Control (MAC), and physical layer protocols.

The disaggregated radio network node 14 is disaggregated also via separation between the user plane (UP) and the control plane (CP). As shown, for instance, the disaggregated radio network node 14 includes one or more CU-CP(s) 14-CP and multiple CU-UPs 14-1UP, where the multiple CU-UPs 14-1UP handle or serve the same wireless device 12.

Embodiments in FIG. 1 exploit multi-connectivity operation of the wireless device 12. Multi-connectivity operation in this regard refers to the simultaneous use of multiple (independent) communication paths for communication with the wireless device 12, e.g., where distinct schedulers are used for the multiple communication paths. One example of multi-connectivity is dual connectivity (DC) in which two communication paths are simultaneously used for communication with the wireless device 12.

In some embodiments, different distributed units (DUs) 14-2 of the disaggregated radio network node 14 may provide the different communication paths for multi-connectivity operation. In one embodiment, for example, a master cell group (MCG) includes one or more cells provided by one DU 14-2 acting as a master node (MN) in DC operation and a secondary cell group (SCG) includes one or more cells served by another DU 14-2 acting as a secondary node (SN) in DC operation.

In other embodiments, by contrast, a single DU 14-2 of the disaggregated radio network node 14 may provide the different communication paths for multi-connectivity operation. In one embodiment, for example, the same DU 14-2 may act as both MN and SN by providing a cell that is included in both the MCG and the SCG in DC operation. In this case, then, the CU-CP(s) 14-1CP may ensure different identifiers (e.g., different RNTIs or C-RNTIs) are assigned and used with MN (MCG) and SN (SCG) such that the wireless device 12 and the DU 14-2 can distinguish MN and SN operation and events.

No matter whether different communication paths for multi-connectivity operation are provided by multiple DUs or a single DU, multiple data radio bearers (DRBs) 16-1 . . . 16-N support this multi-connectivity operation, e.g., as distinguished from signaling radio bearers (SRBs). The DRBs 16-1 . . . 16-N are radio bearers over which user plane traffic is transported. In some embodiments, the data radio bearers 16-1 . . . 16-N include a master data radio bearer and one or more secondary data radio bearers.

Embodiments herein more particularly exploit such multi-connectivity operation by configuring multiple CU-UPs 14-1UP of the disaggregated radio network node 14 to handle different respective data radio bearers 16-1 . . . 16-N of the wireless device 12 in multi-connectivity operation. Notably, the multiple CU-UPs 14-1UP are configured to handle different respective data radio bearers 16-1 . . . 16-N, with security processing of user plane traffic by different CU-UPs 14-1UP being based on different respective security keys 18, e.g., in the form of different respective user plane security keys. Some embodiments thereby ensure the same security key 18 is not shared between multiple CU-UPs 14-1UP of the disaggregated radio network node 14. Some embodiments thereby facilitate the deployment of CU-UPs 14-1UP in different security domains. This may advantageously silo security compromises on a CU-UP by CU-UP basis.

In some embodiments, the security processing based on different respective security keys 18 is performed at the Packet Data Convergence Protocol (PDCP) layer. In these and other embodiments, the security processing may include downlink security processing and/or uplink security processing. The downlink security processing may include encrypting, integrity protecting, and/or replay protecting the user plane traffic in a downlink direction. Conversely, the uplink security processing may include decrypting and/or verifying an integrity and replay protection of user plane traffic in an uplink direction.

FIG. 1 shows that configuring the multiple CU-UPs 14-1UP in this way may be performed by a network node 20. This network node 20 in some embodiments is or implements a CU-CP 14-1CP of the disaggregated radio network node 14. In other embodiments, the network node 20 is radio network equipment, or core network equipment, or operation and maintenance equipment.

Regardless, in some embodiments, the network node 20 configures the multiple CU-UPs 14-1UP in this way by configuring the different CU-UPs 14-1UP with different respective ones of the security keys 18, or configuring the different CU-UPs 14-1UP with one or more parameters from which to derive different respective ones of the security keys 18. Alternatively or additionally, the network node 20 may configure the wireless device 12 with the security keys 18 for the different data radio bearers 16-1 . . . 16-N and/or for the different CU-UPs 14-1UP, or may configure the wireless device 12 with one or more parameters from which to derive the security keys 18.

Figure 9:
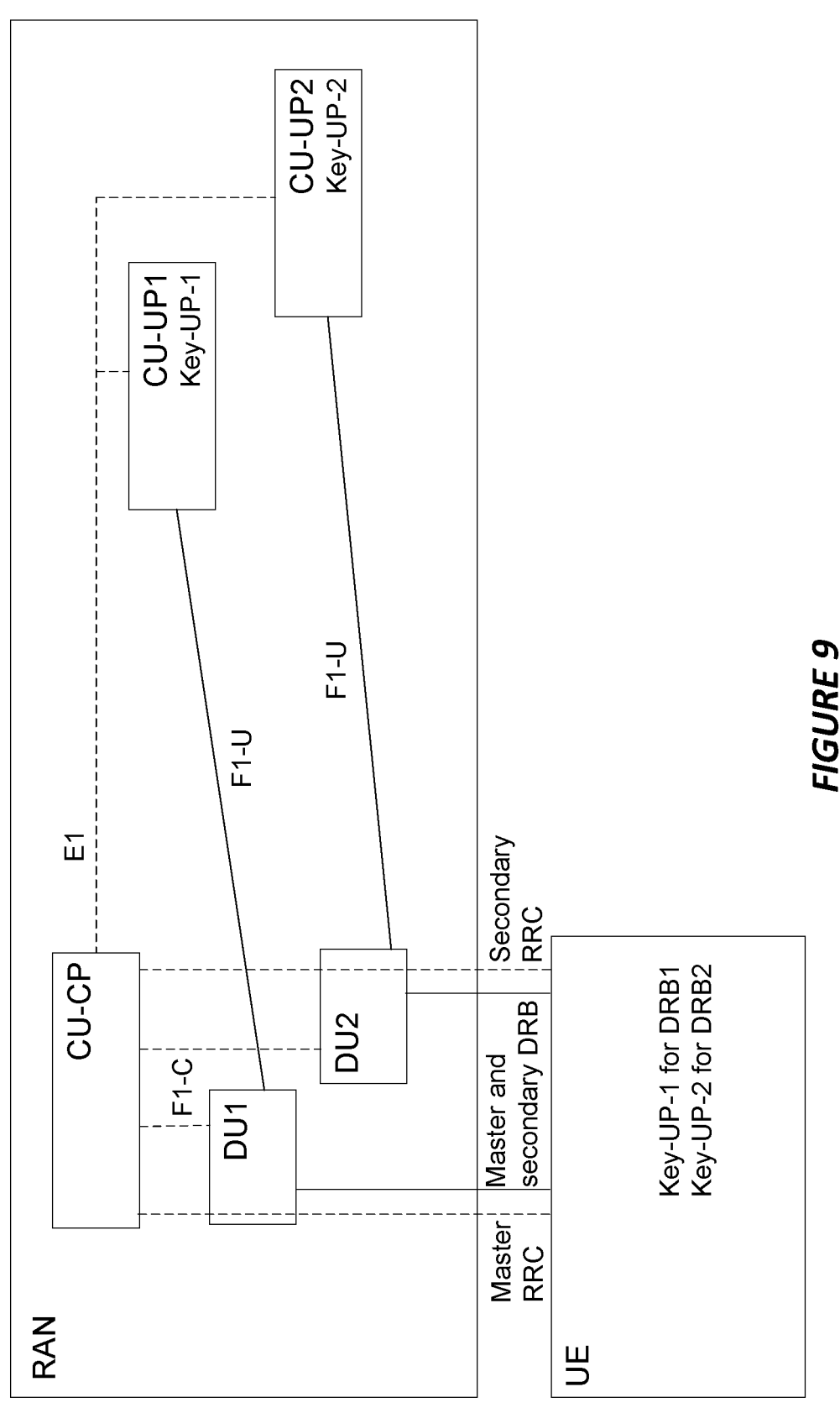
FIG. 9 is a block diagram of a disaggregated radio network node where dual connectivity (DC) is used to ensure that multiple CU-UPs have separate security keys according to some embodiments.
Figure 10:
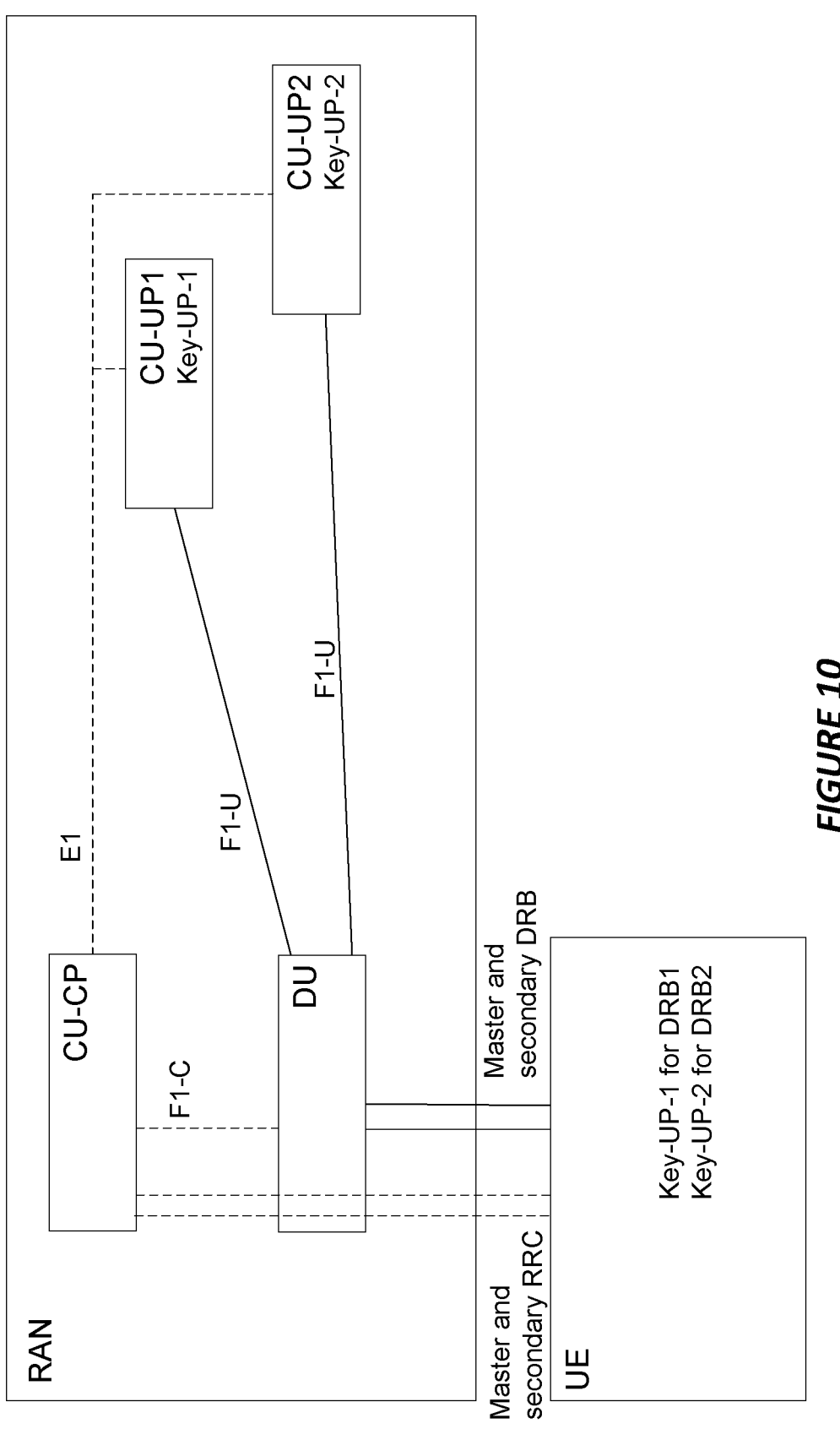
FIG. 10 is a block diagram of a disaggregated radio network node where, according to some embodiments, CU-CP configures DC with MCG and SCG with the same DU with connections to separate CU-UPs for MN and SN bearers, respectively.
Figure 11:
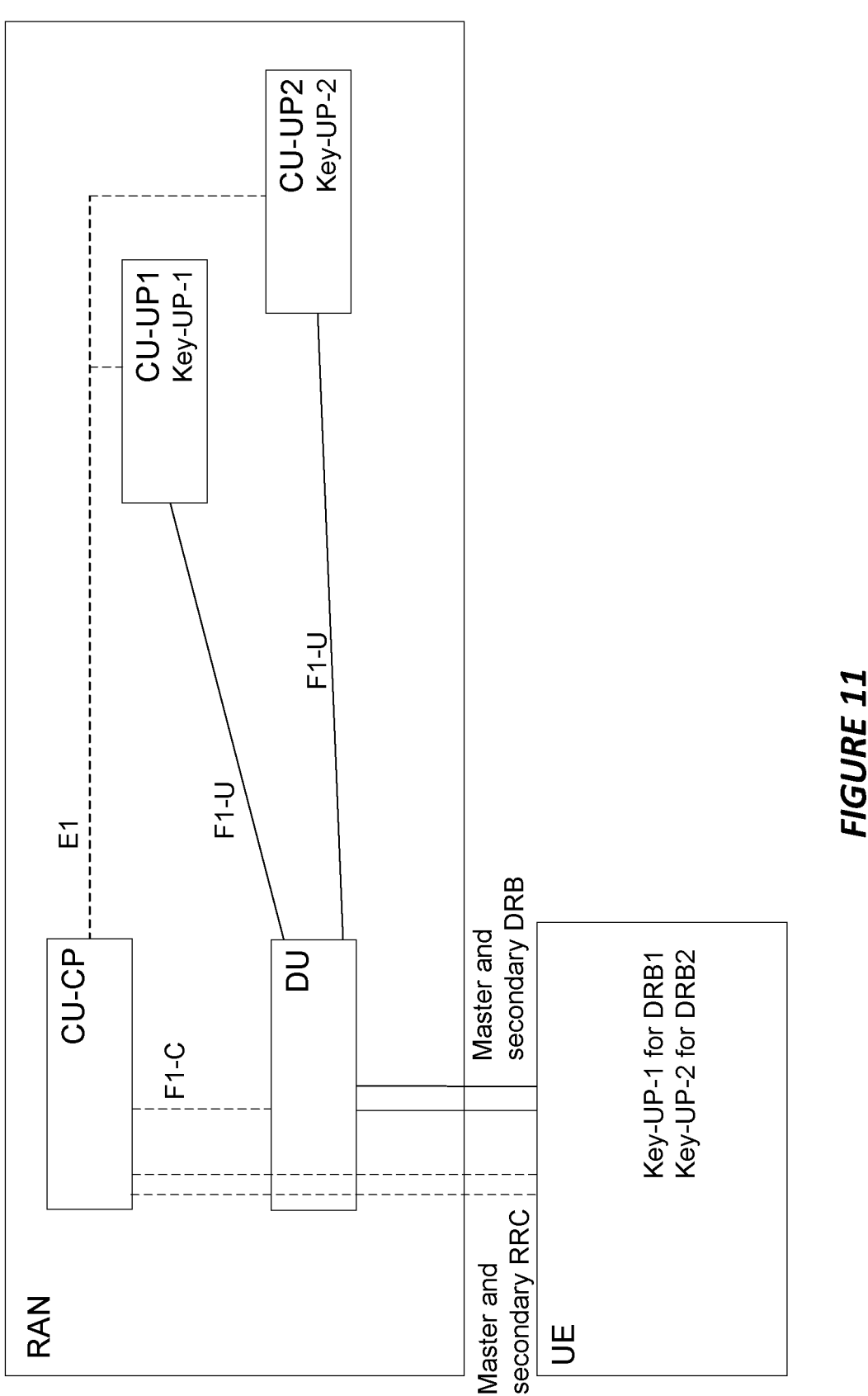
FIG. 11 is a block diagram of a disaggregated radio network node where, according to some embodiments, the CU-CP configures DC with MCG and SCG with the same DU and where one or more cells may be part of both MCG and SCG with connections to separate CU-UPs for MN and SN bearers, respectively.

In some embodiments, a single DU 14-2 is configured to transmit and/or receive the user plane traffic for the wireless device 12 via the multiple data radio bearers 16-1 . . . 16-N, e.g., as exemplified in FIGS. 10 and 11. In other embodiments, by contrast, multiple different DUs 14-2 of the disaggregated radio network node 14 are configured to transmit and/or receive the user plane traffic for the wireless device 12 via the multiple data radio bearers 16-1 . . . 16-N, e.g., as exemplified in FIG. 9.

Additional embodiments will now be described. At least some of these embodiments may be described as applicable in certain contexts and/or wireless network types for illustrative purposes, but the embodiments are similarly applicable in other contexts and/or wireless network types not explicitly described.

Some embodiments herein are applicable in a 5G system.

Figure 2:
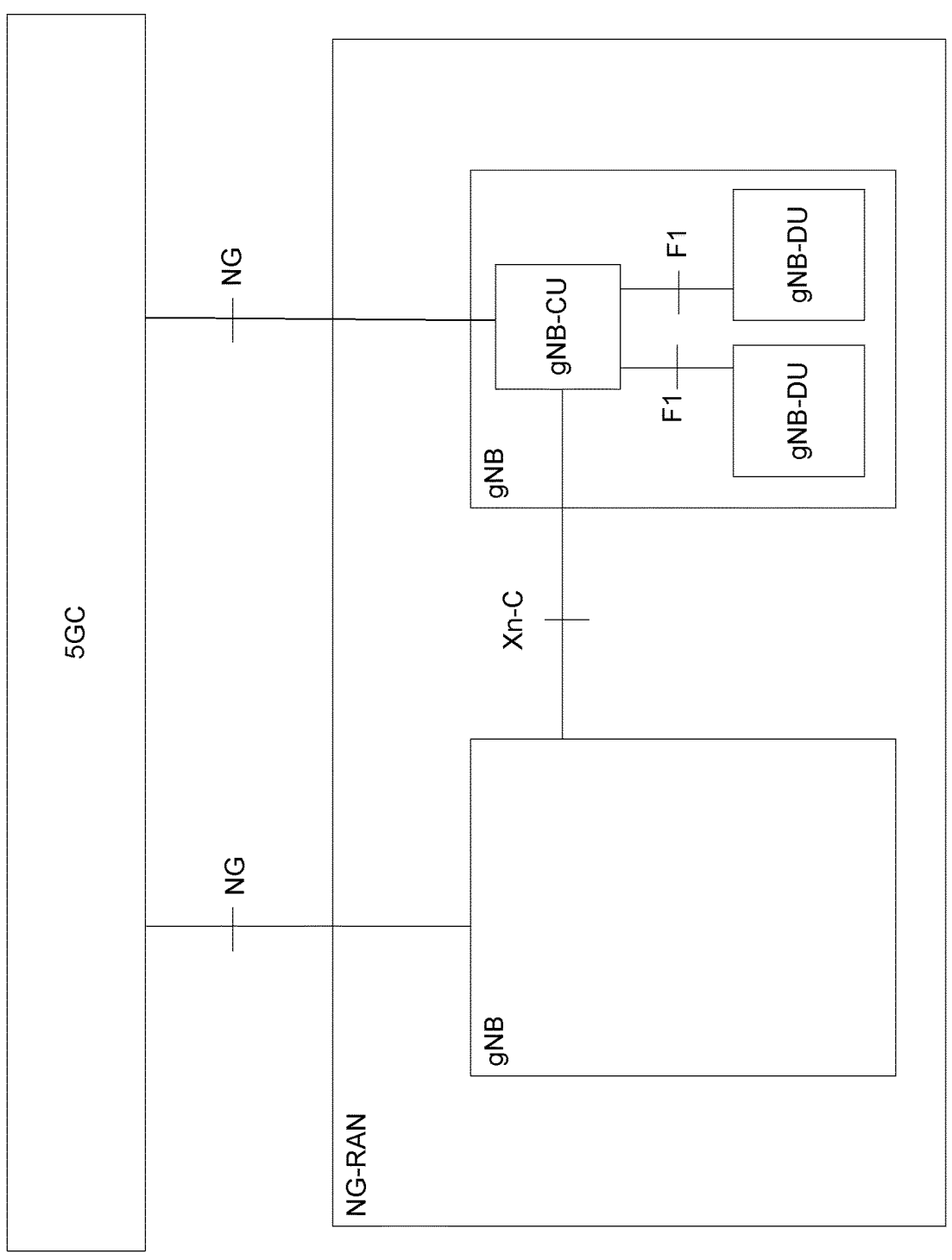
FIG. 2 is a block diagram of a 5G network architecture according to some embodiments.
Figure 3:
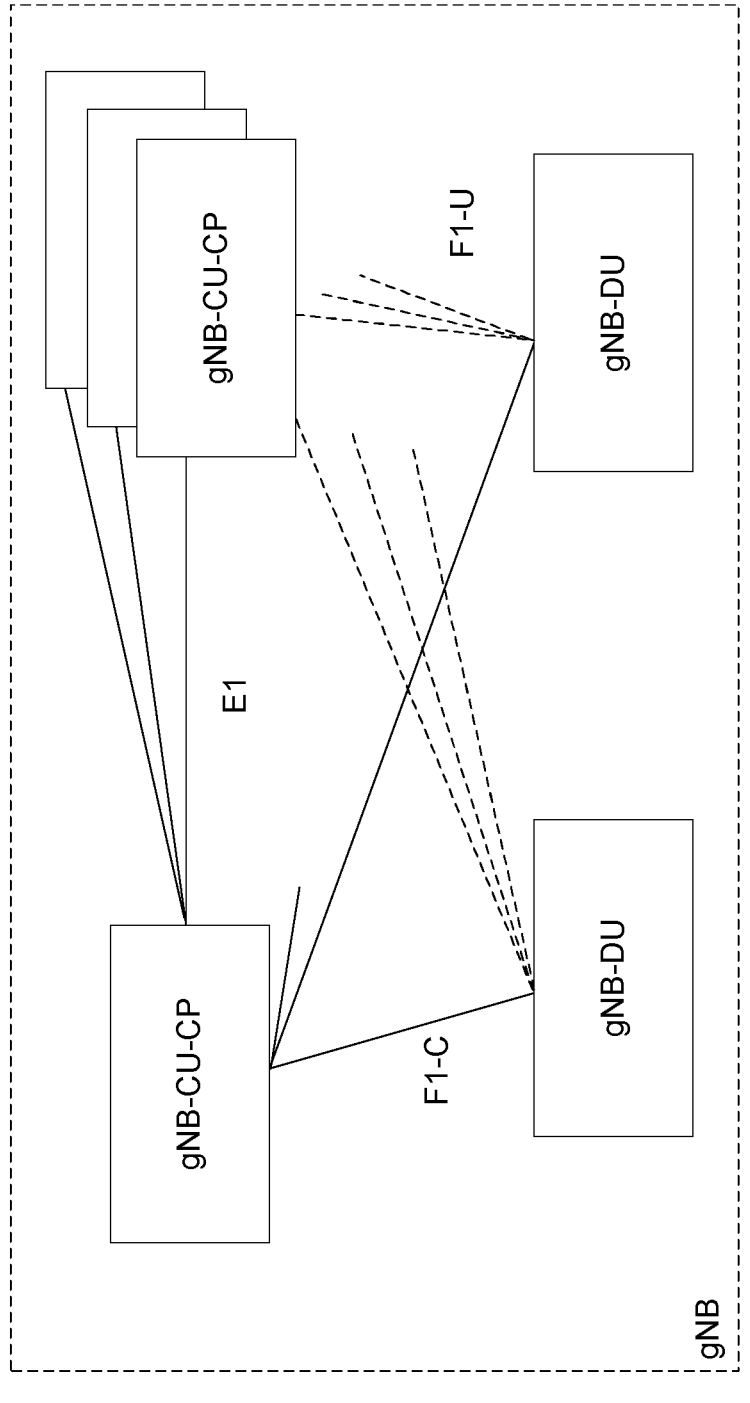
FIG. 3 is a block diagram of a disaggregated radio network node according to some embodiments.

The 5G RAN architecture is described in 3GPP TS 38.401 V16.2.0, NG-RAN; Architecture description, as shown in FIG. 2. The NG-RAN consists of a set of eNBs and gNBs connected to the 5G Core (5GC) through the NG. An eNB/gNB can support Frequency Division Duplex (FDD) mode, Time Division Duplex (TDD) mode, or dual mode operation. eNB/gNBs can be interconnected through the Xn. A gNB may consist of a gNB central unit (gNB-CU) and gNB distributed units (gNB-DUs). A gNB-CU and a gNB-DU are connected via F1 logical interface. One gNB-DU is connected to only one gNB-CU.

NG, Xn, and F1 are logical interfaces. For NG-RAN, the NG and Xn-C interfaces for a gNB, consisting of a gNB-CU and gNB-DUs, terminate in the gNB-CU. For E-UTRA New Radio Dual Connectivity (EN-DC), the S1-U and X2-C interfaces for a gNB, consisting of a gNB-CU and gNB-DUs, terminate in the gNB-CU. The gNB-CU and connected gNB-DUs are only visible to other gNBs and the 5GC as a gNB.

The F1 Application Protocol (F1AP) is specified in 3GPP TS 38.473 V16.2.0.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all Access and Mobility Functions (AMFs) within an AMF Region. The AMF Region is defined in 3GPP TS 23.501 V16.6.0.

The overall architecture for separation of gNB-CU-CP and gNB-CU-UP is depicted in 3. A gNB may consist of a gNB-CU-CP, multiple gNB-CU-Ups, and multiple gNB-DUs. The gNB-CU-CP is connected to the gNB-DU through the F1-C interface. The gNB-CU-UP is connected to the gNB-DU through the F1-U interface. The gNB-CU-UP is connected to the gNB-CU-CP through the E1 interface. One gNB-DU is connected to only one gNB-CU-CP. One gNB-CU-UP is connected to only one gNB-CU-CP.

For resiliency, a gNB-DU and/or a gNB-CU-UP may be connected to multiple gNB-CU-CPs by appropriate implementation. One gNB-DU can be connected to multiple gNB-CU-UPs under the control of the same gNB-CU-CP. One gNB-CU-UP can be connected to multiple DUs under the control of the same gNB-CU-CP. The connectivity between a gNB-CU-UP and a gNB-DU is established by the gNB-CU-CP using Bearer Context Management functions. The gNB-CU-CP selects the appropriate gNB-CU-UP(s) for the requested services for the UE. Data forwarding between gNB-CU-UPs during intra-gNB-CU-CP handover within a gNB may be supported by Xn-U.

The E1 interface provides support a number of procedures as described in 3GPP TS 38.463 v16.2.0.

The parameters exchanged during the E1 setup procedure (1) inform the CU-CP about the CU-UP's specific supported attributes that can be evaluated by the CU-CP when selecting specific CU-UP at user plane establishment for a particular UE.

As can be seen from bearer establishment procedures, (2) CU-CP establishes the bearer including a large set of parameters. Some parameters like QoS parameters depend on the bearer requirements. Hence the selection of the CU-UP takes into consideration support for specific CU-UP attributes. For example, one CU-UP can be optimized for Vehicle 2 Everything (V2x) services that are realized by some Single— Network Slice Selection Assistance Information(s) (S-NS-SAI(s)), while some other CU-UP may be wanted to be used for Mobile Broadband (MBB) realized over another S-NS-SAI(s). At bearer establishment, the CU-CP will then preferably select the CU-UPs accordingly.

To support the above, one UE may connect to several gNB-CU-UPs which belong to different security domains (see, for example, RP-191975 and S3-201381). A disaggregated gNB herein may include multiple CU-UPs according to various embodiments shown in FIGS. 4-6, as consistent with 3GPP TR 38.823 V16.0.0.

Figure 4:
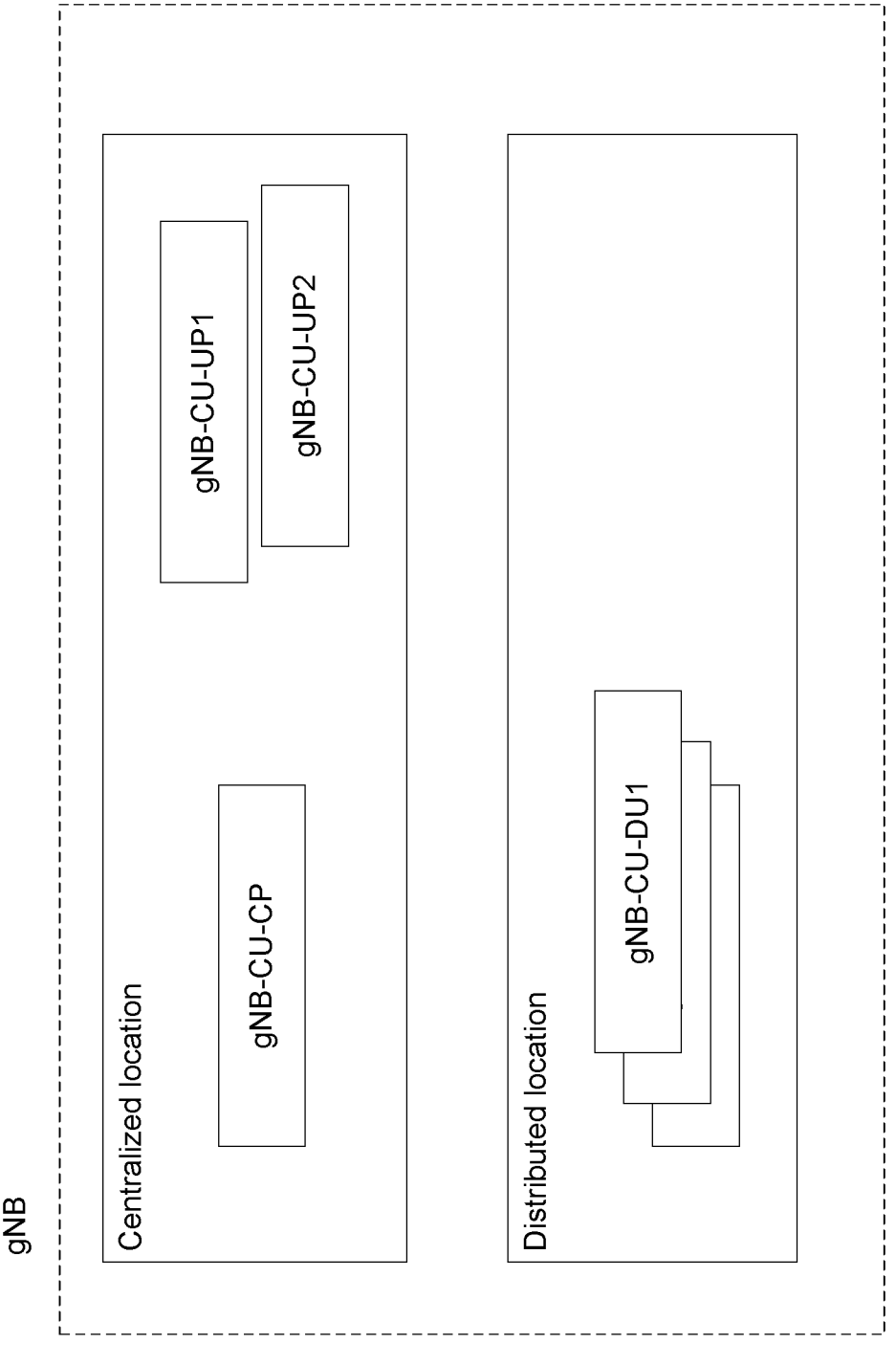
FIG. 4 is a block diagram of a disaggregated radio network node according to some embodiments where all CU-UPs are centralized in a single location.
Figure 5:
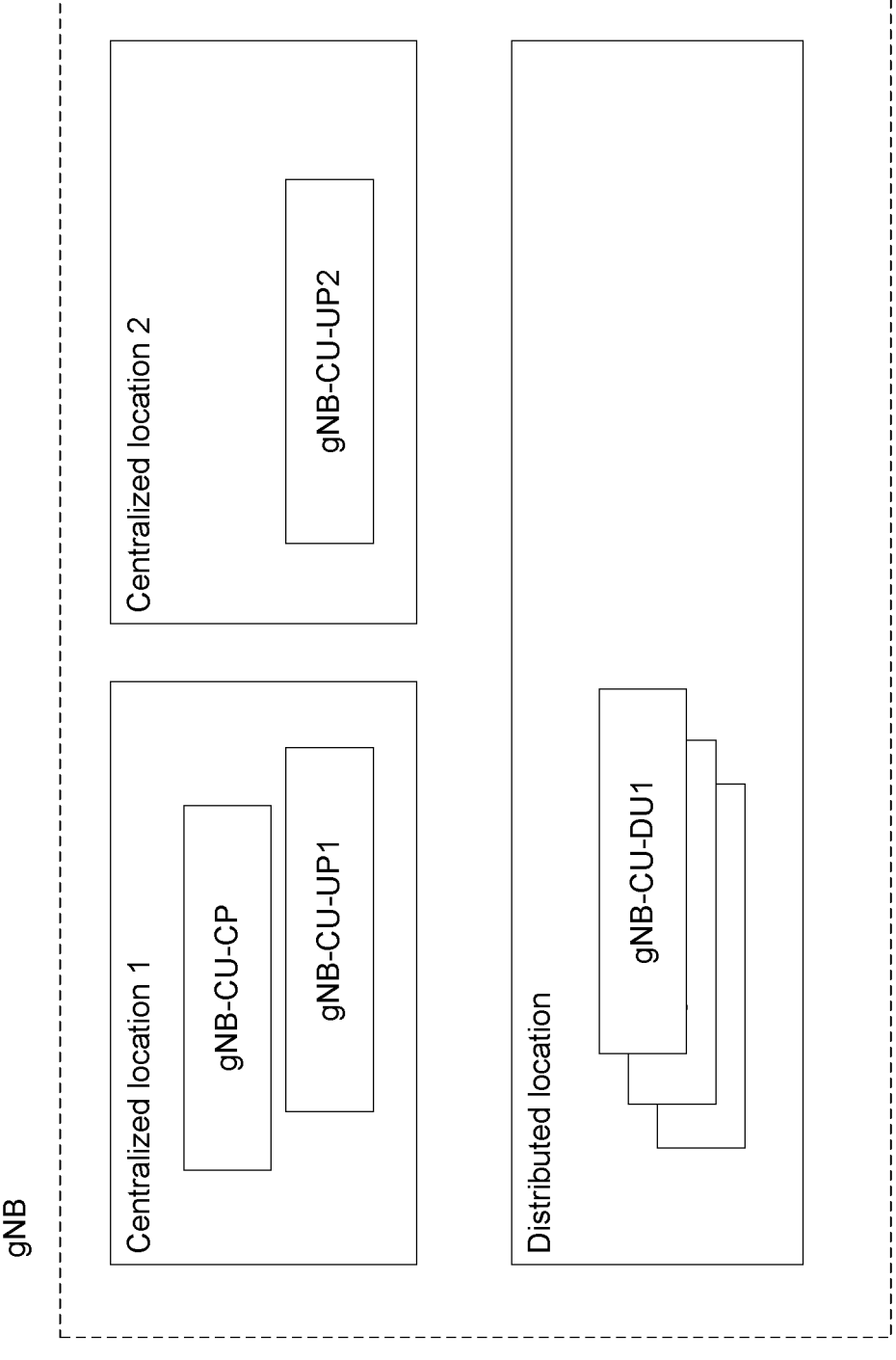
FIG. 5 is a block diagram of a disaggregated radio network node according to some embodiments where all CU-UPs are centralized, but in different locations.
Figure 6:
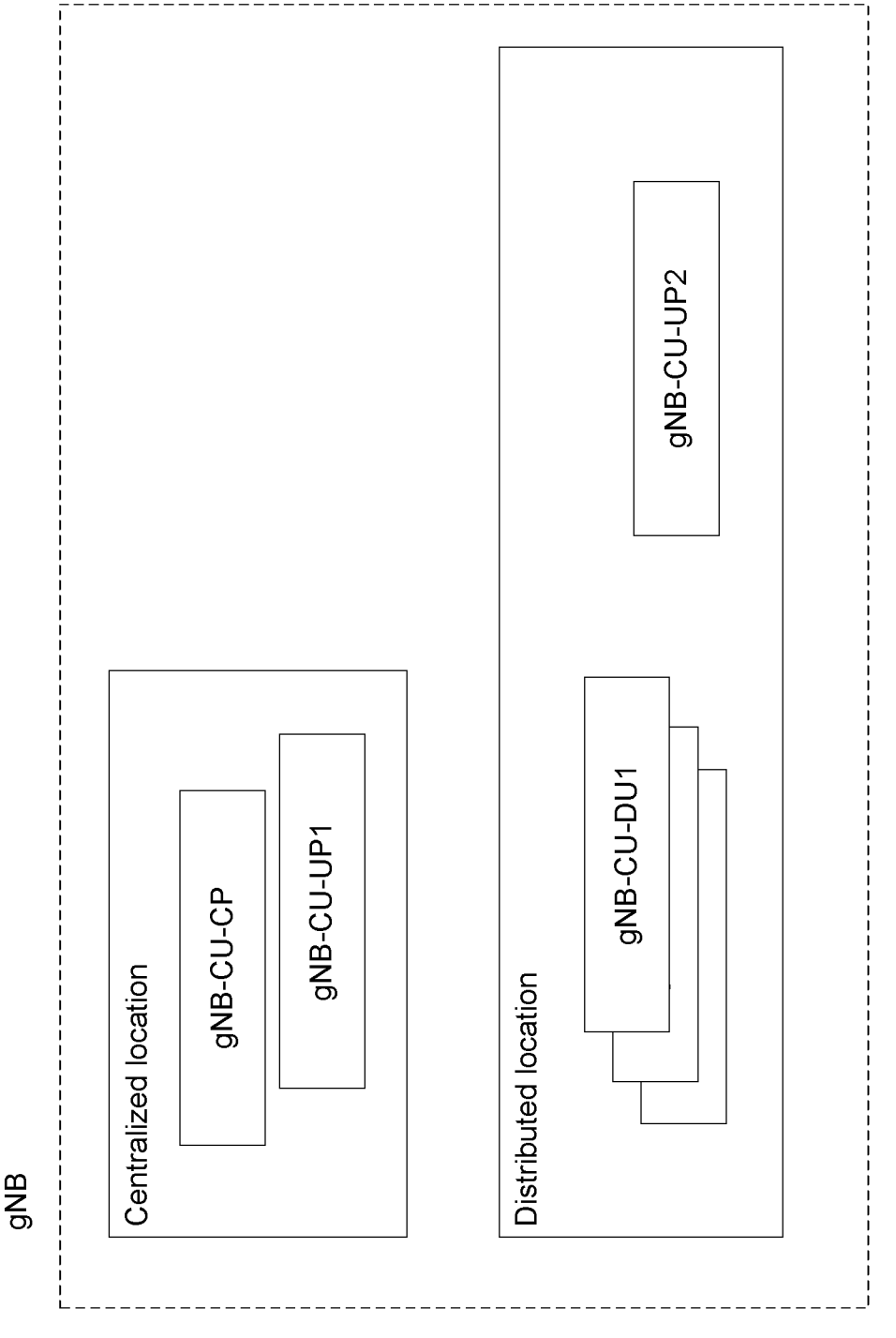
FIG. 6 is a block diagram of a disaggregated radio network node according to some embodiments where some CU-UP is centralized while others are distributed.

One option shown in FIG. 4 is that all CU-UPs are centralized in a single location. Another option shown in FIG. 5 is that all CU-UPs are centralized, but in different locations. Yet another option shown in FIG. 6 is that some CU-UP is centralized while others are distributed.

Given this, some embodiments herein address the need of a CU-UP to handle UE traffic that is security protected with the security key shared with the UE. There is one root key for protecting one UE's traffic. When there is only one CU-UP, then it uses the necessary security key which is acceptable. When there are multiple CU-UPs, then all of them would heretofore need to share the security key, which is unacceptable from a security point of view, because a compromise of one of CU-UP means that UE traffic handled by all of them could be compromised.

Indeed, even when all CU-UPs are centralized in a single location, the level of trust does not need to be same for all of them. Each of them may be virtualized with different security hardenings or handled by different slice providers. If the same security keys for UEs UP traffic are shared among all CU-UP instances, there is a threat that any breach in one of them means all of them are affected. The above threat is also applicable to CU-UPs centralized in different locations. The above threat is even clearer to mixed deployment of CU-UPs in centralized and distribution locations.

Certain aspects of the present disclosure and their embodiments may provide solutions to these or other challenges. Various embodiments herein ensure the same security key is not shared between different instances of CU-UPs. Some embodiments thereby facilitate the deployment of CU-Ups in different security domains. In particular, some embodiments support disaggregated gNB-CU-UPs to maintain the security principle of separate UP-keys per CU-UP instance.

Certain embodiments may provide one or more of the following technical advantage(s). The same security key is not shared between different instances of CU-UPs.

Various embodiments are described below to achieve multiple CU-UPs while keeping the security principle of not sharing UE related security keys in more than one CU-UP.

Figure 7:
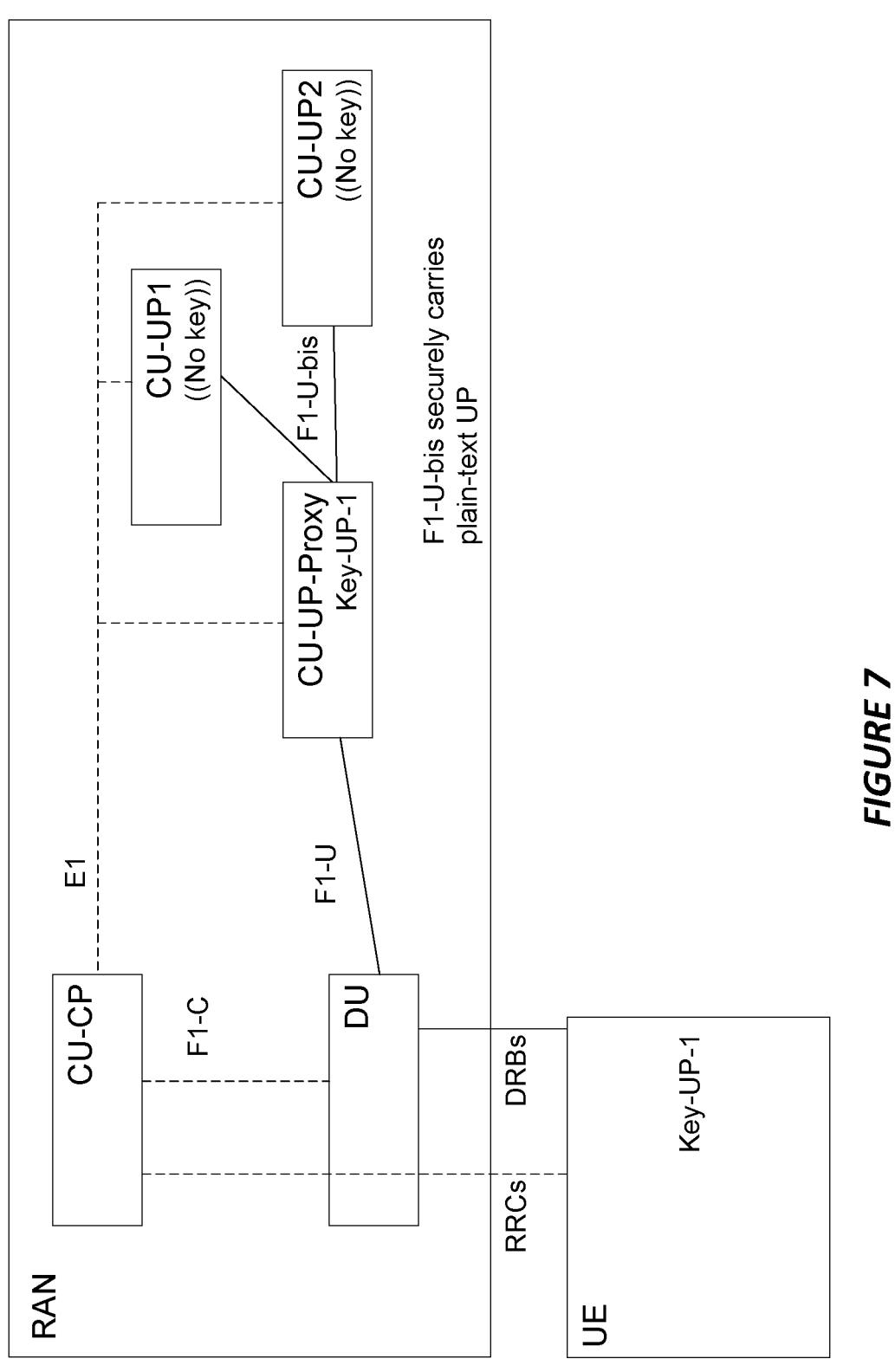
FIG. 7 is a block diagram of a disaggregated radio network node with a CU-UP-Proxy according to some embodiments.

FIG. 7 illustrates an example of Group A and/or Group AA Embodiments described within the EMBODIMENTS section herein. In FIG. 7, a new function called CU-UP-Proxy is introduced. The CU-UP-Proxy terminates security towards the UE and distributes UP traffic to multiple CU-UPs in secure links.

As shown, there are two CU-UPs, namely CU-UP1 and CU-UP2. The CU-UP-Proxy is placed between DU and CU-UP1/2. The interface between CU-UP-Proxy and CU-UP1/2 can be a new F1-U like interface, say F1-U-bis, that can be protected with technology like IP Security (IPsec) or Transport Layer Security (TLS).

The CU-UP-Proxy can be considered as a CU-UP supporting proxy capability. This capability is exposed to the CU-CP when setting up the E1 interface. One encoding possibility of this capability indication is shown below.

GNB-CU-UP E1 SETUP REQUEST: This message is sent by the gNB-CU-UP to transfer information for a TNL association. Direction: gNB-CU-UP® gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.53 | | YES | reject |
| gNB-CU-UP ID | M | | 9.3.1.15 | | YES | reject |
| gNB-CU-UP Name | O | | PrintableString (SIZE (1..150,...)) | Human readable name of the gNB-CU-UP. | YES | ignore |
| CN Support | M | | ENUMERATED (EPC. 5GC, both, ...) | | YES | reject |
| Supported PLMNs | | 1..< maxnoofSPLMNs> | | Supported PLMNs | YES | reject |
| >PLMN Identity | M | | 9.3.1.7 | | — | — |
| >Slice Support List | O | | 9.3.1.8 | Supported S-NSSAIs per PLMN. | — | — |
| >Extended Slice Support List | O | | 9.3.1.94 | Additional Supported S-NSSAIs per PLMN. | YES | reject |
| >NR CGI Support List | O | | 9.3.1.36 | Supported cells. | — | — |
| >QoS Parameters Support List | O | | 9.3.1.37 | Supported QOS parameters per PLMN. | — | — |
| >NPN Support Information | O | | 9.3.1.83 | | YES | reject |
| gNB-CU-UP Capacity | O | | 9.3.1.56 | | YES | ignore |
| Transport Network Layer Address Info | O | | 9.3.2.7 | | YES | ignore |
| Proxy support | O | | | | YES | ignore |

Similarly, for the case that E1 setup procedure is triggered by the CU-CP, the proxy indication can be added to the relevant message as shown as one example below:

GNB-CU-CP E1 SETUP RESPONSE: This message is sent by the gNB-CU-UP to transfer information for a TNL association. Direction: gNB-CU-UP® gNB-CU-CP communicate with the CU-UP-Proxy, i.e., for each DRB, the DL TNL Address information to be used on F1-U-bis as termination for the communication information at CU-UP-Proxy is to be used by CU-UP1 and CU-UP2.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.53 | | YES | reject |
| gNB-CU-UP ID | M | | 9.3.1.15 | | YES | reject |
| gNB-CU-UP Name | O | | PrintableString (SIZE(1.. 150,...)) | Human readable name of the gNB-CU-UP. | YES | ignore |
| CN Support | M | | ENUMERATED (EPC. 5GC, both, ...) | | YES | reject |
| Supported PLMNs | | 1..< maxnoofSPLMNs> | | Supported PLMNs | YES | reject |
| >PLMN Identity | M | | 9.3.1.7 | | — | — |
| >Slice Support List | O | | 9.3.1.8 | Supported S-NSSAIs per PLMN. | — | — |
| >Extended Slice Support List | O | | 9.3.1.94 | Additional Supported S-NSSAIs per PLMN. | YES | reject |
| >NR CGI Support List | O | | 9.3.1.36 | Supported cells. | — | — |
| >QOS Parameters Support List | O | | 9.3.1.37 | Supported QOS parameters per PLMN. | — | — |
| >NPN Support Information | O | | 9.3.1.83 | | YES | reject |
| gNB-CU-UP Capacity | O | | 9.3.1.56 | | YES | ignore |
| Transport Network Layer Address Info | O | | 9.3.2.7 | | YES | ignore |
| Proxy support | O | | | | YES | ignore |

At the Bearer Context Setup procedure, the CU-CP needs to link the entities in the CU-UP1 and CU-UP2 with the entities in the CU-UP proxy together. The following flow is one example of how this can be realized:

1. CU-CP establishes Bearer Context with CU-UP1 and CU-UP2. For each DRB, the CU-UP1- and CU-UP2 provide their UL TNL Address information to be used on F1-U-bis.
2. CU-CP establishes Bearer Context with CU-UP-Proxy. In this step, the CU-UP-Proxy is informed about the UL TNL Address information to be used on F1-U-bis towards the CU-UP1 and CU-UP2 respectively that were established in step 1. For each DRB, CU-UP-Proxy provides the DL TNL Address information to be used on F1-U-bis as termination for the communication with CU-UP1 and CU-UP2.
3. CU-CP modifies the Bearer Contexts in CU-UP1 and CU-UP2 by providing the information required to Security and Policy Management:

The CU-UP-Proxy obtains at least one security key Key-UP-1 for security processing UP traffic. This obtaining could be such that the CU-CP provides the Key-UP-1 to the CU-UP-Proxy using E1 interface or any new E1-like interface introduced in 3GPP. This security key could be directly used for security processing UP traffic or it could be a root key from which child keys are derived for security processing UP traffic. This security processing could be one or more of encryption/decryption, integrity protection/verification, and replay protection.

Similarly, the CU-UP-Proxy obtains security algorithms (not shown in FIG. 7) for processing UP traffic. These security algorithms could include one or more of algorithms for encryption/decryption, and integrity protection/verification.

Similarly, the CU-UP-Proxy obtains a security policy (not shown in FIG. 7) for processing UP traffic. This security policy could indicate if encryption/decryption, integrity protection/verification, and replay protection are enabled for UP traffic. This security policy could also indicate a maximum traffic rate supported by the UE.

Similarly, the CU-UP-Proxy obtains information on what types of UP traffic are to be routed to which CU-UP. For example, depending upon bearer IDs, IP addresses, transport protocol ports, transport protocol types, access points, etc., certain UP traffic may be forwarded to CU-UP1, while others are forwarded to CU-UP2.

Uplink Security Processing:

When the uplink UP traffic from UE reaches the CU-UP-Proxy, the CU-UP-Proxy security processes the UP traffic using keys based on the Key-UP-1. This security processing could include one or more of decryption, integrity verification, and replay protection. The CU-UP-Proxy could also do other non-security processing such as header decompression.

After security processing, the CU-UP-Proxy provides the all or parts of UP traffic to CU-UP1 and CU-UP2 depending upon information it had obtained about routing the UP traffic. The UP traffic that the CU-UP-Proxy provides to CU-UPs are plain-text traffic (not protected anymore with the keys used by the UE). Therefore, this traffic needs to be sent in F1-U like links that can be secured, for example using IPsec or TLS or WireGuard.

The CU-UP-Proxy could implement Packet Data Convergence Protocol (PDCP) protocol.

Downlink Security Processing:

When the downlink UP traffic from one or more CU-UPs reaches the CU-UP-Proxy, the CU-UP-Proxy security processes the UP traffic using keys based on the Key-UP-1. This security processing could include one or more of encryption, integrity protection, and replay protection. The CU-UP-Proxy could also do other non-security processing such as header compression.

After security processing, the CU-UP-Proxy provides the all or parts of UP traffic to UE. The UP traffic that the CU-UP-Proxy provides to UE is cipher-text traffic (protected with the keys used by the UE).

The CU-UP-Proxy could implement Packet Data Convergence Protocol (PDCP) protocol.

Placement of CU-UP-Proxy:

The CU-UP-Proxy could be co-located or offered as part of DU, CU-CP. It can also be a separate function or node. When co-located or offered by DU, this solution may be materialized by DU implementing PDCP protocol.

It can be placed in the same or a different security domain than CU-CP, CU, CU-UPs.

Other Considerations:

To support optimized data scheduling on the radio interface and efficient memory usage in the DU, flow control for each Data Radio Bearer (DRB) for a given UE is supported in current specifications. The flow control is managing the data flow from the CU-UP over the F1-U to the DU.

In some embodiments herein, there is flow control on the interface between the CU-UP-Proxy and the CU-UP1 as well as between the CU-UP-Proxy and the CU-UP2. This is assuming that one DRB is terminated in CU-UP1 and another in CU-UP2, respectively.

In other embodiments, though, there is no flow control on the interface between the CU-UP-Proxy and the CU-UP1 as well between the CU-UP-Proxy and the CU-UP2. This is assuming that one DRB is terminated in CU-UP1 and another in CU-UP2, respectively.

Figure 8:
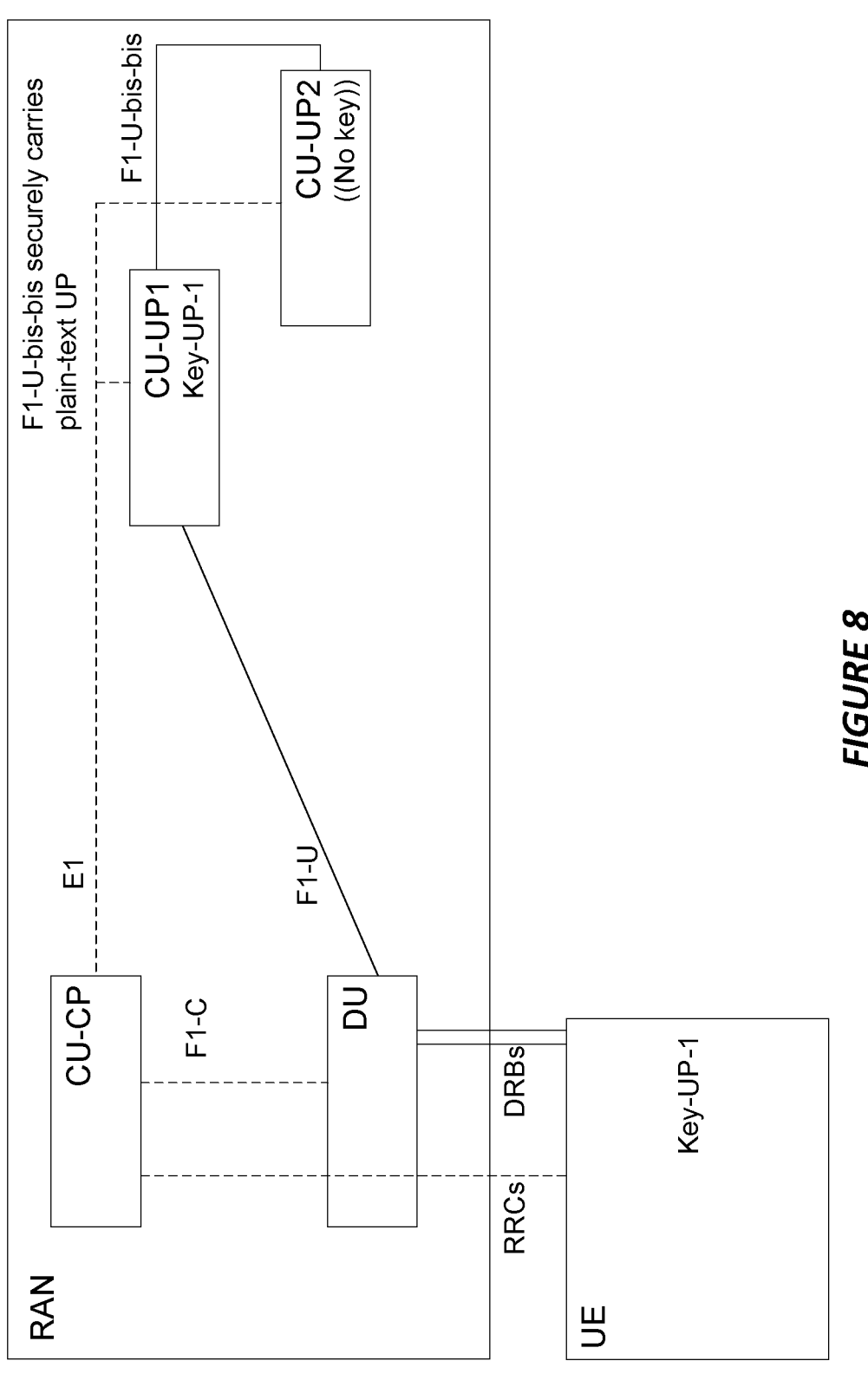
FIG. 8 is a block diagram of a disaggregated radio network node where, according to some embodiments, multiple CU-UPs are supported such that one CU-UP terminates security, consumes some UP traffic, and forwards other UP traffic to another CU-UP.

FIG. 8 illustrates an example of Group B and/or Group BB Embodiments described within the EMBODIMENTS section herein. In FIG. 8, multiple CU-UPs are supported such that one CU-UP terminates security, consumes some UP traffic, and forwards other UP traffic to another CU-UP.

As shown, there are multiple CU-UPs, namely CU-UP1 and CU-UP2. The interface between these CU-UPs can be a new F1-U like interface, say F1-U-bis-bis, that can be protected with technology like IPsec or TLS.

General Management Considerations:

The CU-UP operating in plain text mode can be considered as a CU-UP supporting plain text mode capability. This capability is exposed to the CU-CP when setting up the E1 interface. One possible encoding of this capability indication is shown below.

GNB-CU-UP E1 SETUP REQUEST: This message is sent by the gNB-CU-UP to transfer information for a TNL association. Direction: gNB-CU-UP® gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.53 | | YES | reject |
| gNB-CU-UP ID | M | | 9.3.1.15 | | YES | reject |
| gNB-CU-UP Name | O | | PrintableString (SIZE (1..150,...)) | Human readable name of the gNB-CU-UP. | YES | ignore |
| CN Support | M | | ENUMERATED (EPC. 5GC, both, ...) | | YES | reject |
| Supported PLMNs | | 1..<maxnoofSPLMNs> | | Supported PLMNs | YES | reject |
| >PLMN Identity | M | | 9.3.1.7 | | — | — |
| >Slice Support List | O | | 9.3.1.8 | Supported S-NSSAIs per PLMN. | — | — |
| >Extended Slice Support List | O | | 9.3.1.94 | Additional Supported S-NSSAIs per PLMN. | YES | reject |

-continued

| IE/Group Name | Presence | Range | IE type and reference | Semantics description | Criticality | Assigned Criticality |
|---|---|---|---|---|---|---|
| >NR CGI Support List | O | | 9.3.1.36 | Supported cells. | — | — |
| >Qos Parameters Support List | O | | 9.3.1.37 | Supported Qos parameters per PLMN. | — | — |
| >NPN Support Information | O | | 9.3.1.83 | | YES | reject |
| gNB-CU-UP Capacity | O | | 9.3.1.56 | | YES | ignore |
| Transport Network Layer Address Info | O | | 9.3.2.7 | | YES | ignore |
| Plain text mode support | O | | | | YES | ignore |

Similarly, for the case that E1 setup procedure is triggered by the CU-CP, the plain text mode support indication can be added to the relevant message as shown as one example below:

GNB-CU-CP E1 SETUP RESPONSE: This message is sent by the gNB-CU-UP to transfer information for a TNL association. Direction: gNB-CU-UP® gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.53 | | YES | reject |
| gNB-CU-UP ID | M | | 9.3.1.15 | | YES | reject |
| gNB-CU-UP Name | O | | PrintableString (SIZE(1.. 150,...)) | Human readable name of the gNB-CU-UP. | YES | ignore |
| CN Support | M | | ENUMERATED (EPC. 5GC, both, ...) | | YES | reject |
| Supported PLMNs | | 1..< maxnoofSPLMNs> | | Supported PLMNs | YES | reject |
| >PLMN Identity | M | | 9.3.1.7 | | — | — |
| >Slice Support List | O | | 9.3.1.8 | Supported S-NSSAIs per PLMN. | — | — |
| >Extended Slice Support List | O | | 9.3.1.94 | Additional Supported S-NSSAIs per PLMN. | YES | reject |
| >NR CGI Support List | O | | 9.3.1.36 | Supported cells. | — | — |
| >Qos Parameters Support List | O | | 9.3.1.37 | Supported QOS parameters per PLMN. | — | — |
| >NPN Support Information | O | | 9.3.1.83 | | YES | reject |

-continued

| IE/Group Name | Presence | Range | IE type and reference | Semantics description | Criticality | Assigned Criticality |
|---|---|---|---|---|---|---|
| gNB-CU-UP Capacity | O | | 9.3.1.56 | | YES | ignore |
| Transport Network Layer Address Info | O | | 9.3.2.7 | | YES | ignore |
| Plain text mode support | O | | | | YES | ignore |

At the Bearer Context Setup procedure, the CU-CP needs to link the entities in the CU-UP1 and CU-UP2 together. The following flow is one example how this can be realized:

1. CU-CP establishes Bearer Context with CU-UP2. The bearer context in the CU-UP2 is configured to operate in plain text mode. For each DRB, CU-UP2 provides the UL TNL Address information to be used on F1-U-bis by CU-UP1.
2. CU-CP establishes Bearer Context with CU-UP1 including for each DRB, the UL TNL Address information to be used on F1-U-bis for communication with CU-UP2. For each DRB, the CU-UP1 provides the DL TNL Address information to be used on F1-U-bis by CU-UP2.
3. CU-CP modifies the Bearer Contexts in CU-UP2 and provides for each DRB, the DL TNL Address information to be used on F1-U-bis by CU-UP2.

Security and Policy Management:

The CU-UP1 obtains at least one security key Key-UP-1 for security processing UP traffic. This obtaining could be such that the CU-CP provides the Key-UP-1 to the CU-UP1 using E1 interface or any new E1-like interface introduced in 3GPP. This security key could be directly used for security processing UP traffic, or it could be a root key from which child keys are derived for security processing UP traffic. This security processing could be one or more of encryption/decryption, integrity protection/verification, and replay protection.

Similarly, the CU-UP1 obtains security algorithms (not shown in figure) for processing UP traffic. These security algorithms could include one or more of algorithms for encryption/decryption and integrity protection/verification.

Similarly, the CU-UP1 obtains a security policy (not shown in figure) for processing UP traffic. This security policy could indicate if encryption/decryption, integrity protection/verification, and replay protection are enabled for UP traffic. This security policy could also indicate the maximum traffic rate supported by the UE.

Similarly, the CU-UP1 obtains information on what types of UP traffic are to be routed to which CU-UP2. For example, depending upon bearer IDs, IP addresses, transport protocol ports, transport protocol types, access points, etc., certain UP traffic may be forwarded to CU-UP2, while others can be handled by CU-UP1 itself.

CU-UP2 accepts plain-text UP traffic from CU-UP1. Plain-text UP traffic means UP traffic is not protected with the keys used by the UE. There can be transport layer protection using IPsec or TLS, but these protections do not use the keys used by the UE.

Uplink Security Processing:

When the uplink UP traffic from UE reaches the CU-UP1, the CU-UP1 security processes the UP traffic using keys based on the Key-UP-1. This security processing could include one or more of decryption, integrity verification, and replay protection. The CU-UP1 could also do other non-security processing such as header decompression.

After security processing, the CU-UP1 provides all or parts of the UP traffic to CU-UP2 depending upon information it had obtained about routing the UP traffic. The UP traffic that the CU-UP1 provides to CU-UP2 are plain-text traffic (not protected anymore with the keys used by the UE). Therefore, this traffic needs to be sent in F1-U like links that can be secured, for example using IPsec or TLS or Wire-Guard.

The CU-UP1 could implement Packet Data Convergence Protocol (PDCP) protocol.

Downlink Security Processing:

When the downlink UP traffic from CU-UP2 reaches the CU-UP1, the CU-UP1 security processes the UP traffic using keys based on the Key-UP-1. The CU-UP1 could also have downlink data on its own which are security processed by the CU-UP1. This security processing could include one or more of encryption, integrity protection, and replay protection. The CU-UP1 could also do other non-security processing such as header compression.

After security processing, the CU-UP1 provides all or parts of UP traffic to UE. The UP traffic that the CU-UP1 provides to UE is cipher-text traffic (protected with the keys used by the UE).

The CU-UP1 could implement a Packet Data Convergence Protocol (PDCP) protocol.

Placement of CU-UPs:

The CU-UP1 could be co-located or offered as part of DU, CU-CP. It can also be a separate function or node.

It can be placed in the same or different security domain as CU-CP, CU, CU-UPs.

Other Considerations:

To support optimized data scheduling on the radio interface and efficient memory usage in the DU, flow control for each Data Radio Bearer (DRB) for a given UE is supported in current specifications. The flow control is managing the data flow from the CU-UP over the F1-U to the DU.

In one embodiment, there is flow control on the interface between the CU-UP1 and the CU-UP2. In another embodiment, there is no flow control on the interface between the CU-UP1 and the CU-UP2 as well between the CU-UP-Proxy and the CU-UP2.

FIG. 9 illustrates an example of FIG. 1, as well as Group X Embodiments described within the EMBODIMENTS section herein, e.g., Embodiment X4.

In dual connectivity (DC), the UE has one radio resource control (RRC) state based on the master node (MN) RRC. Each radio node, however, has its own RRC entity which can generate RRC protocol data units (PDUs) to be sent to the UE. RRC PDUs generated by the secondary node (SN) can be transported to the UE via MN or SN, except for the initial SN RRC configuration which is sent via MN. This means with the current DC architecture there is not one RRC entity involved, but two.

In the following it is assumed without loss of generality that MN and SN RRC entities are handled by the same CU-CP. However, it is appreciated that the SN RRC entity could be with a different CU-CP.

To avoid multiple CU-UPs sharing the same security keys, the CU-CP configures DC with master cell group (MCG) and secondary cell group (SCG) with different DUs with connections to separate CU-UPs for MN and SN bearers respectively, such that some UP traffic are sent to one CU-UP and others are sent to another CU-UP.

That is, DC is used to ensure that multiple CU-UPs have separate security keys. Each CU-UP terminates respective PDCP security towards the UE and it is ensured that multiple CU-UPs have separate security keys. In some embodiments, security handling of DC shall be according to clause 6.10 of 3GPP TS 33.501 V16.4.0.

The dual CU-UP with separate keys based on DC can be generalized to multi CU-UP with separate keys by extending Dual Connectivity (DC) to Multi-Connectivity (MC) with more than two nodes (MN, SN1, SN2, and so forth) and more than two cell groups (MCG, SCG1, SCG2, and so forth).

FIG. 10 illustrates another example of FIG. 1, as well as Group X Embodiments described within the EMBODIMENTS section herein, e.g., Embodiment X6.

As a variant of FIG. 9 above, the CU-CP configures DC with MCG and SCG with the same DU with connections to separate CU-UPs for MN and SN bearers, respectively, such that some UP traffic are sent to one CU-UP and others are sent to another CU-UP.

In some embodiments where DC is configured with the same DU handling MCG and SCG (i.e., the same DU serving as both MN and SN), the CU-CP ensures MN and SN contexts for the UE can be distinguished. For example, by assigning/using different UE context identifiers for MN and SN roles of the DU to enable DU to distinguish MN and SN contexts for the UE. UE context identifier(s) could for example comprise one or more of Radio Network Temporary Identifier (RNTI), Cell RNTI (C-RNTI), CU endpoint identifier (for example, gNB-CU UE F1AP ID), and DU endpoint identifier (for example, gNB-DU UE F1AP ID).

In some embodiments, a field or information element (IE) is added in, e.g., the UE context, F1 signaling, Uu signaling and/or a Uu UP PDU header (for instance the PDCP PDU header) to distinguish MN and SN contexts/roles/associations or CU-UP association. The field or IE could comprise, e.g., an index (for instance 0 for MN, 1 for SN or SN1, 2 for SN2, and so forth), a value associated with the instance or role of the DU, a value associated with a specific CU-UP, or another discriminator; e.g., "MN" or "SN".

In some embodiments, the F1-C interfaces pertaining to MN and SN roles of the gNB are combined or coupled; e.g., by means of:

using the same CU endpoint identifier and/or DU endpoint identifier with a new discriminator in the F1-AP for F1-Cs pertaining to MN and SN roles of the gNB, respectively;

using the same gNB-CU UE F1AP ID and/or gNB-DU UE F1AP ID with a new discriminator in the F1-AP for F1-Cs pertaining to MN and SN roles of the gNB, respectively; or using a predetermined relation between CU endpoint identifiers and/or between DU endpoint identifiers for F1-Cs pertaining to MN and SN roles of the gNB, respectively.

using a predetermined relation between gNB-CU UE F1AP IDs and/or between gNB-DU UE F1AP IDs for F1-Cs pertaining to MN and SN roles of the gNB, respectively.

For instance, odd IDs can be used for an MN role and even IDs for an SN role.

The relation between MN and SN identifiers can be on the form:

$$Y=X+(K \bmod N)+M,$$

where Y is the ID related to the SN role, X is the ID related to MN role, K is an index (e.g., 0 for MN, 1 for SN or SN1, 2 for SN2, and so forth), N is the combined number of supported MN and SNs, and M is an offset.

In some embodiments, when MN and SN bearers are served by the same DU, the CU-CP(s) ensures different radio bearer (RB) identifiers and/or logical channel identifiers are assigned and used for MN and SN bearers, respectively, such that the UE and the DU can distinguish MN and SN operation and events and data can be routed to the relevant CU-UP instance.

In some embodiments, when MN and SN bearers are served by the same DU, the CU-CP configures the UE and the DU with identifiers or indices corresponding to different CU-UPs. The UE and/or the DU includes the identifier or index associated with the CU-UP handling the bearer with the transmission of associated data and/or signaling.

FIG. 11 illustrates yet another example of FIG. 1, as well as Group X Embodiments described within the EMBODIMENTS section herein, e.g., Embodiment X7.

As a variant of FIGS. 9 and 10, the CU-CP configures DC with MCG and SCG with the same DU and where one or more cells may be part of both MCG and SCG with connections to separate CU-UPs for MN and SN bearers, respectively, such that some UP traffic are sent to one CU-UP and others are sent to another CU-UP.

In some embodiments, when MN and SN bearers are served on the same cell, the CU-CP(s) ensures different UE identifiers (e.g., different RNTIs or C-RNTIs) are assigned and used with MN (MCG) and SN (SCG), such that the UE and the DU can distinguish MN and SN operation and events.

In some embodiments, when MN and SN bearers are served on the same cell, the CU-CP(s) ensures different RB identifiers and/or logical channel identifiers are assigned and used for MN and SN bearers, respectively, such that the UE and the DU can distinguish MN and SN operation and events and data can be routed to the relevant CU-UP instance.

In some embodiments, when MN and SN bearers are served on the same cell, the CU-CP configures the UE and the DU with identifiers or indices corresponding to different CU-UPs. The UE and/or the DU includes the identifier or index associated with the CU-UP handling the bearer with the transmission of associated data.

Figure 12:
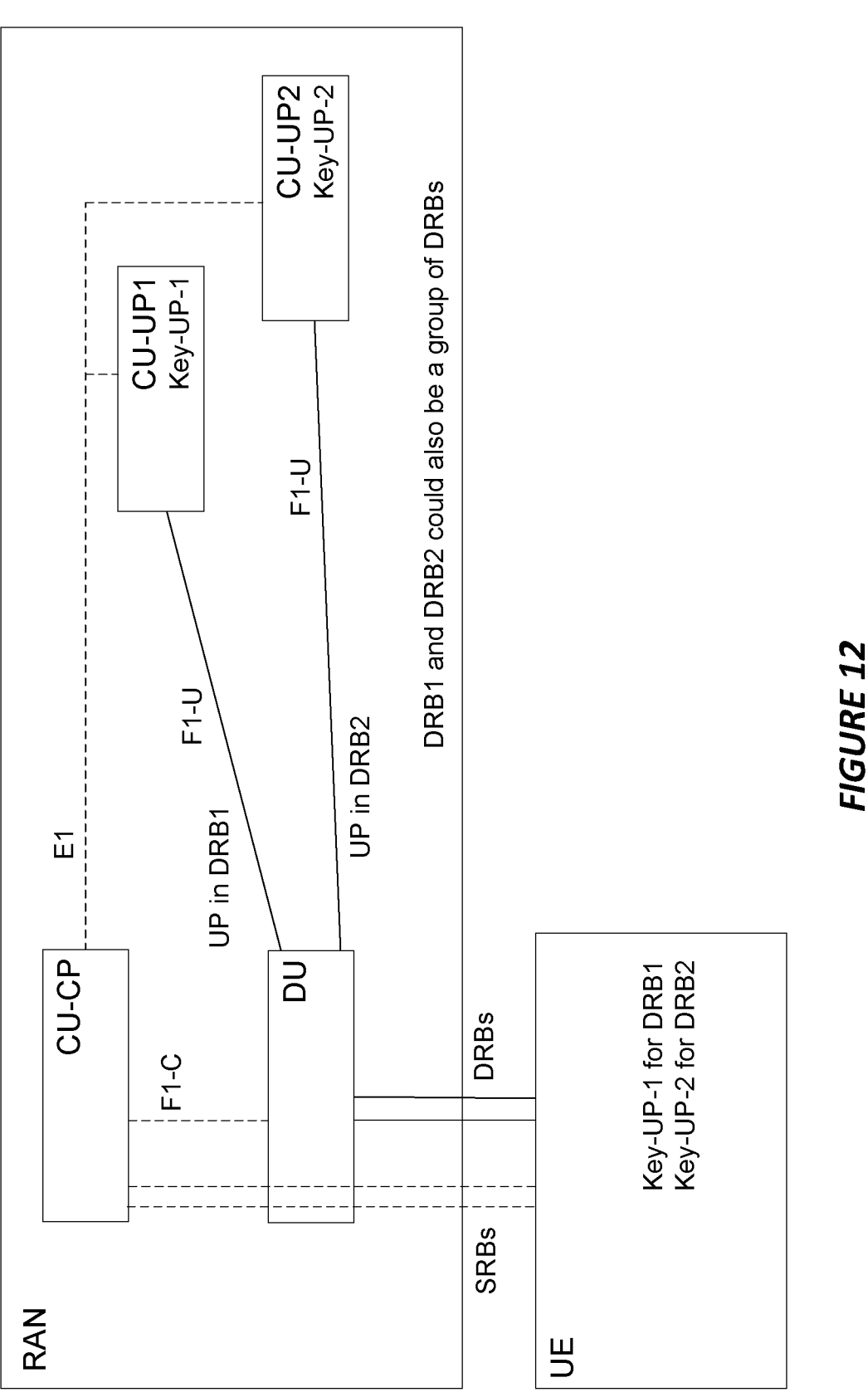
FIG. 12 is a block diagram of a disaggregated radio network node where, according to some embodiments, the UE has separate keys per DRB or per CU-UP.

FIG. 12 illustrates an example of Group Y and/or Group YY Embodiments described within the EMBODIMENTS section herein. In FIG. 12, the UE has separate keys per DRB or per CU-UP. Each DRB's security terminates in one of the CU-UPs.

As shown in FIG. 12, separate DRBs are forwarded by DU to separate CU-UPs. It could also be that groups of DRBs are forwarded to CU-UPs.

The separate keys could be materialized with the help of core network (CN), not shown in the diagram, or by RAN itself.

Security and Policy Management:

The CU-UPs, i.e., CU-UP1 and CU-UP2, obtain security key Key-UP-1 and Key-UP-2, respectively, for security processing UP traffic. This obtaining could be such that the CU-CP provides the keys to the CU-UPs using E1 interface or any new E1-like interface introduced in 3GPP. These security keys could be directly used for security processing UP traffic, or it could be a root key from which child keys are derived for security processing UP traffic. This security processing could be one or more of encryption/decryption, integrity protection/verification, and replay protection.

Similarly, the CU-UPs obtain security algorithms (not shown in figure) for processing UP traffic. These security algorithms could include one or more of algorithms for encryption/decryption, and integrity protection/verification.

Similarly, the CU-UPs obtain security policy (not shown in figure) for processing UP traffic. This security policy could indicate if encryption/decryption, integrity protection/ verification, and replay protection are enabled for UP traffic. This security policy could also indicate maximum traffic rate supported by the UE.

The DU obtains information on how UP traffic are to be routed to which CU-UPs such that a certain DRB is routed to one CU-UP, e.g., DRB1 to CU-UP1, and DRB2 to CU-UP2. This obtaining could be such that the CU-CP or core network (like AMF access and mobility management function, SMF session management function, SEAF security anchor function) provides the information via F1-C like or NG-AP like interfaces.

The UE obtains information on how to security process the DRBs. This obtaining could be such that the CU-CP or core network (like AMF access and mobility management function, SMF session management function, SEAF security anchor function) provides the information via RRC-like or NAS-like (non-access stratum like) protocols. The information could comprise keys for separate DRBs, security algorithm for DRBs, and security policy for DRBs.

Uplink Security Processing:

The UE security processes the UP traffic using keys based on the Key-UP-1 and Key-UP-2 for DRB1 and DRB2, respectively. This security processing could include one or more of decryption, integrity verification, and replay protection. The UE could also do other non-security processing such as header decompression.

Similarly, the CU-UPs, i.e., CU-UP1 and CU-UP2, security process the UP traffic using keys based on the Key-UP-1 and Key-UP-2.

The UE and the CU-UPs could implement Packet Data Convergence Protocol (PDCP) protocol.

Downlink Security Processing:

The CU-UPs, i.e., CU-UP1 and CU-UP2 security process the UP traffic using keys based on the Key-UP-1 and Key-UP-2, respectively. This security processing could include one or more of decryption, integrity verification, and replay protection. The UE could also do other non-security processing such as header decompression.

Similarly, the UE security processes the UP traffic using keys based on the Key-UP-1 and Key-UP-2.

The UE and the CU-UPs could implement a Packet Data Convergence Protocol (PDCP).

Placement of CU-UPs:

The CU-UPs could be co-located or offered as part of DU, CU-CP. They can also be separate functions or nodes.

They can be placed in the same or different security domains as CU-CP, CU, CU-UPs.

Although some embodiments have been described in the context of a 5G network, embodiments herein are not limited to 5G and are applicable for 4G or future generation of mobile networks. Accordingly, although some embodiments are described using 5G terminology, this is done without loss of generality.

In view of the above modifications and variations, FIG. 13 illustrates a method performed by a central unit user plane, CU-UP, proxy configured to serve as a proxy for multiple CU-UPs of a disaggregated radio network node. The method comprises transmitting and/or receiving user plane traffic, for a certain wireless device served by the multiple CU-UPs, on an interface between the CU-UP proxy and a distributed unit, DU, of the disaggregated radio network node (Block 1300). The method also comprises performing, based on a user plane security key for the certain wireless device, security processing of the user plane traffic that is transmitted and/or received on the interface (Block 1310).

In some embodiments, the security processing is performed at a Packet Data Convergence Protocol, PDCP, layer.

In some embodiments, the security processing of the user plane traffic includes downlink security processing and/or uplink security processing. In this case, the downlink security processing includes encrypting, integrity protecting, and/or replay protecting the user plane traffic to be transmitted on the interface, and the uplink security processing includes decrypting and/or verifying an integrity and replay protection of user plane traffic received on the interface.

In some embodiments, the method further comprises receiving the user plane security key, or one or more child security keys derived therefrom, from a central unit control plane, CU-CP, of the disaggregated radio network node (Block 1305).

In some embodiments, the method further comprises transmitting and/or receiving user plane traffic for different ones of the multiple CU-UPs on different respective interfaces between the CU-UP proxy and the multiple CU-UPs (Block 1320). In one or more of these embodiments, the security processing of the user plane traffic is performed at a first layer. In this case, the method further comprises protecting user plane traffic transmitted and/or received on the different respective interfaces between the CU-UP proxy and the multiple CU-UPs at a second layer.

In some embodiments, performing security processing of the user plane traffic for the multiple CU-UPs comprises terminating security of the user plane traffic at a PDCP layer.

In some embodiments, the user plane security key is common to or shared by the multiple CU-UPs, and the user plane security key is shared between the wireless device and the disaggregated radio network node.

FIG. 14 shows a method performed by a network node according to other embodiments. The method comprises configuring a central unit user plane, CU-UP, proxy as a proxy for multiple CU-UPs that are CU-UPs of a disaggregated radio network node and that serve a certain wireless device (Block 1400).

In some embodiments, configuring a CU-UP proxy comprises configuring an interface between the CU-UP proxy and a distributed unit, DU, of the disaggregated radio network node In this case, the interface is configured as an interface on which user plane traffic, for the certain wireless device served by the multiple CU-UPs, is to be transmitted and/or received. In one or more of these embodiments, configuring a CU-UP proxy comprises configuring the CU-UP proxy with a user plane security key for the certain wireless device, or one or more child keys derived therefrom, based on which the CU-UP proxy is to perform security processing of the user plane traffic that is transmitted and/or received on the interface. In one or more of these embodiments, the security processing is to be performed at a Packet Data Convergence Protocol, PDCP, layer.

In some embodiments, the method further comprises configuring different interfaces between the CU-UP proxy and different respective ones of the multiple CU-UPs, on which user plane traffic for the certain wireless device is to be transmitted and/or received (Block 1410). In one or more of these embodiments, the method comprises configuring the CU-UP proxy with a user plane security key for the certain wireless device, or one or more child keys derived therefrom, based on which the CU-UP proxy is to perform security processing of the user plane traffic that is transmitted and/or received on the interface. In this case, the security processing is configured to be performed at a first layer, and configuring user plane traffic transmitted and/or received on the different respective interfaces between the CU-UP proxy and the multiple CU-UPs to be protected at a second layer. In one or more of these embodiments, the user plane security key is common to or shared by the multiple CU-UPs, and the user plane security key is shared between the wireless device and the disaggregated radio network node.

FIG. 15 shows a method performed by a first central unit user plane, CU-UP, of a disaggregated radio network node that comprises the first CU-UP and a second CU-UP according to yet other embodiments. The method comprises transmitting and/or receiving user plane traffic, for a certain wireless device served by both the first CU-UP and the second CU-UP, on an interface between the first CU-UP and a distributed unit, DU, of the disaggregated radio network node (Block 1500). The method also comprises performing, based on a user plane security key for the certain wireless device, security processing of the user plane traffic transmitted and/or received on the interface (Block 1510).

In some embodiments, the security processing is performed at a Packet Data Convergence Protocol, PDCP, layer.

In some embodiments, the security processing of the user plane traffic includes downlink security processing and/or uplink security processing. In this case, the downlink security processing includes encrypting, integrity protecting, and/or replay protecting the user plane traffic to be transmitted on the interface, and the uplink security processing includes decrypting and/or verifying an integrity and replay protection of user plane traffic received on the interface.

In some embodiments, the method further comprises receiving the user plane security key, or one or more child security keys derived therefrom, from a central unit control plane, CU-CP, of the disaggregated radio network node.

In some embodiments, the method further comprises consuming a part of the user plane traffic that is for the first CU-UP and that is received on the interface between the first CU-UP and the DU (Block 1520), and forwarding, to the second CU-UP on an interface between the first CU-UP and the second CU-UP, another part of the user plane traffic that is for the second CU-UP and that is received on the interface between the first CU-UP and the DU (Block 1530).

In some embodiments, the method further comprises receiving, from the second CU-UP on an interface between the first CU-UP and the second CU-UP, user plane traffic that is for the second CU-UP (Block 1540), and transmitting, on the interface between the first CU-UP and the DU, the user plane traffic received from the second CU-UP together with user plane traffic for the first CU-UP (Block 1550).

In some embodiments, the security processing of the user plane traffic is performed at a first layer. In this case, the method further comprises protecting, at a second layer, user plane traffic that is for the second CU-UP and that is transmitted and/or received on an interface between the first CU-UP and the second CU-UP.

In some embodiments, performing security processing of the user plane traffic comprises terminating security of the user plane traffic at a PDCP layer.

In some embodiments, the user plane security key is common to or shared by the first and second CU-UPs, and the user plane security key is shared between the wireless device and the disaggregated radio network node.

FIG. 16 shows a method performed by a network node configured for use in a wireless communication network. The method comprises configuring multiple central unit user planes, CU-UPs, 14-1UP of a disaggregated radio network node 14 to handle different respective data radio bearers 16-1 . . . 16-N of a wireless device 12 in multi-connectivity operation, with security processing of user plane traffic by different CU-UPs 14-1UP being based on different respective security keys 18.

In some embodiments, the method further comprises making a decision to perform configuring multiple CU-UPs 14-1UP. In this case, the decision is made based on at least one of any one or more of a load on the wireless communication network 10 or on the disaggregated radio network node 12, a type of the user plane traffic, a time of day, and an amount of the user plane traffic.

In some embodiments, the method further comprises configuring different distributed units, DUs, 14-2 of the disaggregated radio network node 14 to serve different respective ones of the data radio bearers 16-1 . . . 16-N.

In some embodiments, the security processing is performed at a Packet Data Convergence Protocol, PDCP, layer.

In some embodiments, the security processing of the user plane traffic includes downlink security processing and/or uplink security processing. In this case, the downlink security processing includes encrypting, integrity protecting, and/or replay protecting the user plane traffic in a downlink direction, and the uplink security processing includes decrypting and/or verifying an integrity and replay protection of user plane traffic in an uplink direction.

FIG. 17 shows a method performed by a wireless device 12. The method comprises transmitting and/or receiving user plane traffic for the wireless device 12 via multiple data radio bearers 16-1 . . . 16-N served by multiple respective central unit user planes, CU-UPs, 14-1UP of a disaggregated radio network node 14 (Block 1700), and performing, based on user plane security keys 18 that are different for the different data radio bearers 16-1 . . . 16-N and/or for the different CU-UPs 14-1UP, security processing of the user plane traffic that is transmitted and/or received (Block 1710).

In some embodiments, the method further comprises receiving, from a network node 20, signaling indicating the user plane security keys 18 for the different data radio bearers and/or the different CU-UPs 14-1UP, and/or indicating which of the security keys 18 is to be used for which of the different data radio bearers 16-1 . . . 16-N and/or for which of the different CU-UPs 14-1UP (Block 1705).

In some embodiments, the different data radio bearers 16-1 . . . 16-N belong to different respective groups of data radio bearers, and the security keys 18 are different for different groups of data radio bearers 16-1 . . . 16-N.

In some embodiments, the security processing is performed at a Packet Data Convergence Protocol, PDCP, layer.

In some embodiments, the security processing of the user plane traffic includes downlink security processing and/or uplink security processing. In this case, the uplink security processing includes encrypting, integrity protecting, and/or replay protecting the user plane traffic transmitted in an uplink direction, and the downlink security processing includes decrypting and/or verifying an integrity and replay protection of user plane traffic received in a downlink direction.

In some embodiments, performing security processing comprises performing security processing of the user plane traffic that is transmitted or received over a first radio bearer of the multiple data radio bearers 16-1 . . . 16-N, based on a first user plane security key for the first data radio bearer and/or for a first CU-UP. Performing security processing also comprises performing security processing of the user plane traffic that is transmitted or received over a second radio bearer of the multiple data radio bearers 16-1 . . . 16-N, based on a second user plane security key for the second data radio bearer and/or for a second CU-UP.

FIG. 18 shows a method performed by a network node 20 configured for use in a wireless communication network 10. The method comprises configuring user plane traffic for a certain wireless device 12 to be transmitted and/or received via multiple data radio bearers 16-1 . . . 16-N served by multiple respective central unit user planes, CU-UPs, 14-1UP of the disaggregated radio network node 14 (Block 1800). The method also comprises configuring security processing of the user plane traffic that is transmitted and/or received to be performed based on user plane security keys 18 that are different for the different data radio bearers 16-1 . . . 16-N and/or for the different CU-UPs 14-1UP (Block 1810).

In some embodiments, the method further comprises making a decision to perform configuring of the user plane traffic and configuring of the security processing, based on at least one of any one or more of a load on the wireless communication network 10 or on the disaggregated radio network node 14, a type of the user plane traffic, a time of day, and an amount of the user plane traffic (Block 1805).

In some embodiments, the method comprises configuring the certain wireless device 12 to transmit and/or receive the user plane traffic for the certain wireless device 12 via the multiple data radio bearers 16-1 . . . 16-N, configuring the certain wireless device 12 with the user plane security keys 18 for the different data radio bearers 16-1 . . . 16-N and/or for the different CU-UPs 14-1UP, or configuring the certain wireless device 12 with one or more parameters from which to derive the user plane security keys 18 (Block 1820).

In some embodiments, the method comprises configuring different distributed units, DUs, 14-2 of the disaggregated radio network node 14 to transmit and/or receive the user plane traffic for the certain wireless device 12 via the multiple data radio bearers 16-1 . . . 16-N (Block 1830). Additionally or alternatively, the method comprises configuring the different CU-UPs 14-1UP with different respective ones of the user plane security keys 18, or configuring the different CU-UPs 14-1UP with one or more parameters from which to derive different respective ones of the user plane security keys 18 (Block 1840).

In some embodiments, the different data radio bearers 16-1 . . . 16-N belong to different respective groups of data radio bearers, and the security keys 18 are different for different groups of data radio bearers.

In some embodiments, the security processing is configured to be performed at a Packet Data Convergence Protocol, PDCP, layer.

Embodiments herein also include corresponding apparatuses. Embodiments herein for instance include a wireless device 12 configured to perform any of the steps of any of the embodiments described herein for the wireless device 12.

Embodiments also include a wireless device 12 comprising processing circuitry and power supply circuitry. The processing circuitry is configured to perform any of the steps of any of the embodiments described herein for the wireless device 12 The power supply circuitry is configured to supply power to the wireless device 12.

Embodiments further include a wireless device 12 comprising processing circuitry. The processing circuitry is configured to perform any of the steps of any of the embodiments described herein for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described herein for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described herein for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node configured to perform any of the steps of any of the embodiments described herein for the network node, e.g., network node 20 in FIG. 1.

Embodiments also include a network node comprising processing circuitry and power supply circuitry. The processing circuitry is configured to perform any of the steps of any of the embodiments described herein for the network node, e.g., network node 20 in FIG. 1. The power supply circuitry is configured to supply power to the network node.

Embodiments further include a network node comprising processing circuitry. The processing circuitry is configured to perform any of the steps of any of the embodiments described herein for the network node, e.g., network node 20 in FIG. 1. In some embodiments, the network node further comprises communication circuitry.

Embodiments further include a network node comprising processing circuitry and memory. The memory contains instructions executable by the processing circuitry whereby the network node is configured to perform any of the steps of any of the embodiments described herein for the network node, e.g., network node 20 in FIG. 1.

Embodiments herein also include a CU-UP configured to perform any of the steps of any of the embodiments described herein for the CU-UP, e.g., CU-UP(s) 14-1UP in FIG. 1.

Embodiments also include a CU-UP comprising processing circuitry and power supply circuitry. The processing circuitry is configured to perform any of the steps of any of the embodiments described herein for the CU-UP, e.g., CU-UP(s) 14-1UP in FIG. 1. The power supply circuitry is configured to supply power to the CU-UP.

Embodiments further include a CU-UP comprising processing circuitry. The processing circuitry is configured to perform any of the steps of any of the embodiments described herein for the CU-UP, e.g., CU-UP(s) 14-1UP in FIG. 1. In some embodiments, the CU-UP further comprises communication circuitry.

Embodiments further include a CU-UP comprising processing circuitry and memory. The memory contains instructions executable by the processing circuitry whereby the CU-UP is configured to perform any of the steps of any of the embodiments described herein for the CU-UP, e.g., CU-UP(s) 14-1UP in FIG. 1.

Embodiments herein also include a CU-UP proxy configured to perform any of the steps of any of the embodiments described herein for the CU-UP proxy.

Embodiments also include a CU-UP proxy comprising processing circuitry and power supply circuitry. The processing circuitry is configured to perform any of the steps of any of the embodiments described herein for the CU-UP proxy. The power supply circuitry is configured to supply power to the CU-UP proxy.

Embodiments further include a CU-UP proxy comprising processing circuitry. The processing circuitry is configured to perform any of the steps of any of the embodiments described herein for the CU-UP proxy. In some embodiments, the CU-UP proxy further comprises communication circuitry.

Embodiments further include a CU-UP proxy comprising processing circuitry and memory. The memory contains instructions executable by the processing circuitry whereby the CU-UP proxy is configured to perform any of the steps of any of the embodiments described herein for the CU-UP proxy.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 19:
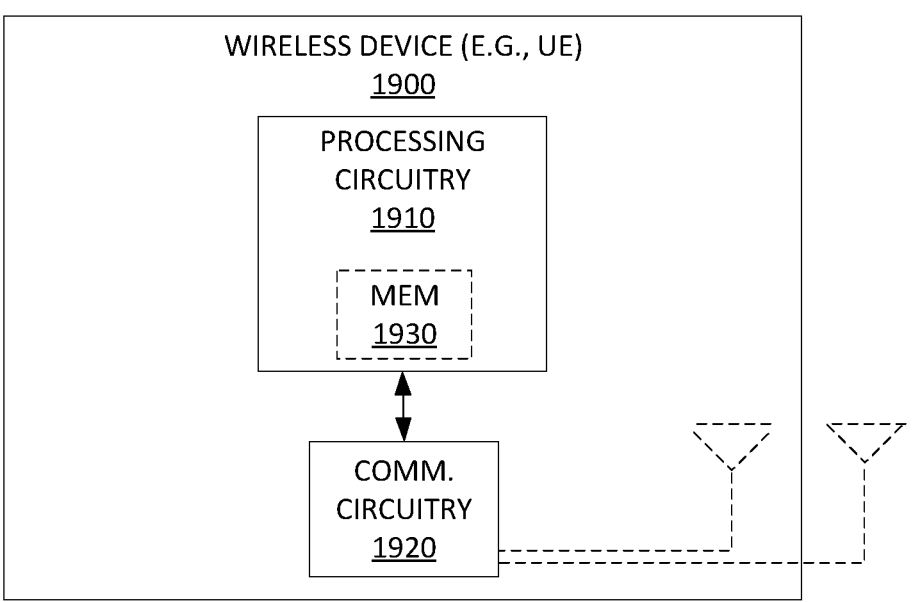
FIG. 19 is a block diagram of a wireless device according to some embodiments.

FIG. 19 for example illustrates a wireless device 1900 (e.g., UE or wireless device 12) as implemented in accordance with one or more embodiments. As shown, the wireless device 1900 includes processing circuitry 1910 and communication circuitry 1920. The communication circuitry 1920 (e.g., radio circuitry) is configured to transmit and/or receive information to and/or from one or more other nodes, e.g., via any communication technology. Such communication may occur via one or more antennas that are either internal or external to the wireless device 1900. The processing circuitry 1910 is configured to perform processing described herein, e.g., in Group Y Embodiments, such as by executing instructions stored in memory 1930. The processing circuitry 1910 in this regard may implement certain functional means, units, or modules.

Figure 20:
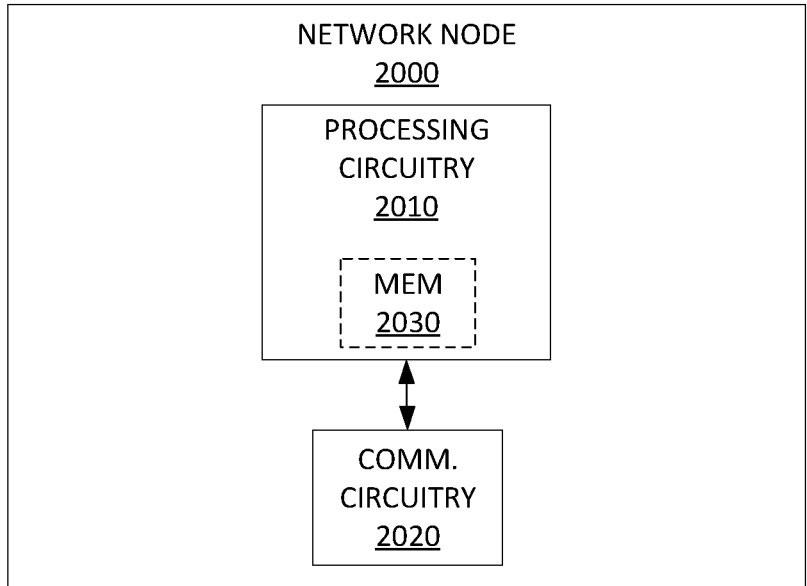
FIG. 20 is a block diagram of a network node according to some embodiments.

FIG. 20 illustrates a network node 2000 (e.g., network node 20 in FIG. 1) as implemented in accordance with one or more embodiments. As shown, the network node 2000 includes processing circuitry 2010 and communication circuitry 2020. The communication circuitry 2020 is configured to transmit and/or receive information to and/or from one or more other nodes, e.g., via any communication technology. The processing circuitry 2010 is configured to perform processing described herein, e.g., in Group AA, Group BB, Group X, or Group YY Embodiments, such as by executing instructions stored in memory 2030. The processing circuitry 2010 in this regard may implement certain functional means, units, or modules.

Figure 21:
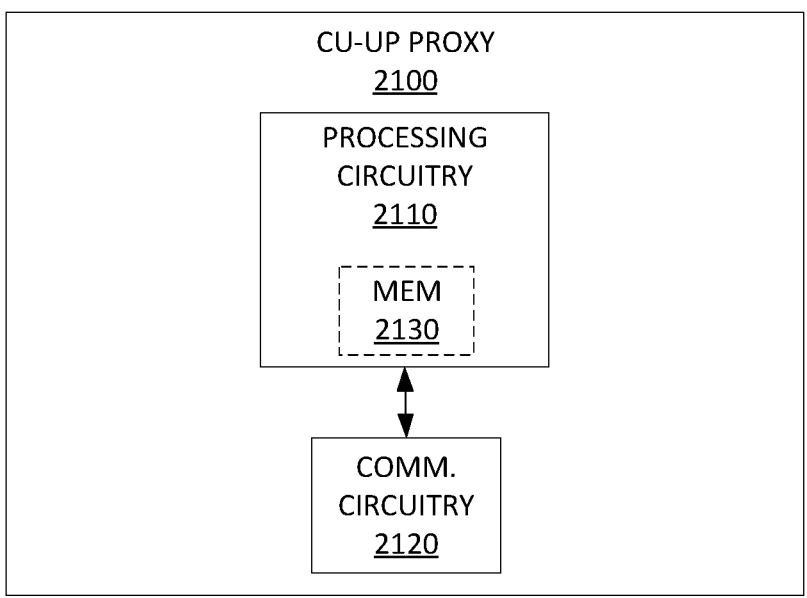
FIG. 21 is a block diagram of a CU-UP proxy according to some embodiments.

FIG. 21 illustrates a CU-UP proxy 2100 as implemented in accordance with one or more embodiments. As shown, the CU-UP proxy 2100 includes processing circuitry 2110 and communication circuitry 2120. The communication circuitry 2120 is configured to transmit and/or receive information to and/or from one or more other nodes, e.g., via any communication technology. The processing circuitry 2110 is configured to perform processing described herein, e.g., in Group A Embodiments, such as by executing instructions stored in memory 2130. The processing circuitry 2110 in this regard may implement certain functional means, units, or modules.

Figure 22:
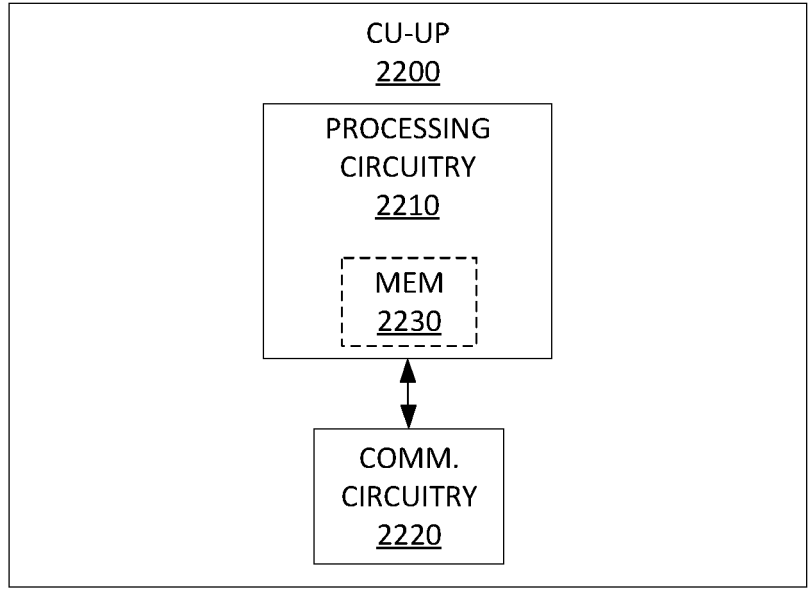
FIG. 22 is a block diagram of a CU-UP according to some embodiments.

FIG. 22 illustrates a CU-UP 2200 (e.g., CU-UP 14-1UP in FIG. 1) as implemented in accordance with one or more embodiments. As shown, the CU-UP 2200 includes processing circuitry 2210 and communication circuitry 2220. The communication circuitry 2220 is configured to transmit and/or receive information to and/or from one or more other nodes, e.g., via any communication technology. The processing circuitry 2210 is configured to perform processing described herein, e.g., in Group B Embodiments, such as by executing instructions stored in memory 2230. The processing circuitry 2210 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 23:
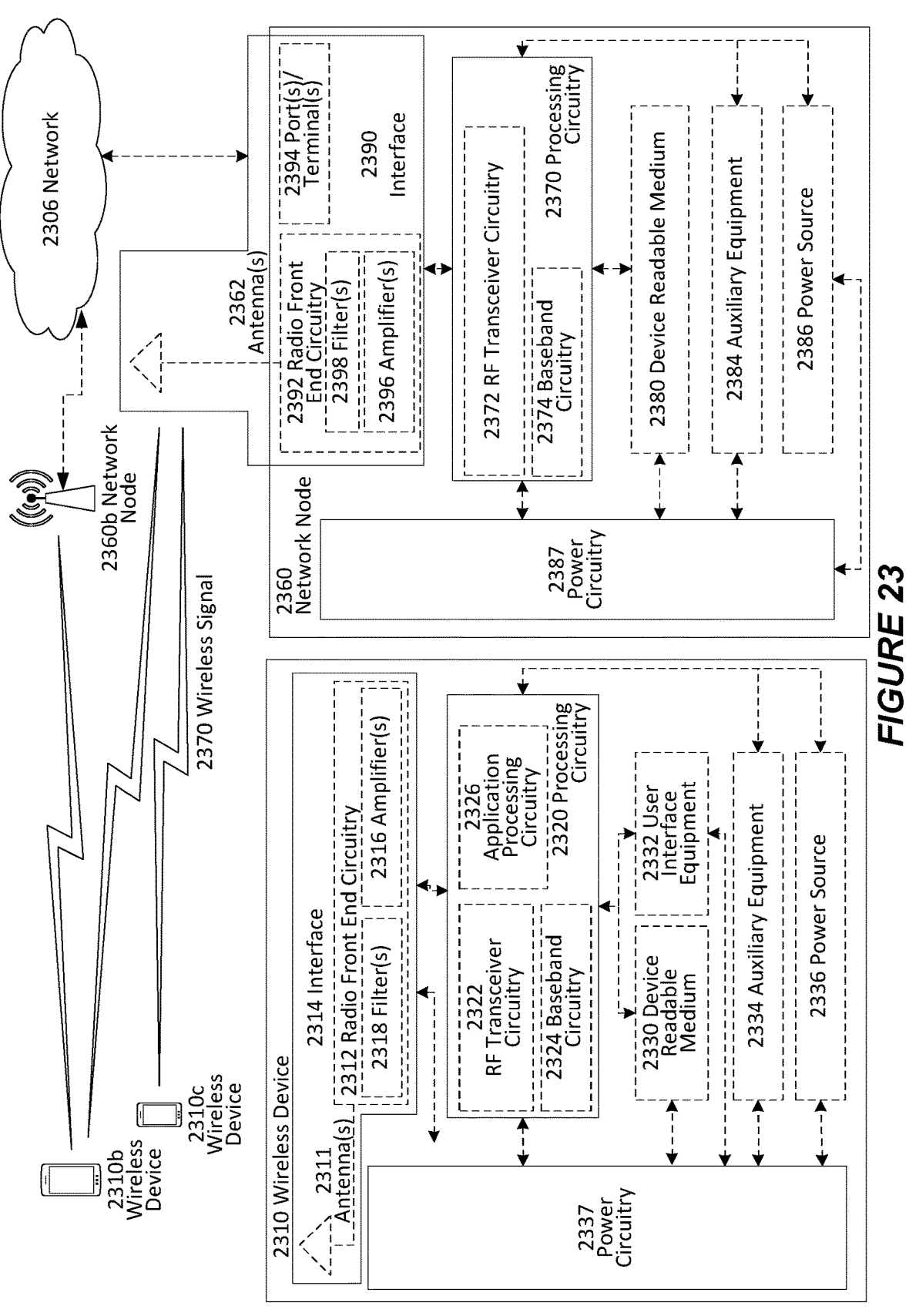
FIG. 23 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 23. For simplicity, the wireless network of FIG. 23 only depicts network 2306, network nodes 2360 and 2360b, and WDs 2310, 2310b, and 2310c. In practice, a wireless network may further include any additional elements suitable to support communication between wireless devices or between a wireless device and another communication device, such as a landline telephone, a service provider, or any other network node or end device. Of the illustrated components, network node 2360 and wireless device (WD) 2310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2360 and WD 2310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 23, network node 2360 includes processing circuitry 2370, device readable medium 2380, interface 2390, auxiliary equipment 2384, power source 2386, power circuitry 2387, and antenna 2362. Although network node 2360 illustrated in the example wireless network of FIG. 23 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2360 are depicted as single boxes located within a larger box, or nested within multiple boxes, in practice, a network node may comprise multiple different physical components that make up a single illustrated component (e.g., device readable medium 2380 may comprise multiple separate hard drives as well as multiple RAM modules).

Similarly, network node 2360 may be composed of multiple physically separate components (e.g., a NodeB component and a RNC component, or a BTS component and a BSC component, etc.), which may each have their own respective components. In certain scenarios in which network node 2360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2360 may be configured to support multiple radio access technologies (RATs). In such embodiments, some components may be duplicated (e.g., separate device readable medium 2380 for the different RATs) and some components may be reused (e.g., the same antenna 2362 may be shared by the RATs). Network node 2360 may also include multiple sets of the various illustrated components for different wireless technologies integrated into network node 2360, such as, for example, GSM, WCDMA, LTE, NR, WiFi, or Bluetooth wireless technologies. These wireless technologies may be integrated into the same or different chip or set of chips and other components within network node 2360.

Processing circuitry 2370 is configured to perform any determining, calculating, or similar operations (e.g., certain obtaining operations) described herein as being provided by a network node. These operations performed by processing circuitry 2370 may include processing information obtained by processing circuitry 2370 by, for example, converting the obtained information into other information, comparing the obtained information or converted information to information stored in the network node, and/or performing one or more operations based on the obtained information or converted information, and as a result of said processing making a determination.

Processing circuitry 2370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2360 components, such as device readable medium 2380, network node 2360 functionality. For example, processing circuitry 2370 may execute instructions stored in device readable medium 2380 or in memory within processing circuitry 2370. Such functionality may include providing any of the various wireless features, functions, or benefits discussed herein. In some embodiments, processing circuitry 2370 may include a system on a chip (SOC).

In some embodiments, processing circuitry 2370 may include one or more of radio frequency (RF) transceiver circuitry 2372 and baseband processing circuitry 2374. In some embodiments, radio frequency (RF) transceiver circuitry 2372 and baseband processing circuitry 2374 may be on separate chips (or sets of chips), boards, or units, such as radio units and digital units. In alternative embodiments, part or all of RF transceiver circuitry 2372 and baseband processing circuitry 2374 may be on the same chip or set of chips, boards, or units In certain embodiments, some or all of the functionality described herein as being provided by a network node, base station, eNB or other such network device may be performed by processing circuitry 2370 executing instructions stored on device readable medium 2380 or memory within processing circuitry 2370. In alternative embodiments, some or all of the functionality may be provided by processing circuitry 2370 without executing instructions stored on a separate or discrete device readable medium, such as in a hard-wired manner. In any of those embodiments, whether executing instructions stored on a device readable storage medium or not, processing circuitry 2370 can be configured to perform the described functionality. The benefits provided by such functionality are not limited to processing circuitry 2370 alone or to other components of network node 2360, but are enjoyed by network node 2360 as a whole, and/or by end users and the wireless network generally.

Device readable medium 2380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2370. Device readable medium 2380 may store any suitable instructions, data or information, including a computer program, software, an application including one or more of logic, rules, code, tables, etc. and/or other instructions capable of being executed by processing circuitry 2370 and, utilized by network node 2360. Device readable medium 2380 may be used to store any calculations made by processing circuitry 2370 and/or any data received via interface 2390. In some embodiments, processing circuitry 2370 and device readable medium 2380 may be considered to be integrated.

Interface 2390 is used in the wired or wireless communication of signalling and/or data between network node 2360, network 2306, and/or WDs 2310. As illustrated, interface 2390 comprises port(s)/terminal(s) 2394 to send and receive data, for example to and from network 2306 over a wired connection. Interface 2390 also includes radio front end circuitry 2392 that may be coupled to, or in certain embodiments a part of, antenna 2362. Radio front end circuitry 2392 comprises filters 2398 and amplifiers 2396. Radio front end circuitry 2392 may be connected to antenna 2362 and processing circuitry 2370. Radio front end circuitry may be configured to condition signals communicated between antenna 2362 and processing circuitry 2370. Radio front end circuitry 2392 may receive digital data that is to be sent out to other network nodes or WDs via a wireless connection. Radio front end circuitry 2392 may convert the digital data into a radio signal having the appropriate channel and bandwidth parameters using a combination of filters 2398 and/or amplifiers 2396. The radio signal may then be transmitted via antenna 2362. Similarly, when receiving data, antenna 2362 may collect radio signals which are then converted into digital data by radio front end circuitry 2392. The digital data may be passed to processing circuitry 2370. In other embodiments, the interface may comprise different components and/or different combinations of components.

In certain alternative embodiments, network node 2360 may not include separate radio front end circuitry 2392, instead, processing circuitry 2370 may comprise radio front end circuitry and may be connected to antenna 2362 without separate radio front end circuitry 2392. Similarly, in some embodiments, all or some of RF transceiver circuitry 2372 may be considered a part of interface 2390. In still other embodiments, interface 2390 may include one or more ports or terminals 2394, radio front end circuitry 2392, and RF transceiver circuitry 2372, as part of a radio unit (not shown), and interface 2390 may communicate with baseband processing circuitry 2374, which is part of a digital unit (not shown).

Antenna 2362 may include one or more antennas, or antenna arrays, configured to send and/or receive wireless signals. Antenna 2362 may be coupled to radio front end circuitry 2390 and may be any type of antenna capable of transmitting and receiving data and/or signals wirelessly. In some embodiments, antenna 2362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2362 may be separate from network node 2360 and may be connectable to network node 2360 through an interface or port.

Antenna 2362, interface 2390, and/or processing circuitry 2370 may be configured to perform any receiving operations and/or certain obtaining operations described herein as being performed by a network node. Any information, data and/or signals may be received from a wireless device, another network node and/or any other network equipment. Similarly, antenna 2362, interface 2390, and/or processing circuitry 2370 may be configured to perform any transmitting operations described herein as being performed by a network node. Any information, data and/or signals may be transmitted to a wireless device, another network node and/or any other network equipment.

Power circuitry 2387 may comprise, or be coupled to, power management circuitry and is configured to supply the components of network node 2360 with power for performing the functionality described herein. Power circuitry 2387 may receive power from power source 2386. Power source 2386 and/or power circuitry 2387 may be configured to provide power to the various components of network node 2360 in a form suitable for the respective components (e.g., at a voltage and current level needed for each respective component). Power source 2386 may either be included in, or external to, power circuitry 2387 and/or network node 2360. For example, network node 2360 may be connectable to an external power source (e.g., an electricity outlet) via an input circuitry or interface such as an electrical cable, whereby the external power source supplies power to power circuitry 2387. As a further example, power source 2386 may comprise a source of power in the form of a battery or battery pack which is connected to, or integrated in, power circuitry 2387. The battery may provide backup power should the external power source fail. Other types of power sources, such as photovoltaic devices, may also be used.

Alternative embodiments of network node 2360 may include additional components beyond those shown in FIG. 23 that may be responsible for providing certain aspects of the network node's functionality, including any of the functionality described herein and/or any functionality necessary to support the subject matter described herein. For example, network node 2360 may include user interface equipment to allow input of information into network node 2360 and to allow output of information from network node 2360. This may allow a user to perform diagnostic, maintenance, repair, and other administrative functions for network node 2360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2310 includes antenna 2311, interface 2314, processing circuitry 2320, device readable medium 2330, user interface equipment 2332, auxiliary equipment 2334, power source 2336 and power circuitry 2337. WD 2310 may include multiple sets of one or more of the illustrated components for different wireless technologies supported by WD 2310, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2310.

Antenna 2311 may include one or more antennas or antenna arrays, configured to send and/or receive wireless signals, and is connected to interface 2314. In certain alternative embodiments, antenna 2311 may be separate from WD 2310 and be connectable to WD 2310 through an interface or port. Antenna 2311, interface 2314, and/or processing circuitry 2320 may be configured to perform any receiving or transmitting operations described herein as being performed by a WD. Any information, data and/or signals may be received from a network node and/or another WD. In some embodiments, radio front end circuitry and/or antenna 2311 may be considered an interface.

As illustrated, interface 2314 comprises radio front end circuitry 2312 and antenna 2311. Radio front end circuitry 2312 comprise one or more filters 2318 and amplifiers 2316. Radio front end circuitry 2314 is connected to antenna 2311 and processing circuitry 2320, and is configured to condition signals communicated between antenna 2311 and processing circuitry 2320. Radio front end circuitry 2312 may be coupled to or a part of antenna 2311. In some embodiments, WD 2310 may not include separate radio front end circuitry 2312; rather, processing circuitry 2320 may comprise radio front end circuitry and may be connected to antenna 2311. Similarly, in some embodiments, some or all of RF transceiver circuitry 2322 may be considered a part of interface 2314. Radio front end circuitry 2312 may receive digital data that is to be sent out to other network nodes or WDs via a wireless connection. Radio front end circuitry 2312 may convert the digital data into a radio signal having the appropriate channel and bandwidth parameters using a combination of filters 2318 and/or amplifiers 2316. The radio signal may then be transmitted via antenna 2311. Similarly, when receiving data, antenna 2311 may collect radio signals which are then converted into digital data by radio front end circuitry 2312. The digital data may be passed to processing circuitry 2320. In other embodiments, the interface may comprise different components and/or different combinations of components.

Processing circuitry 2320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2310 components, such as device readable medium 2330, WD 2310 functionality. Such functionality may include providing any of the various wireless features or benefits discussed herein. For example, processing circuitry 2320 may execute instructions stored in device readable medium 2330 or in memory within processing circuitry 2320 to provide the functionality disclosed herein.

As illustrated, processing circuitry 2320 includes one or more of RF transceiver circuitry 2322, baseband processing circuitry 2324, and application processing circuitry 2326. In other embodiments, the processing circuitry may comprise different components and/or different combinations of components. In certain embodiments processing circuitry 2320 of WD 2310 may comprise a SOC. In some embodiments, RF transceiver circuitry 2322, baseband processing circuitry 2324, and application processing circuitry 2326 may be on separate chips or sets of chips. In alternative embodiments, part or all of baseband processing circuitry 2324 and application processing circuitry 2326 may be combined into one chip or set of chips, and RF transceiver circuitry 2322 may be on a separate chip or set of chips. In still alternative embodiments, part or all of RF transceiver circuitry 2322 and baseband processing circuitry 2324 may be on the same chip or set of chips, and application processing circuitry 2326 may be on a separate chip or set of chips. In yet other alternative embodiments, part or all of RF transceiver circuitry 2322, baseband processing circuitry 2324, and application processing circuitry 2326 may be combined in the same chip or set of chips. In some embodiments, RF transceiver circuitry 2322 may be a part of interface 2314. RF transceiver circuitry 2322 may condition RF signals for processing circuitry 2320.

In certain embodiments, some or all of the functionality described herein as being performed by a WD may be provided by processing circuitry 2320 executing instructions stored on device readable medium 2330, which in certain embodiments may be a computer-readable storage medium. In alternative embodiments, some or all of the functionality may be provided by processing circuitry 2320 without executing instructions stored on a separate or discrete device readable storage medium, such as in a hard-wired manner. In any of those particular embodiments, whether executing instructions stored on a device readable storage medium or not, processing circuitry 2320 can be configured to perform the described functionality. The benefits provided by such functionality are not limited to processing circuitry 2320 alone or to other components of WD 2310, but are enjoyed by WD 2310 as a whole, and/or by end users and the wireless network generally.

Processing circuitry 2320 may be configured to perform any determining, calculating, or similar operations (e.g., certain obtaining operations) described herein as being performed by a WD. These operations, as performed by processing circuitry 2320, may include processing information obtained by processing circuitry 2320 by, for example, converting the obtained information into other information, comparing the obtained information or converted information to information stored by WD 2310, and/or performing one or more operations based on the obtained information or converted information, and as a result of said processing making a determination.

Device readable medium 2330 may be operable to store a computer program, software, an application including one or more of logic, rules, code, tables, etc. and/or other instructions capable of being executed by processing circuitry 2320. Device readable medium 2330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2320. In some embodiments, processing circuitry 2320 and device readable medium 2330 may be considered to be integrated.

User interface equipment 2332 may provide components that allow for a human user to interact with WD 2310. Such interaction may be of many forms, such as visual, audial, tactile, etc. User interface equipment 2332 may be operable to produce output to the user and to allow the user to provide input to WD 2310. The type of interaction may vary depending on the type of user interface equipment 2332 installed in WD 2310. For example, if WD 2310 is a smart phone, the interaction may be via a touch screen; if WD 2310 is a smart meter, the interaction may be through a screen that provides usage (e.g., the number of gallons used) or a speaker that provides an audible alert (e.g., if smoke is detected). User interface equipment 2332 may include input interfaces, devices and circuits, and output interfaces, devices and circuits. User interface equipment 2332 is configured to allow input of information into WD 2310, and is connected to processing circuitry 2320 to allow processing circuitry 2320 to process the input information. User interface equipment 2332 may include, for example, a microphone, a proximity or other sensor, keys/buttons, a touch display, one or more cameras, a USB port, or other input circuitry. User interface equipment 2332 is also configured to allow output of information from WD 2310, and to allow processing circuitry 2320 to output information from WD 2310. User interface equipment 2332 may include, for example, a speaker, a display, vibrating circuitry, a USB port, a headphone interface, or other output circuitry. Using one or more input and output interfaces, devices, and circuits, of user interface equipment 2332, WD 2310 may communicate with end users and/or the wireless network, and allow them to benefit from the functionality described herein.

Auxiliary equipment 2334 is operable to provide more specific functionality which may not be generally performed by WDs. This may comprise specialized sensors for doing measurements for various purposes, interfaces for additional types of communication such as wired communications etc. The inclusion and type of components of auxiliary equipment 2334 may vary depending on the embodiment and/or scenario.

Power source 2336 may, in some embodiments, be in the form of a battery or battery pack. Other types of power sources, such as an external power source (e.g., an electricity outlet), photovoltaic devices or power cells, may also be used. WD 2310 may further comprise power circuitry 2337 for delivering power from power source 2336 to the various parts of WD 2310 which need power from power source 2336 to carry out any functionality described or indicated herein. Power circuitry 2337 may in certain embodiments comprise power management circuitry. Power circuitry 2337 may additionally or alternatively be operable to receive power from an external power source; in which case WD 2310 may be connectable to the external power source (such as an electricity outlet) via input circuitry or an interface such as an electrical power cable. Power circuitry 2337 may also in certain embodiments be operable to deliver power from an external power source to power source 2336. This may be, for example, for the charging of power source 2336. Power circuitry 2337 may perform any formatting, converting, or other modification to the power from power source 2336 to make the power suitable for the respective components of WD 2310 to which power is supplied.

Figure 24:
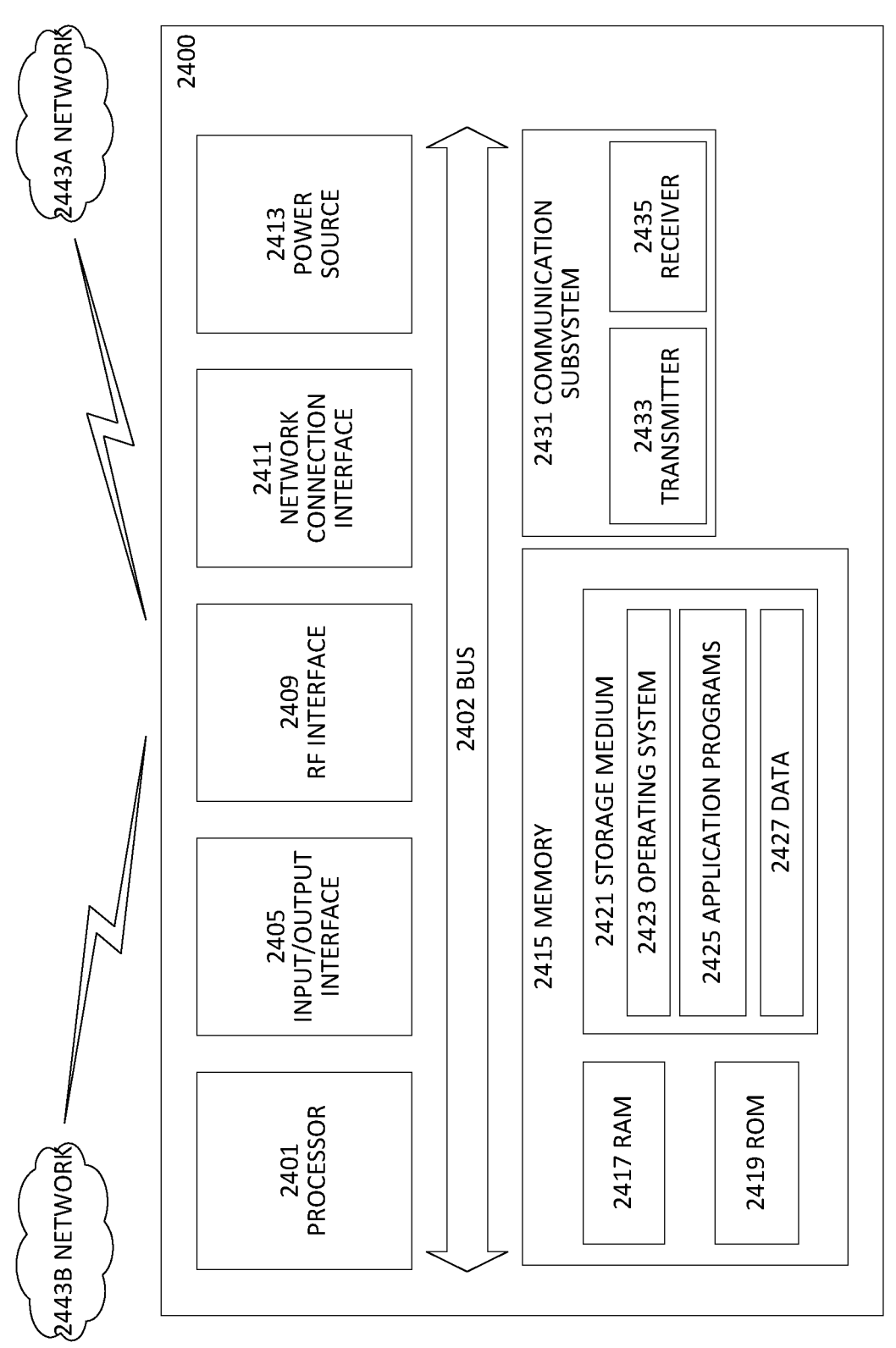
FIG. 24 is a block diagram of a user equipment according to some embodiments.

FIG. 24 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 24200 may be any UE identified by the $3^{rd}$ Generation Partnership Project (3GPP), including a NB-IoT UE, a machine type communication (MTC) UE, and/or an enhanced MTC (eMTC) UE. UE 2400, as illustrated in FIG. 24, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 24 is a UE, the components discussed herein are equally applicable to a WD, and vice-versa.

In FIG. 24, UE 2400 includes processing circuitry 2401 that is operatively coupled to input/output interface 2405, radio frequency (RF) interface 2409, network connection interface 2411, memory 2415 including random access memory (RAM) 2417, read-only memory (ROM) 2419, and storage medium 2421 or the like, communication subsystem 2431, power source 2433, and/or any other component, or any combination thereof. Storage medium 2421 includes operating system 2423, application program 2425, and data 2427. In other embodiments, storage medium 2421 may include other similar types of information. Certain UEs may utilize all of the components shown in FIG. 24, or only a subset of the components. The level of integration between the components may vary from one UE to another UE. Further, certain UEs may contain multiple instances of a component, such as multiple processors, memories, transceivers, transmitters, receivers, etc.

In FIG. 24, processing circuitry 2401 may be configured to process computer instructions and data. Processing circuitry 2401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2401 may include two central processing units (CPUs). Data may be information in a form suitable for use by a computer.

In the depicted embodiment, input/output interface 2405 may be configured to provide a communication interface to an input device, output device, or input and output device. UE 2400 may be configured to use an output device via input/output interface 2405. An output device may use the same type of interface port as an input device. For example, a USB port may be used to provide input to and output from UE 2400. The output device may be a speaker, a sound card, a video card, a display, a monitor, a printer, an actuator, an emitter, a smartcard, another output device, or any combination thereof. UE 2400 may be configured to use an input device via input/output interface 2405 to allow a user to capture information into UE 2400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 24, RF interface 2409 may be configured to provide a communication interface to RF components such as a transmitter, a receiver, and an antenna. Network connection interface 2411 may be configured to provide a communication interface to network 2443a. Network 2443a may encompass wired and/or wireless networks such as a local-area network (LAN), a wide-area network (WAN), a computer network, a wireless network, a telecommunications network, another like network or any combination thereof. For example, network 2443a may comprise a Wi-Fi network. Network connection interface 2411 may be configured to include a receiver and a transmitter interface used to communicate with one or more other devices over a communication network according to one or more communication protocols, such as Ethernet, TCP/IP, SONET, ATM, or the like. Network connection interface 2411 may implement receiver and transmitter functionality appropriate to the communication network links (e.g., optical, electrical, and the like). The transmitter and receiver functions may share circuit components, software or firmware, or alternatively may be implemented separately.

RAM 2417 may be configured to interface via bus 2402 to processing circuitry 2401 to provide storage or caching of data or computer instructions during the execution of software programs such as the operating system, application programs, and device drivers. ROM 2419 may be configured to provide computer instructions or data to processing circuitry 2401. For example, ROM 2419 may be configured to store invariant low-level system code or data for basic system functions such as basic input and output (I/O), startup, or reception of keystrokes from a keyboard that are stored in a non-volatile memory. Storage medium 2421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2421 may be configured to include operating system 2423, application program 2425 such as a web browser application, a widget or gadget engine or another application, and data file 2427. Storage medium 2421 may store, for use by UE 2400, any of a variety of various operating systems or combinations of operating systems.

Storage medium 2421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2421 may allow UE 2400 to access computer-executable instructions, application programs or the like, stored on transitory or non-transitory memory media, to off-load data, or to upload data. An article of manufacture, such as one utilizing a communication system may be tangibly embodied in storage medium 2421, which may comprise a device readable medium.

In FIG. 24, processing circuitry 2401 may be configured to communicate with network 2443*b* using communication subsystem 2431. Network 2443*a* and network 2443*b* may be the same network or networks or different network or networks. Communication subsystem 2431 may be configured to include one or more transceivers used to communicate with network 2443*b*. For example, communication subsystem 2431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2433 and/or receiver 2435 to implement transmitter or receiver functionality, respectively, appropriate to the RAN links (e.g., frequency allocations and the like). Further, transmitter 2433 and receiver 2435 of each transceiver may share circuit components, software or firmware, or alternatively may be implemented separately.

In the illustrated embodiment, the communication functions of communication subsystem 2431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2431 may include cellular communication, Wi-Fi communication, Bluetooth communication, and GPS communication. Network 2443*b* may encompass wired and/or wireless networks such as a local-area network (LAN), a wide-area network (WAN), a computer network, a wireless network, a telecommunications network, another like network or any combination thereof. For example, network 2443*b* may be a cellular network, a Wi-Fi network, and/or a near-field network. Power source 2413 may be configured to provide alternating current (AC) or direct current (DC) power to components of UE 2400.

The features, benefits and/or functions described herein may be implemented in one of the components of UE 2400 or partitioned across multiple components of UE 2400. Further, the features, benefits, and/or functions described herein may be implemented in any combination of hardware, software or firmware. In one example, communication subsystem 2431 may be configured to include any of the components described herein. Further, processing circuitry 2401 may be configured to communicate with any of such components over bus 2402. In another example, any of such components may be represented by program instructions stored in memory that when executed by processing circuitry 2401 perform the corresponding functions described herein. In another example, the functionality of any of such components may be partitioned between processing circuitry 2401 and communication subsystem 2431. In another example, the non-computationally intensive functions of any of such components may be implemented in software or firmware and the computationally intensive functions may be implemented in hardware.

Figure 25:
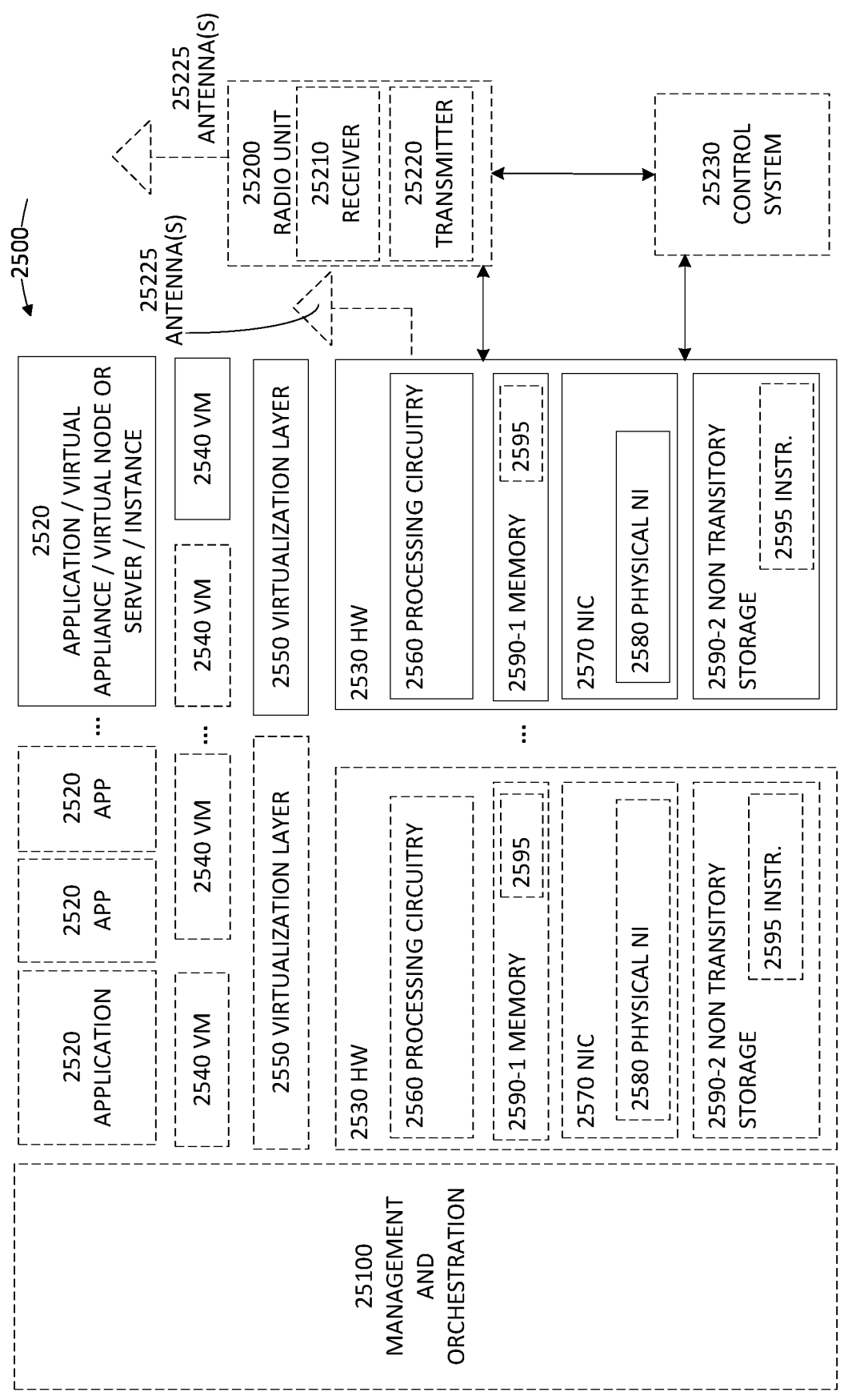
FIG. 25 is a block diagram of a virtualization environment according to some embodiments.

FIG. 25 is a schematic block diagram illustrating a virtualization environment 2500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2500 hosted by one or more of hardware nodes 2530. Further, in embodiments in which the virtual node is not a radio access node or does not require radio connectivity (e.g., a core network node), then the network node may be entirely virtualized.

The functions may be implemented by one or more applications 2520 (which may alternatively be called software instances, virtual appliances, network functions, virtual nodes, virtual network functions, etc.) operative to implement some of the features, functions, and/or benefits of some of the embodiments disclosed herein. Applications 2520 are run in virtualization environment 2500 which provides hardware 2530 comprising processing circuitry 2560 and memory 2590. Memory 2590 contains instructions 2595 executable by processing circuitry 2560 whereby application 2520 is operative to provide one or more of the features, benefits, and/or functions disclosed herein.

Virtualization environment 2500, comprises general-purpose or special-purpose network hardware devices 2530 comprising a set of one or more processors or processing circuitry 2560, which may be commercial off-the-shelf (COTS) processors, dedicated Application Specific Integrated Circuits (ASICs), or any other type of processing circuitry including digital or analog hardware components or special purpose processors. Each hardware device may comprise memory 2590-1 which may be non-persistent memory for temporarily storing instructions 2595 or software executed by processing circuitry 2560. Each hardware device may comprise one or more network interface controllers (NICs) 2570, also known as network interface cards, which include physical network interface 2580. Each hardware device may also include non-transitory, persistent, machine-readable storage media 2590-2 having stored therein software 2595 and/or instructions executable by processing circuitry 2560. Software 2595 may include any type of software including software for instantiating one or more virtualization layers 2550 (also referred to as hypervisors), software to execute virtual machines 2540 as well as software allowing it to execute functions, features and/or benefits described in relation with some embodiments described herein.

Virtual machines 2540, comprise virtual processing, virtual memory, virtual networking or interface and virtual storage, and may be run by a corresponding virtualization layer 2550 or hypervisor. Different embodiments of the instance of virtual appliance 2520 may be implemented on one or more of virtual machines 2540, and the implementations may be made in different ways.

During operation, processing circuitry 2560 executes software 2595 to instantiate the hypervisor or virtualization layer 2550, which may sometimes be referred to as a virtual machine monitor (VMM). Virtualization layer 2550 may present a virtual operating platform that appears like networking hardware to virtual machine 2540.

As shown in FIG. 25, hardware 2530 may be a standalone network node with generic or specific components. Hardware 2530 may comprise antenna 25225 and may implement some functions via virtualization. Alternatively, hardware 2530 may be part of a larger cluster of hardware (e.g. such as in a data center or customer premise equipment (CPE)) where many hardware nodes work together and are managed via management and orchestration (MANO) 25100, which, among others, oversees lifecycle management of applications 2520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2540 may be a software implementation of a physical machine that runs programs as if they were executing on a physical, non-virtualized machine. Each of virtual machines 2540, and that part of hardware 2530 that executes that virtual machine, be it hardware dedicated to that virtual machine and/or hardware shared by that virtual machine with others of the virtual machines 2540, forms a separate virtual network elements (VNE).

Still in the context of NFV, Virtual Network Function (VNF) is responsible for handling specific network functions that run in one or more virtual machines 2540 on top of hardware networking infrastructure 2530 and corresponds to application 2520 in FIG. 25.

In some embodiments, one or more radio units 25200 that each include one or more transmitters 25220 and one or more receivers 25210 may be coupled to one or more antennas 25225. Radio units 25200 may communicate directly with hardware nodes 2530 via one or more appropriate network interfaces and may be used in combination with the virtual components to provide a virtual node with radio capabilities, such as a radio access node or a base station.

In some embodiments, some signalling can be effected with the use of control system 25230 which may alternatively be used for communication between the hardware nodes 2530 and radio units 25200.

Figure 26:
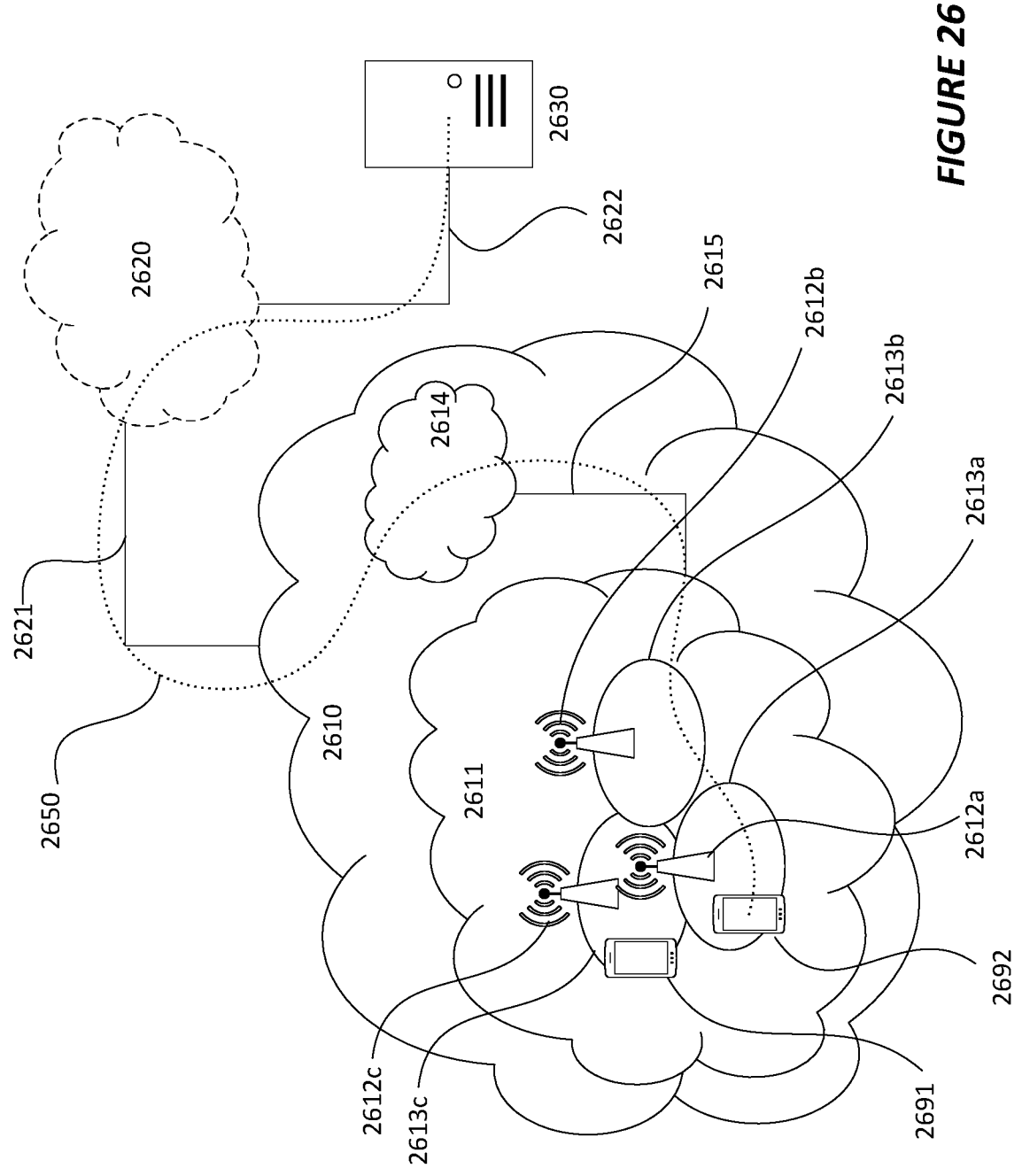
FIG. 26 is a block diagram of a communication network with a host computer according to some embodiments.

FIG. 26 illustrates a telecommunication network connected via an intermediate network to a host computer in accordance with some embodiments. In particular, with reference to FIG. 26, in accordance with an embodiment, a communication system includes telecommunication network 2610, such as a 3GPP-type cellular network, which comprises access network 2611, such as a radio access network, and core network 2614. Access network 2611 comprises a plurality of base stations 2612a, 2612b, 2612c, such as NBs, eNBs, gNBs or other types of wireless access points, each defining a corresponding coverage area 2613a, 2613b, 2613c. Each base station 2612a, 2612b, 2612c is connectable to core network 2614 over a wired or wireless connection 2615. A first UE 2691 located in coverage area 2613c is configured to wirelessly connect to, or be paged by, the corresponding base station 2612c. A second UE 2692 in coverage area 2613a is wirelessly connectable to the corresponding base station 2612a. While a plurality of UEs 2691, 2692 are illustrated in this example, the disclosed embodiments are equally applicable to a situation where a sole UE is in the coverage area or where a sole UE is connecting to the corresponding base station 2612.

Telecommunication network 2610 is itself connected to host computer 2630, which may be embodied in the hardware and/or software of a standalone server, a cloud-implemented server, a distributed server or as processing resources in a server farm. Host computer 2630 may be under the ownership or control of a service provider, or may be operated by the service provider or on behalf of the service provider. Connections 2621 and 2622 between telecommunication network 2610 and host computer 2630 may extend directly from core network 2614 to host computer 2630 or may go via an optional intermediate network 2620. Intermediate network 2620 may be one of, or a combination of more than one of, a public, private or hosted network; intermediate network 2620, if any, may be a backbone network or the Internet; in particular, intermediate network 2620 may comprise two or more sub-networks (not shown).

The communication system of FIG. 26 as a whole enables connectivity between the connected UEs 2691, 2692 and host computer 2630. The connectivity may be described as an over-the-top (OTT) connection 2650. Host computer 2630 and the connected UEs 2691, 2692 are configured to communicate data and/or signaling via OTT connection 2650, using access network 2611, core network 2614, any intermediate network 2620 and possible further infrastructure (not shown) as intermediaries. OTT connection 2650 may be transparent in the sense that the participating communication devices through which OTT connection 2650 passes are unaware of routing of uplink and downlink communications. For example, base station 2612 may not or need not be informed about the past routing of an incoming downlink communication with data originating from host computer 2630 to be forwarded (e.g., handed over) to a connected UE 2691. Similarly, base station 2612 need not be aware of the future routing of an outgoing uplink communication originating from the UE 2691 towards the host computer 2630.

Figure 27:
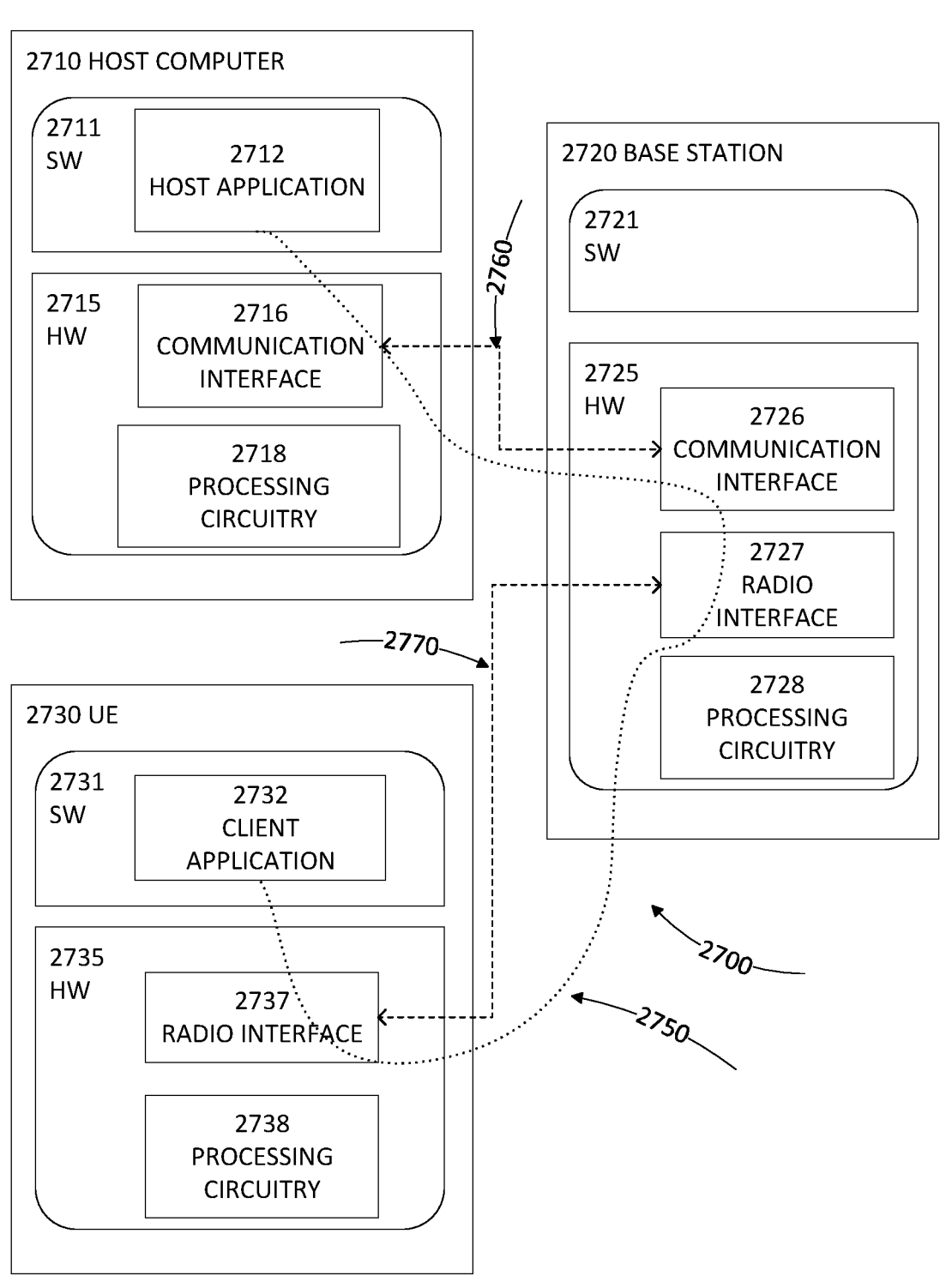
FIG. 27 is a block diagram of a host computer according to some embodiments.

Example implementations, in accordance with an embodiment, of the UE, base station and host computer discussed in the preceding paragraphs will now be described with reference to FIG. 27. FIG. 27 illustrates host computer communicating via a base station with a user equipment over a partially wireless connection in accordance with some embodiments In communication system 2700, host computer 2710 comprises hardware 2715 including communication interface 2716 configured to set up and maintain a wired or wireless connection with an interface of a different communication device of communication system 2700. Host computer 2710 further comprises processing circuitry 2718, which may have storage and/or processing capabilities. In particular, processing circuitry 2718 may comprise one or more programmable processors, application-specific integrated circuits, field programmable gate arrays or combinations of these (not shown) adapted to execute instructions. Host computer 2710 further comprises software 2711, which is stored in or accessible by host computer 2710 and executable by processing circuitry 2718. Software 2711 includes host application 2712. Host application 2712 may be operable to provide a service to a remote user, such as UE 2730 connecting via OTT connection 2750 terminating at UE 2730 and host computer 2710. In providing the service to the remote user, host application 2712 may provide user data which is transmitted using OTT connection 2750.

Communication system 2700 further includes base station 2720 provided in a telecommunication system and comprising hardware 2725 enabling it to communicate with host computer 2710 and with UE 2730. Hardware 2725 may include communication interface 2726 for setting up and maintaining a wired or wireless connection with an interface of a different communication device of communication system 2700, as well as radio interface 2727 for setting up and maintaining at least wireless connection 2770 with UE 2730 located in a coverage area (not shown in FIG. 27) served by base station 2720. Communication interface 2726 may be configured to facilitate connection 2760 to host computer 2710. Connection 2760 may be direct or it may pass through a core network (not shown in FIG. 27) of the telecommunication system and/or through one or more intermediate networks outside the telecommunication system. In the embodiment shown, hardware 2725 of base station 2720 further includes processing circuitry 2728, which may comprise one or more programmable processors, application-specific integrated circuits, field programmable gate arrays or combinations of these (not shown) adapted to execute instructions. Base station 2720 further has software 2721 stored internally or accessible via an external connection.

Communication system 2700 further includes UE 2730 already referred to. Its hardware 2735 may include radio interface 2737 configured to set up and maintain wireless connection 2770 with a base station serving a coverage area in which UE 2730 is currently located. Hardware 2735 of UE 2730 further includes processing circuitry 2738, which may comprise one or more programmable processors, application-specific integrated circuits, field programmable gate arrays or combinations of these (not shown) adapted to execute instructions. UE 2730 further comprises software 2731, which is stored in or accessible by UE 2730 and executable by processing circuitry 2738. Software 2731 includes client application 2732. Client application 2732 may be operable to provide a service to a human or nonhuman user via UE 2730, with the support of host computer 2710. In host computer 2710, an executing host application 2712 may communicate with the executing client application 2732 via OTT connection 2750 terminating at UE 2730 and host computer 2710. In providing the service to the user, client application 2732 may receive request data from host application 2712 and provide user data in response to the request data. OTT connection 2750 may transfer both the request data and the user data. Client application 2732 may interact with the user to generate the user data that it provides.

It is noted that host computer 2710, base station 2720 and UE 2730 illustrated in FIG. 27 may be similar or identical to host computer 2630, one of base stations 2612*a*, 2612*b*, 2612*c* and one of UEs 2691, 2692 of FIG. 26, respectively. This is to say, the inner workings of these entities may be as shown in FIG. 27 and independently, the surrounding network topology may be that of FIG. 26.

In FIG. 27, OTT connection 2750 has been drawn abstractly to illustrate the communication between host computer 2710 and UE 2730 via base station 2720, without explicit reference to any intermediary devices and the precise routing of messages via these devices. Network infrastructure may determine the routing, which it may be configured to hide from UE 2730 or from the service provider operating host computer 2710, or both. While OTT connection 2750 is active, the network infrastructure may further take decisions by which it dynamically changes the routing (e.g., on the basis of load balancing consideration or reconfiguration of the network).

Wireless connection 2770 between UE 2730 and base station 2720 is in accordance with the teachings of the embodiments described throughout this disclosure. One or more of the various embodiments improve the performance of OTT services provided to UE 2730 using OTT connection 2750, in which wireless connection 2770 forms the last segment.

A measurement procedure may be provided for the purpose of monitoring data rate, latency and other factors on which the one or more embodiments improve. There may further be an optional network functionality for reconfiguring OTT connection 2750 between host computer 2710 and UE 2730, in response to variations in the measurement results. The measurement procedure and/or the network functionality for reconfiguring OTT connection 2750 may be implemented in software 2711 and hardware 2715 of host computer 2710 or in software 2731 and hardware 2735 of UE 2730, or both. In embodiments, sensors (not shown) may be deployed in or in association with communication devices through which OTT connection 2750 passes; the sensors may participate in the measurement procedure by supplying values of the monitored quantities exemplified above, or supplying values of other physical quantities from which software 2711, 2731 may compute or estimate the monitored quantities. The reconfiguring of OTT connection 2750 may include message format, retransmission settings, preferred routing etc.; the reconfiguring need not affect base station 2720, and it may be unknown or imperceptible to base station 2720. Such procedures and functionalities may be known and practiced in the art. In certain embodiments, measurements may involve proprietary UE signaling facilitating host computer 2710's measurements of throughput, propagation times, latency and the like. The measurements may be implemented in that software 2711 and 2731 causes messages to be transmitted, in particular empty or 'dummy' messages, using OTT connection 2750 while it monitors propagation times, errors etc.

Figures 28, 29:
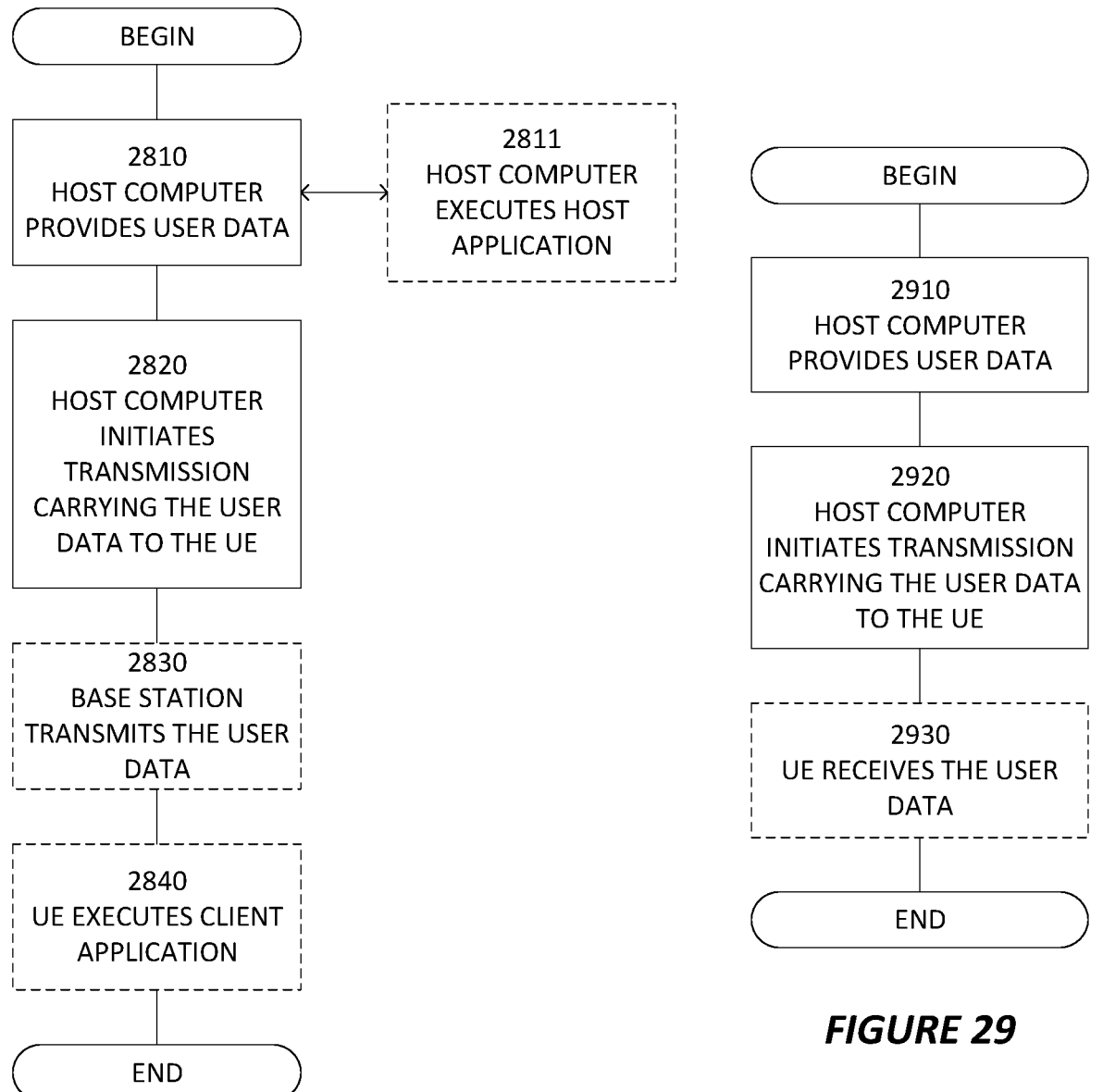
FIG. 28 is a flowchart illustrating a method implemented in a communication system, in accordance with one embodiment.
FIG. 29 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 28 will be included in this section. In step 2810, the host computer provides user data. In substep 2811 (which may be optional) of step 2810, the host computer provides the user data by executing a host application. In step 2820, the host computer initiates a transmission carrying the user data to the UE. In step 2830 (which may be optional), the base station transmits to the UE the user data which was carried in the transmission that the host computer initiated, in accordance with the teachings of the embodiments described throughout this disclosure. In step 2840 (which may also be optional), the UE executes a client application associated with the host application executed by the host computer.

FIG. 29 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 29 will be included in this section. In step 2910 of the method, the host computer provides user data. In an optional substep (not shown) the host computer provides the user data by executing a host application. In step 2920, the host computer initiates a transmission carrying the user data to the UE. The transmission may pass via the base station, in accordance with the teachings of the embodiments described throughout this disclosure. In step 2930 (which may be optional), the UE receives the user data carried in the transmission.

Figures 30, 31:
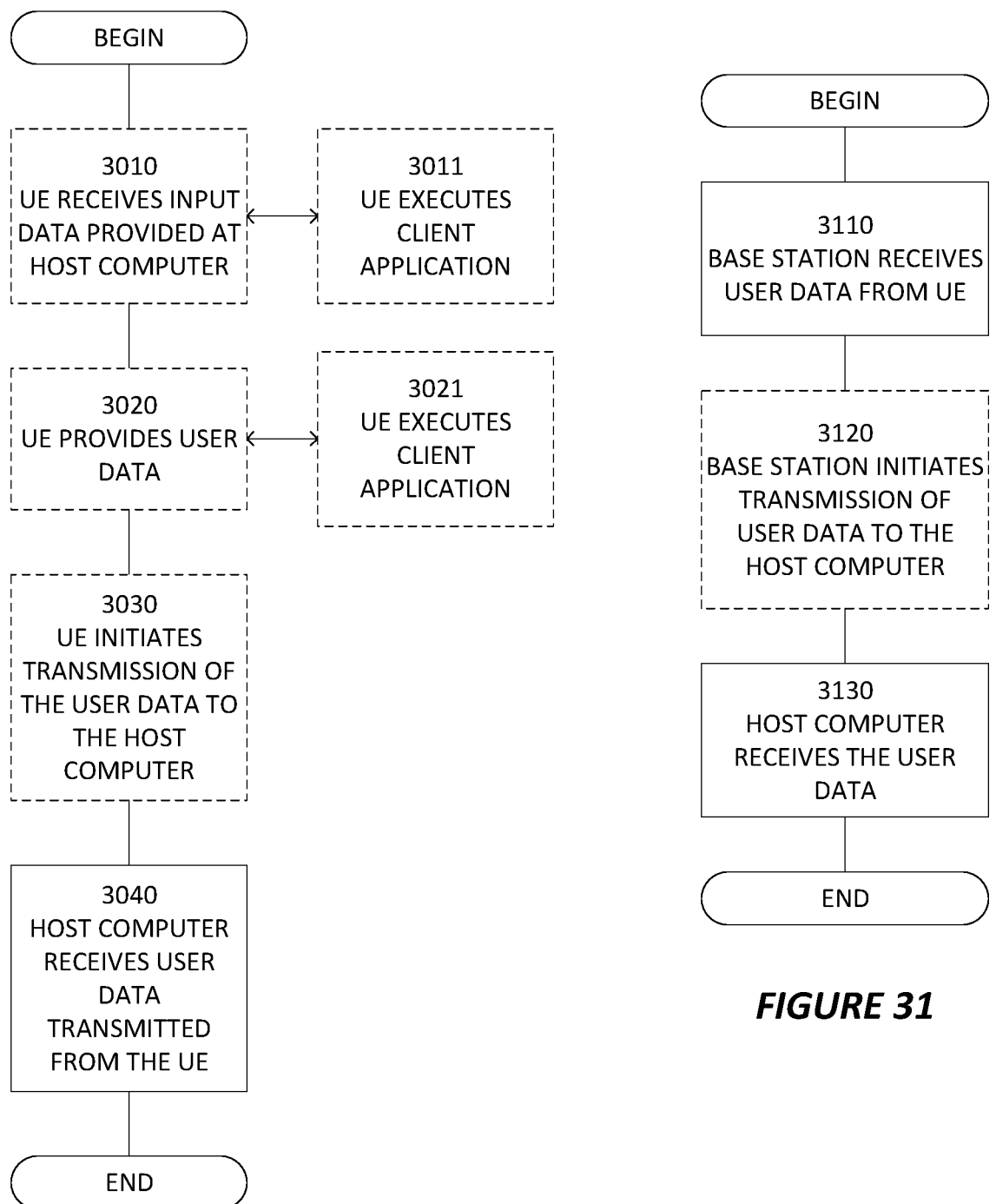
FIG. 30 is a flowchart illustrating a method implemented in a communication system, in accordance with one embodiment.
FIG. 31 is a flowchart illustrating a method implemented in a communication system, in accordance with one embodiment.

FIG. 30 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 30 will be included in this section. In step 3010 (which may be optional), the UE receives input data provided by the host computer. Additionally or alternatively, in step 3020, the UE provides user data. In substep 3021 (which may be optional) of step 3020, the UE provides the user data by executing a client application. In substep 3011 (which may be optional) of step 3010, the UE executes a client application which provides the user data in reaction to the received input data provided by the host computer. In providing the user data, the executed client application may further consider user input received from the user. Regardless of the specific manner in which the user data was provided, the UE initiates, in substep 3030 (which may be optional), transmission of the user data to the host computer. In step 3040 of the method, the host computer receives the user data transmitted from the UE, in accordance with the teachings of the embodiments described throughout this disclosure.

FIG. 31 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 31 will be included in this section. In step 3110 (which may be optional), in accordance with the teachings of the embodiments described throughout this disclosure, the base station receives user data from the UE. In step 3120 (which may be optional), the base station initiates transmission of the received user data to the host computer. In step 3130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the present disclosure will come to mind to one skilled in the art having the benefit of the teachings presented in the foregoing descriptions and the associated drawings. Therefore, it is to be understood that the present disclosure is not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

EMBODIMENTS

Group A Embodiments

A1. A method performed by a central unit user plane, CU-UP, proxy configured to serve as a proxy for multiple CU-UPs of a disaggregated radio network node, the method comprising:

transmitting and/or receiving user plane traffic, for a certain wireless device served by the multiple CU-UPs, on an interface between the CU-UP proxy and a distributed unit, DU, of the disaggregated radio network node; and performing, based on a user plane security key for the certain wireless device, security processing of the user plane traffic that is transmitted and/or received on the interface.

A2. The method of embodiment A1, wherein the security processing is performed at a Packet Data Convergence Protocol, PDCP, layer.

A3. The method of any of embodiments A1-A2, wherein the security processing of the user plane traffic includes downlink security processing and/or uplink security processing, wherein the downlink security processing includes encrypting, integrity protecting, and/or replay protecting the user plane traffic to be transmitted on the interface, and wherein the uplink security processing includes decrypting and/or verifying an integrity and replay protection of user plane traffic received on the interface.

A4. The method of any of embodiments A1-A3, further comprising receiving the user plane security key, or one or more child security keys derived therefrom, from a central unit control plane, CU-CP, of the disaggregated radio network node.

A5. The method of any of embodiments A1-A4, further comprising deriving one or more child security keys from the user plane security key, and wherein performing security processing of the user plane traffic for the multiple CU-UPs based on the user plane security key comprises performing security processing of the user plane traffic for the multiple CU-UPs based on the one or more child security keys.

A6. The method of any of embodiments A1-A5, further comprising transmitting and/or receiving user plane traffic for different ones of the multiple CU-UPs on different respective interfaces between the CU-UP proxy and the multiple CU-UPs.

A7. The method of embodiment A6, wherein the security processing of the user plane traffic is performed at a first layer, and wherein the method further comprises protecting user plane traffic transmitted and/or received on the different respective interfaces between the CU-UP proxy and the multiple CU-UPs at a second layer.

A8. The method of any of embodiments A6-A7, wherein the user plane traffic transmitted and/or received on the different respective interfaces between the CU-UP proxy and the multiple CU-UPs is in plain text above the PDCP layer.

A9. The method of any of embodiments A1-A8, wherein performing security processing of the user plane traffic for the multiple CU-UPs comprises terminating security of the user plane traffic at a PDCP layer.

A10. The method of any of embodiments A1-A9, wherein the user plane security key is common to or shared by the multiple CU-UPs.

A11. The method of any of embodiments A1-A10, wherein the user plane security key is shared between the wireless device and the disaggregated radio network node.

A12. The method of any of embodiments A1-A11, wherein the CU-UP proxy is a certain CU-UP that supports CU-UP proxy capability.

A13. The method of any of embodiments A1-A11, wherein the CU-UP proxy is co-located with or part of a distributed unit, DU, that supports CU-UP proxy capability.

A14. The method of any of embodiments A12-A13, further comprising transmitting a message that indicates support for CU-UP proxy capability.

A15. The method of embodiment A14, wherein the message is transmitted to a central unit control plane, CU-CP of the disaggregated radio network node.

A16. The method of embodiment A15, wherein the message is a message for transferring information for a Transport Network Layer, TNL, association.

Group AA Embodiments

AA1. A method performed by a network node, the method comprising:

configuring a central unit user plane, CU-UP, proxy as a proxy for multiple CU-UPs that are CU-UPs of a disaggregated radio network node and that serve a certain wireless device.

AA2. The method of embodiment AA1, wherein said configuring comprises configuring an interface between the CU-UP proxy and a distributed unit, DU, of the disaggregated radio network node, wherein the interface is configured as an interface on which user plane traffic, for the certain wireless device served by the multiple CU-UPs, is to be transmitted and/or received.

AA3. The method of embodiment AA2, wherein said configuring comprises configuring the CU-UP proxy with a user plane security key for the certain wireless device, or one or more child keys derived therefrom, based on which the CU-UP proxy is to perform security processing of the user plane traffic that is transmitted and/or received on the interface.

AA4. The method of embodiment AA3, wherein the security processing is to be performed at a Packet Data Convergence Protocol, PDCP, layer.

AA5. The method of any of embodiments AA3-AA4, wherein the security processing of the user plane traffic includes downlink security processing and/or uplink security processing, wherein the downlink security processing includes encrypting, integrity protecting, and/or replay protecting the user plane traffic to be transmitted on the interface, and wherein the uplink security processing includes decrypting and/or verifying an integrity and replay protection of user plane traffic received on the interface.

AA6. The method of any of embodiments AA1-AA5, further comprising configuring different interfaces between the CU-UP proxy and different respective ones of the multiple CU-UPs, on which user plane traffic for the certain wireless device is to be transmitted and/or received.

AA7. The method of embodiment AA6, comprising configuring the CU-UP proxy with a user plane security key for the certain wireless device, or one or more child keys derived therefrom, based on which the CU-UP proxy is to perform security processing of the user plane traffic that is transmitted and/or received on the interface, wherein the security processing is configured to be performed at a first layer, and configuring user plane traffic transmitted and/or received on the different respective interfaces between the CU-UP proxy and the multiple CU-UPs to be protected at a second layer.

AA8. The method of any of embodiments AA3-AA5, wherein the user plane security key is common to or shared by the multiple CU-UPs.

AA9. The method of any of embodiments AA3-AA5 and AA8, wherein the user plane security key is shared between the wireless device and the disaggregated radio network node.

AA10. The method of any of embodiments AA1-AA9, wherein the CU-UP proxy is a certain CU-UP that supports CU-UP proxy capability.

AA11. The method of any of embodiments AA1-AA9, wherein the CU-UP proxy is co-located with or part of a distributed unit, DU, that supports CU-UP proxy capability.

AA12. The method of any of embodiments AA10-AA11, further comprising receiving a message that indicates the CU-UP proxy supports CU-UP proxy capability.

AA13. The method of embodiment AA12, wherein the message is a message for transferring information for a Transport Network Layer, TNL, association.

Group B Embodiments

B1. A method performed by a first central unit user plane, CU-UP, of a disaggregated radio network node that comprises the first CU-UP and a second CU-UP, the method comprising:

transmitting and/or receiving user plane traffic, for a certain wireless device served by both the first CU-UP and the second CU-UP, on an interface between the first CU-UP and a distributed unit, DU, of the disaggregated radio network node;

performing, based on a user plane security key for the certain wireless device, security processing of the user plane traffic transmitted and/or received on the interface.

B2. The method of embodiment B1, wherein the security processing is performed at a Packet Data Convergence Protocol, PDCP, layer.

B3. The method of any of embodiments B1-B2, wherein the security processing of the user plane traffic includes downlink security processing and/or uplink security processing, wherein the downlink security processing includes encrypting, integrity protecting, and/or replay protecting the user plane traffic to be transmitted on the interface, and wherein the uplink security processing includes decrypting and/or verifying an integrity and replay protection of user plane traffic received on the interface.

B4. The method of any of embodiments B-B3, further comprising receiving the user plane security key, or one or more child security keys derived therefrom, from a central unit control plane, CU-CP, of the disaggregated radio network node.

B5. The method of any of embodiments B1-B4, further comprising deriving one or more child security keys from the user plane security key, and wherein performing security processing of the user plane traffic for the first and second CU-UPs based on the user plane security key comprises performing security processing of the user plane traffic for the first and second CU-UPs based on the one or more child security keys.

B6. The method of any of embodiments B1-B5, further comprising:

consuming a part of the user plane traffic that is for the first CU-UP and that is received on the interface between the first CU-UP and the DU; and forwarding, to the second CU-UP on an interface between the first CU-UP and the second CU-UP, another part of the user plane traffic that is for the second CU-UP and that is received on the interface between the first CU-UP and the DU.

B7. The method of any of embodiments B1-B5, further comprising:

receiving, from the second CU-UP on an interface between the first CU-UP and the second CU-UP, user plane traffic that is for the second CU-UP; and transmitting, on the interface between the first CU-UP and the DU, the user plane traffic received from the second CU-UP together with user plane traffic for the first CU-UP.

B8. The method of any of embodiments B1-B7, wherein the security processing of the user plane traffic is performed at a first layer, and wherein the method further comprises protecting, at a second layer, user plane traffic that is for the second CU-UP and that is transmitted and/or received on an interfaces between the first CU-UP and the second CU-UP.

B9. The method of any of embodiments B1-B8, wherein the user plane traffic transmitted and/or received on an interfaces between the first CU-UP and the second CU-UP is in plain text above a PDCP layer.

B10. The method of any of embodiments B1-B9, wherein performing security processing of the user plane traffic comprises terminating security of the user plane traffic at a PDCP layer.

B11. The method of any of embodiments B1-B10, wherein the user plane security key is common to or shared by the first and second CU-UPs.

B12. The method of any of embodiments B1-B11, wherein the user plane security key is shared between the wireless device and the disaggregated radio network node.

B13. The method of any of embodiments B1-B12, wherein the first CU-UP is a certain CU-UP that supports a mode for forwarding at least a part of received user plane traffic to another CU-UP.

B14. The method of any of embodiments B1-B12, wherein the first CU-UP is co-located with or part of a distributed unit, DU, that supports a mode for forwarding at least a part of received user plane traffic to another CU-UP.

B15. The method of any of embodiments B13-B14, further comprising transmitting a message that indicates support for said mode.

B16. The method of embodiment B15, wherein the message is transmitted to a central unit control plane, CU-CP of the disaggregated radio network node.

B17. The method of embodiment B16, wherein the message is a message for transferring information for a Transport Network Layer, TNL, association.

Group BB Embodiments

BB1. A method performed by a network node, the method comprising:

configuring the first unit user plane, CU-UP, to operate according to any of embodiments B1-B17.

Group X Embodiments

X1. A method performed by a network node configured for use in a wireless communication network, the method comprising:

configuring multiple central unit user planes, CU-UPs, of a disaggregated radio network node to handle different respective data radio bearers of a wireless device in multi-connectivity operation, with security processing of user plane traffic by different CU-UPs being based on different respective security keys.

X2. The method of embodiment X1, further comprising making a decision to perform said configuring.

X3. The method of embodiment X2, wherein the decision is made based on at least one of any one or more of:

a load on the wireless communication network or on the disaggregated radio network node;

a type of the user plane traffic;

a time of day; and an amount of the user plane traffic.

X4. The method of any of embodiments X1-X3, further comprising configuring different distributed units, DUs, of the disaggregated radio network node to serve different respective ones of the data radio bearers.

X5. The method of embodiment X4, further comprising configuring multiple central unit control planes, CU-CPs, to handle different respective ones of the different DUs.

X6. The method of any of embodiments X1-X3, further comprising configuring the same distributed unit, DU, of the disaggregated radio network node to serve the data radio bearers.

X7. The method of embodiment X6, further comprising configuring the data radio bearers to be served on the same cell.

X8. The method of embodiment X6, further comprising configuring the data radio bearers to be served on different respective cells.

X9. The method of any of embodiments X1-X8, wherein the network node is or implements a central unit control plane, CU-CP, of the disaggregated radio network node.

X10. The method of any of embodiments X1-X8, wherein the network node is radio network equipment, or core network equipment, or operation and maintenance equipment.

X11. The method of any of embodiments X1-X10, wherein the different respective data radio bearers include a master data radio bearer and one or more secondary data radio bearers.

X12. The method of any of embodiments X1-X11, wherein said multi-connectivity operation comprises dual connectivity operation.

X13. The method of any of embodiments X1-X12, wherein the security processing is performed at a Packet Data Convergence Protocol, PDCP, layer.

X14. The method of any of embodiments X1-X13, wherein the security processing of the user plane traffic includes downlink security processing and/or uplink security processing, wherein the downlink security processing includes encrypting, integrity protecting, and/or replay protecting the user plane traffic in a downlink direction, and wherein the uplink security processing includes decrypting and/or verifying an integrity and replay protection of user plane traffic in an uplink direction.

X15. The method of embodiment X2, wherein the decision is made based on a policy.

Group Y Embodiments

Y1. A method performed by a wireless device, the method comprising:

transmitting and/or receiving user plane traffic for the wireless device via multiple data radio bearers served by multiple respective central unit user planes, CU-UPs, of a disaggregated radio network node; and performing, based on user plane security keys that are different for the different data radio bearers and/or for the different CU-UPs, security processing of the user plane traffic that is transmitted and/or received.

Y2. The method of embodiment Y1, further comprising receiving, from a network node, signaling indicating the user plane security keys for the different data radio bearers and/or the different CU-UPs, and/or indicating which of the security keys is to be used for which of the different data radio bearers and/or for which of the different CU-UPs.

Y3. The method of embodiment Y2, wherein the network node is a radio network node.

Y4. The method of embodiment Y2, wherein the network node is a core network node.

Y5. The method of embodiment Y2, wherein the network node is or implements a central unit control plane, CU-CP, of the disaggregated radio network node.

Y3. The method of any of embodiments Y1-Y2, wherein the different data radio bearers belong to different respective groups of data radio bearers, wherein the security keys are different for different groups of data radio bearers.

Y4. The method of any of embodiments Y1-Y3, wherein the security processing is performed at a Packet Data Convergence Protocol, PDCP, layer.

Y5. The method of any of embodiments Y1-Y4, wherein the security processing of the user plane traffic includes downlink security processing and/or uplink security processing, wherein the uplink security processing includes encrypting, integrity protecting, and/or replay protecting the user plane traffic transmitted in an uplink direction, and wherein the downlink security processing includes decrypting and/or verifying an integrity and replay protection of user plane traffic received in a downlink direction.

Y6. The method of any of embodiments Y1-Y5, wherein performing said security processing comprises:

performing security processing of the user plane traffic that is transmitted or received over a first radio bearer of the multiple data radio bearers, based on a first user plane security key for the first data radio bearer and/or for a first CU-UP; and performing security processing of the user plane traffic that is transmitted or received over a second radio bearer of the multiple data radio bearers, based on a second user plane security key for the second data radio bearer and/or for a second CU-UP.

Group YY Embodiments

19. A method performed by a network node configured for use in a wireless communication network, the method comprising:

configuring user plane traffic for a certain wireless device to be transmitted and/or received via multiple data radio bearers served by multiple respective central unit user planes, CU-UPs, of the disaggregated radio network node; and configuring security processing of the user plane traffic that is transmitted and/or received to be performed based on user plane security keys that are different for the different data radio bearers and/or for the different CU-UPs.

20. The method of embodiment 19, further comprising making a decision to perform said configuring of the user plane traffic and said configuring of the security processing, based on at least one of any one or more of:

a load on the wireless communication network or on the disaggregated radio network node;

a type of the user plane traffic;

a time of day; and an amount of the user plane traffic.

21. The method of any of embodiments 19-20, further comprising making a decision to perform said configuring of the user plane traffic and said configuring of the security processing, based on a policy.

22. The method of any of embodiments 19-21, comprising:

configuring the certain wireless device to transmit and/or receive the user plane traffic for the certain wireless device via the multiple data radio bearers; and configuring the certain wireless device with the user plane security keys for the different data radio bearers and/or for the different CU-UPs, or configuring the certain wireless device with one or more parameters from which to derive the user plane security keys.

YY5. The method of any of embodiments 19-22, comprising configuring different distributed units, DUs, of the disaggregated radio network node to transmit and/or receive the user plane traffic for the certain wireless device via the multiple data radio bearers.

YY6. The method of any of embodiments 19-YY5, comprising configuring the different CU-UPs with different respective ones of the user plane security keys, or configuring the different CU-UPs with one or more parameters from which to derive different respective ones of the user plane security keys.

YY7. The method of any of embodiments 19-YY6, wherein the network node is a radio network node.

YY8. The method of any of embodiments 19-YY6, wherein the network node is a core network node.

YY9. The method of any of embodiments 19-YY6, wherein the network node is or implements a central unit control plane, CU-CP, of the disaggregated radio network node.

190. The method of any of embodiments 19-YY9, wherein the different data radio bearers belong to different respective groups of data radio bearers, wherein the security keys are different for different groups of data radio bearers.

191. The method of any of embodiments 19-190, wherein the security processing is configured to be performed at a Packet Data Convergence Protocol, PDCP, layer.

192. The method of any of embodiments 19-191, wherein the security processing of the user plane traffic includes at least one of any one or more of:

encrypting and/or decrypting the user plane traffic;

integrity protecting and/or verifying an integrity of the user plane traffic; and replay protecting and/or verifying replay protection of the user plane traffic.

Group C Embodiments

C1. A wireless device configured to perform any of the steps of any of the Group Y embodiments.

C2. A wireless device comprising processing circuitry configured to perform any of the steps of any of the Group Y embodiments.

C3. A wireless device comprising:

communication circuitry; and processing circuitry configured to perform any of the steps of any of the Group Y embodiments.

C4. A wireless device comprising:

processing circuitry configured to perform any of the steps of any of the Group Y embodiments; and power supply circuitry configured to supply power to the wireless device.

C5. A wireless device comprising:

processing circuitry and memory, the memory containing instructions executable by the processing circuitry whereby the wireless device is configured to perform any of the steps of any of the Group Y embodiments.

C6. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group Y embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C7. A computer program comprising instructions which, when executed by at least one processor of a wireless device, causes the wireless device to carry out the steps of any of the Group Y embodiments.

C8. A carrier containing the computer program of embodiment C7, wherein the carrier is one of an electronic signal, optical signal, radio signal, or computer readable storage medium.

C9. A central unit user plane, CU-UP, proxy configured to perform any of the steps of any of the Group A embodiments.

C10. A central unit user plane, CU-UP, proxy comprising processing circuitry configured to perform any of the steps of any of the Group A embodiments.

C11. A central unit user plane, CU-UP, proxy comprising:

communication circuitry; and processing circuitry configured to perform any of the steps of any of the Group A embodiments.

C12. A central unit user plane, CU-UP, proxy comprising:
processing circuitry configured to perform any of the steps of any of the Group A embodiments;
power supply circuitry configured to supply power to the CU-UP proxy.

C13. A central unit user plane, CU-UP, proxy comprising:
processing circuitry and memory, the memory containing instructions executable by the processing circuitry whereby the CU-UP proxy is configured to perform any of the steps of any of the Group A embodiments.

C14. A computer program comprising instructions which, when executed by at least one processor of a central unit user plane, CU-UP, proxy, causes the CU-UP proxy to carry out the steps of any of the Group A embodiments.

C15. A carrier containing the computer program of any of embodiments C15-C16, wherein the carrier is one of an electronic signal, optical signal, radio signal, or computer readable storage medium.

C16. A network node configured to perform any of the steps of any of the Group AA, Group BB, Group X, or Group YY embodiments.

C17. A network node comprising processing circuitry configured to perform any of the steps of any of the Group AA, Group BB, Group X, or Group YY embodiments.

C18. A network node comprising:
communication circuitry; and
processing circuitry configured to perform any of the steps of any of the Group AA, Group BB, Group X, or Group YY embodiments.

C19. A network node comprising:
processing circuitry configured to perform any of the steps of any of the Group AA, Group BB, Group X, or Group YY embodiments;
power supply circuitry configured to supply power to the network node.

C20. A network node comprising:
processing circuitry and memory, the memory containing instructions executable by the processing circuitry whereby the network node is configured to perform any of the steps of any of the Group AA, Group BB, Group X, or Group YY embodiments.

C21. The network node of any of embodiments C16-C20, wherein the network node is a base station.

C22. A computer program comprising instructions which, when executed by at least one processor of a network node, causes the network node to carry out the steps of any of the Group AA, Group BB, Group X, or Group YY embodiments.

C23. The computer program of embodiment C22, wherein the radio network node is a base station.

C24. A carrier containing the computer program of any of embodiments C22-C23, wherein the carrier is one of an electronic signal, optical signal, radio signal, or computer readable storage medium.

C25. A first central unit user plane, CU-UP, of a disaggregated radio network node, the first CU-UP configured to perform any of the steps of any of the Group B embodiments.

C26. A first central unit user plane, CU-UP, of a disaggregated radio network node, the first CU-UP comprising processing circuitry configured to perform any of the steps of any of the Group B embodiments.

C27. A first central unit user plane, CU-UP, of a disaggregated radio network node, the first CU-UP comprising:
communication circuitry; and
processing circuitry configured to perform any of the steps of any of the Group B embodiments.

C28. A first central unit user plane, CU-UP, of a disaggregated radio network node, the first CU-UP comprising:
processing circuitry configured to perform any of the steps of any of the Group B embodiments;
power supply circuitry configured to supply power to the first CU-UP.

C29. A first central unit user plane, CU-UP, of a disaggregated radio network node, the first CU-UP comprising:
processing circuitry and memory, the memory containing instructions executable by the processing circuitry whereby the first CU-UP is configured to perform any of the steps of any of the Group B embodiments.

C30. A computer program comprising instructions which, when executed by at least one processor of a first central unit user plane, CU-UP, of a disaggregated radio network node, causes the first CU-UP to carry out the steps of any of the Group B embodiments.

C31. A carrier containing the computer program of embodiment C30, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group A, Group AA, Group B, Group BB, Group X, Group XX, or Group Y embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group A, Group AA, Group B, Group BB, Group X, Group XX, or Group Y embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group Y embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group Y embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group Y embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group Y embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A, Group AA, Group B, Group BB, Group X, Group XX, or Group Y embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group Y embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by a network node configured for use in a wireless communication network, the method comprising:

configuring multiple central unit user planes (CU-UPs) of a disaggregated radio network node to handle different respective data radio bearers of a wireless device in multi-connectivity operation, with security processing of user plane traffic by different CU-UPs being based on different respective security keys, wherein:

security processing of the user plane traffic that is transmitted or received over a first radio bearer of the multiple data radio bearers is to be based on a first user plane security key for the first data radio bearer and/or for a first CU-UP; and security processing of the user plane traffic that is transmitted or received over a second radio bearer of the multiple data radio bearers is to be based on a second user plane security key for the second data radio bearer and/or for a second CU-UP.

2. The method of claim 1, further comprising making a decision to perform said configuring, wherein the decision is made based on at least one of any one or more of:

a load on the wireless communication network or on the disaggregated radio network node;

a type of the user plane traffic;

a time of day; and an amount of the user plane traffic.

3. The method of claim 1, further comprising configuring different distributed units (DUs) of the disaggregated radio network node to serve different respective ones of the data radio bearers.

4. The method of claim 1, wherein the security processing is performed at a Packet Data Convergence Protocol (PDCP) layer.

5. The method of claim 1, wherein the security processing of the user plane traffic includes downlink security processing and/or uplink security processing, wherein the downlink security processing includes encrypting, integrity protecting, and/or replay protecting the user plane traffic in a downlink direction, and wherein the uplink security processing includes decrypting and/or verifying an integrity and replay protection of user plane traffic in an uplink direction.

6. The method of claim 1, wherein the multi-connectivity operation comprises dual connectivity operation.

7. The method of claim 1, wherein the network node comprises a central unit control plane (CU-CP) of the disaggregated radio network node.

8. A method performed by a wireless device, the method comprising:

transmitting and/or receiving user plane traffic for the wireless device via multiple data radio bearers served by multiple respective CU-UPs of a disaggregated radio network node; and performing, based on user plane security keys that are different for the different data radio bearers and/or for the different CU-UPs, security processing of the user plane traffic that is transmitted and/or received, wherein performing said security processing comprises:

performing security processing of the user plane traffic that is transmitted or received over a first radio bearer of the multiple data radio bearers, based on a first user plane security key for the first data radio bearer and/or for a first CU-UP; and performing security processing of the user plane traffic that is transmitted or received over a second radio bearer of the multiple data radio bearers, based on a second user plane security key for the second data radio bearer and/or for a second CU-UP.

9. The method of claim 8, further comprising receiving, from a network node, signaling indicating the user plane security keys for the different data radio bearers and/or the different CU-UPs, and/or indicating which of the security keys is to be used for which of the different data radio bearers and/or for which of the different CU-UPs.

10. The method of claim 9, wherein the network node implements a central unit control plane (CU-CP) of the disaggregated radio network node.

11. The method of claim 8, wherein the different data radio bearers belong to different respective groups of data radio bearers, wherein the security keys are different for different groups of data radio bearers.

12. The method of claim 8, wherein the security processing is performed at a Packet Data Convergence Protocol (PDCP) layer.

13. The method of claim 8, wherein the security processing of the user plane traffic includes downlink security processing and/or uplink security processing, wherein the uplink security processing includes encrypting, integrity protecting, and/or replay protecting the user plane traffic transmitted in an uplink direction, and wherein the downlink security processing includes decrypting and/or verifying an integrity and replay protection of user plane traffic received in a downlink direction.

14. The method of claim 8, wherein user plane security keys are different for the different data radio bearers and/or for the different CU-UPs based on at least one of any one or more of:

a load on the wireless communication network or on the disaggregated radio network node;

a type of the user plane traffic;

a time of day; and an amount of the user plane traffic.

15. The method of claim 8, wherein the multiple data radio bearers comprise a master data radio bearer associated with a master cell group (MCG) in dual connectivity operation and a secondary data radio bearer associated with a secondary cell group (SCG) in dual connectivity operation.

16. A method performed by a network node configured for use in a wireless communication network, the method comprising:

configuring user plane traffic for a certain wireless device to be transmitted and/or received via multiple data radio bearers served by multiple respective central unit user planes (CU-UPs) of the disaggregated radio network node;

configuring security processing of the user plane traffic that is transmitted and/or received to be performed based on user plane security keys that are different for the different data radio bearers and/or for the different CU-UPs, wherein said configuring comprises:

configuring security processing of the user plane traffic that is transmitted or received over a first radio bearer of the multiple data radio bearers to be based on a first user plane security key for the first data radio bearer and/or for a first CU-UP; and configuring security processing of the user plane traffic that is transmitted or received over a second radio bearer of the multiple data radio bearers to be based on a second user plane security key for the second data radio bearer and/or for a second CU-UP.

17. The method of claim 16, further comprising making a decision to perform said configuring of the user plane traffic and said configuring of the security processing, based on at least one of any one or more of:

a load on the wireless communication network or on the disaggregated radio network node;

a type of the user plane traffic;

a time of day; and an amount of the user plane traffic.

18. The method of claim 16, comprising:

configuring the certain wireless device to transmit and/or receive the user plane traffic for the certain wireless device via the multiple data radio bearers; and configuring the certain wireless device with the user plane security keys for the different data radio bearers and/or for the different CU-UPs, or configuring the certain wireless device with one or more parameters from which to derive the user plane security keys.

19. The method of claim 16, comprising:

configuring different distributed units (DUs) of the disaggregated radio network node to transmit and/or receive the user plane traffic for the certain wireless device via the multiple data radio bearers; and/or configuring the different CU-UPs with different respective ones of the user plane security keys, or configuring the different CU-UPs with one or more parameters from which to derive different respective ones of the user plane security keys.

20. The method of claim 16, wherein the different data radio bearers belong to different respective groups of data radio bearers, wherein the security keys are different for different groups of data radio bearers.

21. The method of claim 16, wherein the security processing is configured to be performed at a Packet Data Convergence Protocol (PDCP) layer.

22. The method of claim 16, wherein the multiple data radio bearers comprise a master data radio bearer associated with a master cell group (MCG) in dual connectivity operation and a secondary data radio bearer associated with a secondary cell group (SCG) in dual connectivity operation.

23. The method of claim 16, wherein the network node implements a central unit control plane (CU-CP) of the disaggregated radio network node.

24. A network node configured for use in a wireless communication network, the network node comprising:

communication circuitry; and processing circuitry configured to:

configure multiple central unit user planes (CU-UPs), of a disaggregated radio network node to handle different respective data radio bearers of a wireless device in multi-connectivity operation, with security processing of user plane traffic by different CU-UPs being based on different respective security keys, wherein:

security processing of the user plane traffic that is transmitted or received over a first radio bearer of the multiple data radio bearers is to be based on a first user plane security key for the first data radio bearer and/or for a first CU-UP; and security processing of the user plane traffic that is transmitted or received over a second radio bearer of the multiple data radio bearers is to be based on a second user plane security key for the second data radio bearer and/or for a second CU-UP.

25. A wireless device comprising:

communication circuitry; and processing circuitry configured to:

transmit and/or receive user plane traffic for the wireless device via multiple data radio bearers served by multiple respective central unit user planes (CU-UPs) of a disaggregated radio network node; and perform, based on user plane security keys that are different for the different data radio bearers and/or for the different CU-UPs, security processing of the user plane traffic that is transmitted and/or received, wherein the processing circuitry is configured to:

perform security processing of the user plane traffic that is transmitted or received over a first radio bearer of the multiple data radio bearers, based on a first user plane security key for the first data radio bearer and/or for a first CU-UP; and perform security processing of the user plane traffic that is transmitted or received over a second radio bearer of the multiple data radio bearers, based on a second user plane security key for the second data radio bearer and/or for a second CU-UP.

26. A network node configured for use in a wireless communication network, the network node comprising:

communication circuitry; and processing circuitry configured to:

configure user plane traffic for a certain wireless device to be transmitted and/or received via multiple data radio bearers served by multiple respective central unit user planes (CU-UPs) of the disaggregated radio network node;

configure security processing of the user plane traffic that is transmitted and/or received to be performed based on user plane security keys that are different for the different data radio bearers and/or for the different CU-UPs, wherein the processing circuitry is configured to:

configure security processing of the user plane traffic that is transmitted or received over a first radio bearer of the multiple data radio bearers to be based on a first user plane security key for the first data radio bearer and/or for a first CU-UP; and configure security processing of the user plane traffic that is transmitted or received over a second radio bearer of the multiple data radio bearers to be based on a second user plane security key for the second data radio bearer and/or for a second CU-UP.

27. The method of claim 17, wherein the decision is made based on at least a time of day.

28. The method of claim 17, wherein the decision is made based on at least an amount of the user plane traffic.

* * * * *